(12) United States Patent
Sasaki et al.

(10) Patent No.: US 8,629,887 B2
(45) Date of Patent: Jan. 14, 2014

(54) DISPLAY APPARATUS, DISPLAY METHOD, AND MOVING BODY

(75) Inventors: Takashi Sasaki, Kanagawa-ken (JP); Haruhiko Okumura, Kanagawa-ken (JP); Takahisa Yoneyama, Kanagawa-ken (JP); Yugo Kuwabara, Kanagawa-ken (JP); Yasuhiko Kawawada, Kanagawa-ken (JP); Osamu Nagahara, Tokyo (JP); Noriko Odate, Ibaraki-ken (JP); Shigeo Morimoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/568,243

(22) Filed: Aug. 7, 2012

(65) Prior Publication Data

US 2013/0027426 A1 Jan. 31, 2013

Related U.S. Application Data

(63) Continuation of application No. PCT/JP2011/052425, filed on Feb. 4, 2011.

(30) Foreign Application Priority Data

Feb. 10, 2010 (JP) .................. 2010-028196

(51) Int. Cl.
*G09G 5/00* (2006.01)
*G06T 11/20* (2006.01)

(52) U.S. Cl.
USPC .......................................... 345/629; 345/440

(58) Field of Classification Search
None
See application file for complete search history.

(56) References Cited

U.S. PATENT DOCUMENTS

| 6,453,731 | B1 | 9/2002 | Yaegashi | |
|---|---|---|---|---|
| 8,457,889 | B2 * | 6/2013 | Feyereisen et al. | ......... 701/467 |
| 2009/0132130 | A1 | 5/2009 | Kumon et al. | |
| 2009/0201225 | A1 | 8/2009 | Okada et al. | |
| 2009/0248297 | A1 * | 10/2009 | Feyersisen et al. | ......... 701/206 |
| 2010/0277495 | A1 | 11/2010 | Taguchi et al. | |

FOREIGN PATENT DOCUMENTS

| JP | 2000-205925 | 7/2000 |
|---|---|---|
| JP | 2006-284458 | 10/2006 |
| JP | 2007-326410 | 12/2007 |
| JP | 2008-144743 | 6/2008 |
| JP | 2009-113724 | 5/2009 |
| JP | 2009-163084 | 7/2009 |

OTHER PUBLICATIONS

International Search Report for International Application No. PCT/JP2011/052425 mailed on Mar. 15, 2011.
Written Opinion for International Application No. PCT/JP2011/052425, Mar. 15, 2011.

* cited by examiner

*Primary Examiner* — Ryan R Yang
(74) *Attorney, Agent, or Firm* — Turocy & Watson, LLP

(57) ABSTRACT

According to an embodiment, a display apparatus includes an information acquisition unit, a control unit, and a display unit. The information acquisition unit is configured to acquire information relating to an energy efficiency of a moving body. The control unit is configured to generate image data to include a display object indicating the energy efficiency based on the information. The display unit is configured to present the image including the display object to a human viewer operating the moving body. The control unit is configured to generate the image data to include a first display object when the energy efficiency is in a first state and generate the image data to include a second display object when the energy efficiency is in a second state lower than the first state.

20 Claims, 25 Drawing Sheets

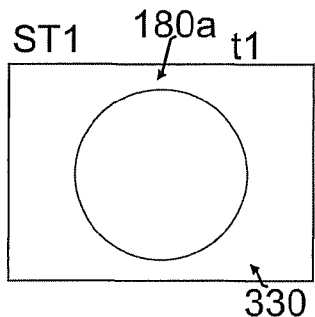 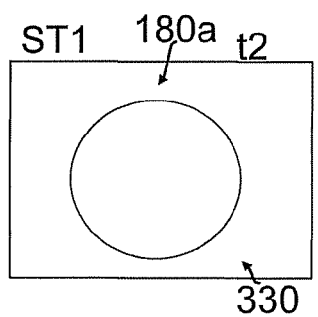 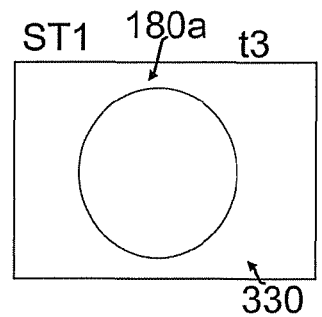
FIG. 5A          FIG. 5B          FIG. 5C
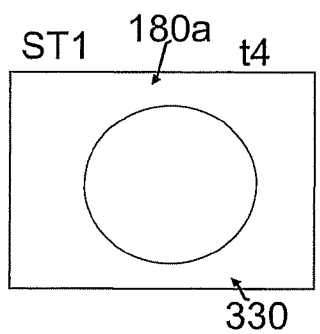 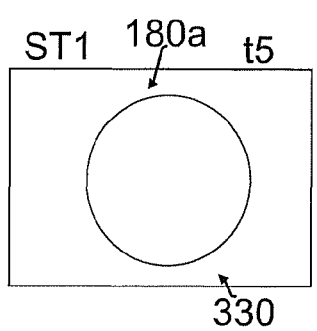 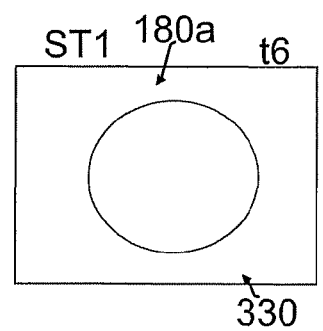
FIG. 5D          FIG. 5E          FIG. 5F
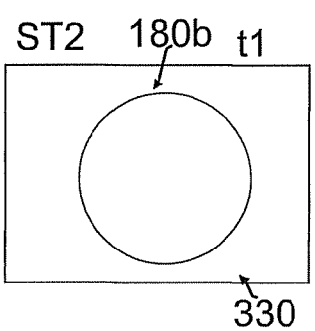 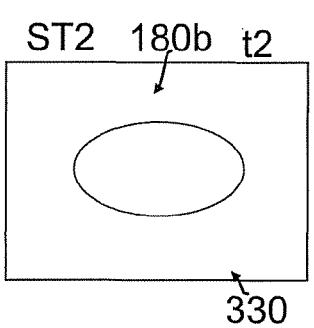 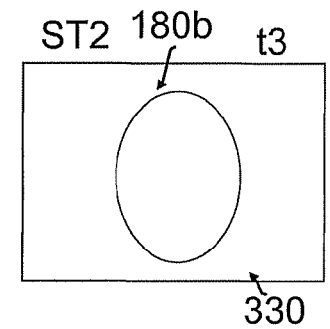
FIG. 5G          FIG. 5H          FIG. 5I
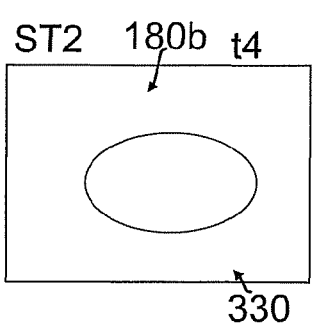 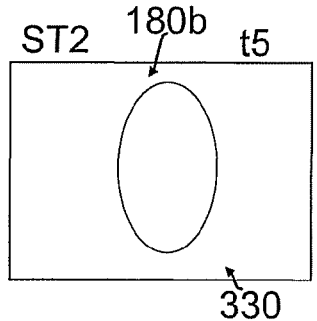 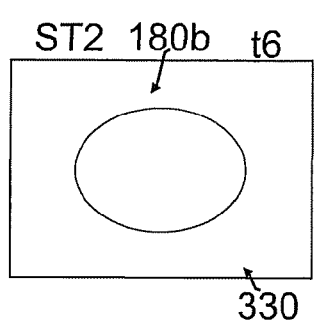
FIG. 5J          FIG. 5K          FIG. 5L

DISPLAY APPARATUS, DISPLAY METHOD, AND MOVING BODY

CROSS-REFERENCE TO RELATED APPLICATIONS

This is a continuation application of International Application PCT/JP2011/052425, filed on Feb. 4, 2011. This application also claims priority to Japanese Application No. 2010-028196, filed on Feb. 10, 2010. The entire contents of each are incorporated herein by reference.

FIELD

Embodiments described herein relate generally to a display apparatus, a display method, and a moving body.

BACKGROUND

For example, vehicle information relating to a vehicle such as the speed, the fuel, etc., of the vehicle is presented to a driver by various meters, numerals, etc.

On the other hand, head-up displays (HUDs) are being developed to display the vehicle information by projection onto the windshield to allow simultaneous visual confirmation of the external environment information and the display information. For example, JP-A 2006-284458 (Kokai) discusses technology to display an arrow of a moving image in a windshield display inside the visual field of the driver to indicate the direction for the vehicle to travel.

If the vehicle information can be easily ascertained by viewing the display of the vehicle information while viewing the external environment information when operating the vehicle, safer and more efficient operations of the vehicle can be possible.

However, conventional display apparatuses often display the information of the vehicle using character information such as numerals and the like, scales, designated shapes, etc., which are insufficient to easily ascertain the vehicle information. Thus, it is desirable to realize technology that enables easy recognition of the state of an operated apparatus such as a vehicle (a moving body), etc., while operating the operated apparatus.

BRIEF DESCRIPTION OF THE DRAWINGS

FIG. 5A to FIG. 5L are schematic views illustrating other operations of the display apparatus according to the first embodiment;

DETAILED DESCRIPTION

Figure 1A:
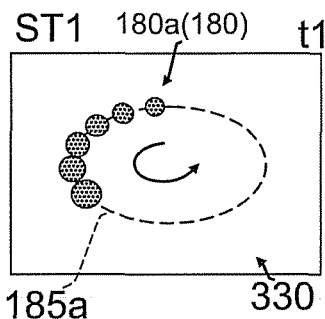
FIG. 1A to FIG. 1L are schematic views illustrating operations of a display apparatus according to a first embodiment.

According to an embodiment, a display apparatus includes an information acquisition unit, a control unit, and a display unit. The information acquisition unit is configured to acquire information relating to an energy efficiency of a moving body. The control unit is configured to generate image data to include a display object indicating the energy efficiency based on the information acquired by the information acquisition unit. The display unit is configured to present the image including the display object generated by the control unit to a human viewer operating the moving body. The control unit is configured to generate the image data to include a first display object having a first configuration and moving along a first path inside the image when the energy efficiency is in a first state and generate the image data to include a second display object having a second configuration and moving along a second path inside the image when the energy efficiency is in a second state lower than the first state. The control unit is configured to implement at least one selected from causing a temporal change of the second path to be greater than a temporal change of the first path, causing recesses and protrusions of the second path to be greater than recesses and protrusions of the first path, and causing recesses and protrusions of the second configuration to be greater than recesses and protrusions of the first configuration.

According to the invention, a display apparatus, a display method, and a moving body that enable easy recognition of the state of the moving body are provided.

According to an embodiment, a display apparatus is provided in which the apparatus includes: an information acquisition unit configured to acquire information relating to a state of a moving body; a control unit configured to generate image data to include a display object indicating the state of the moving body based on the information acquired by the information acquisition unit; and a display unit configured to present image including the display object generated by the control unit to a human viewer operating the moving body, where the control unit generates the image data to include a first display object when the moving body is in a first state, the control unit generates the image data to include a second display object that is different from the first display object when the moving body is in a second state in which a predetermined characteristic value is different from that of the first state, and a temporal change of at least one selected from a shape, a size, a number, a color, a brightness, a position, and a path of the second display object is different from that of the first display object.

According to another embodiment, a display apparatus is provided in which the apparatus includes: an information acquisition unit configured to acquire information relating to a state of a moving body; a control unit configured to generate image data to include a display object indicating the state of the moving body based on the information acquired by the information acquisition unit; and a display unit configured to present image including the display object generated by the control unit to a human viewer operating the moving body, where the control unit generates the image data to include a first display object when the moving body is in a first state, the control unit generates the image data to include a second display object that is different from the first display object when the moving body is in a second state in which a predetermined characteristic value is different from that of the first state, and at least one selected from recesses and protrusions of a shape of the second display object and recesses and protrusions of a path of the second display object is different from that of the first display object.

According to another embodiment, a display method that includes acquiring information relating to a state of a moving body, generating image data to include a display object indicating the state of the moving body based on the acquired information, and presenting image including the display object based on the generated image data to a human viewer operating the moving body is provided, where the method includes: displaying a first display object when the moving body is in a first state; and displaying a second display object that is different from the first display object when the moving body is in a second state in which a predetermined characteristic value is different from that of the first state, where at least one selected from recesses and protrusions of a path of the second display object, recesses and protrusions of a shape of the second display object, and a temporal change of at least one selected from a shape, a size, a number, a color, a brightness, a position, and a path of the second display object is different from that of the first display object.

According to another embodiment, a moving body is provided in which the moving body includes one selected from the display apparatuses recited above and a reflecting unit configured to reflect the light flux emitted from the display apparatus toward the human viewer.

Various embodiments will be described hereinafter with reference to the accompanying drawings.

In the specification and the drawings of the application, components similar to those described in regard to a drawing thereinabove are marked with like reference numerals, and a detailed description is omitted as appropriate.

First Embodiment

For example, a display apparatus according to a first embodiment of the invention can be applied not only to a HUD for a moving body such as a vehicle and the like but also to a simulator such as a driving simulator, a flight simulator, etc., and amusement applications such as games, etc.; and a display can be provided for easier determination by a human viewer operating various operated apparatuses. As an example hereinbelow, the case is described where the display apparatus according to the embodiment is applied as a HUD, i.e., a display apparatus for a moving body. Herein, moving bodies include any means of transportation in which a human rides including means of transportation having wheels such as two-wheelers, three-wheelers, four-wheelers, trains, and the like, ships, aircraft, helicopters, etc. Hereinbelow, the case is described where the moving body is a vehicle.

FIG. 1A to FIG. 1L are schematic views illustrating operations of the display apparatus according to the first embodiment.

Figure 2A:
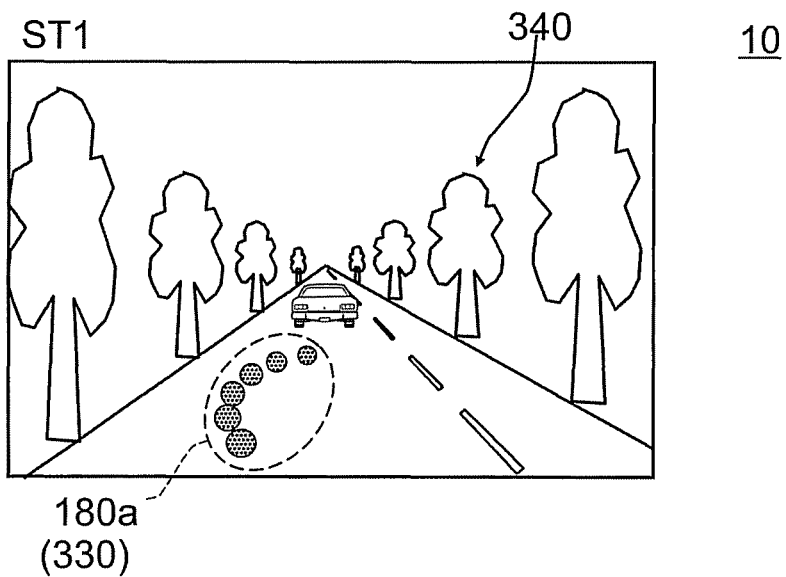
FIG. 2A and FIG. 2B are schematic views illustrating operations of the display apparatus according to the first embodiment.
Figure 2B:
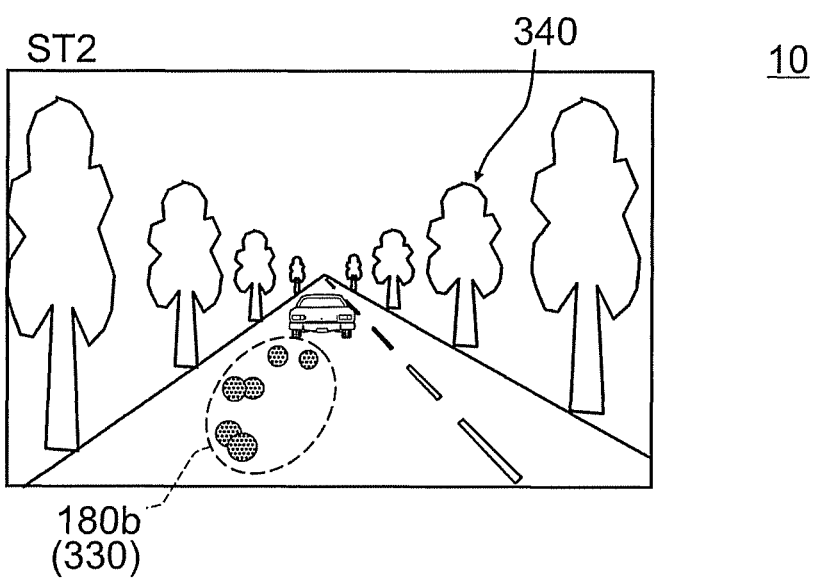

FIG. 2A and FIG. 2B are schematic views illustrating operations of the display apparatus according to the first embodiment.

Figure 3:
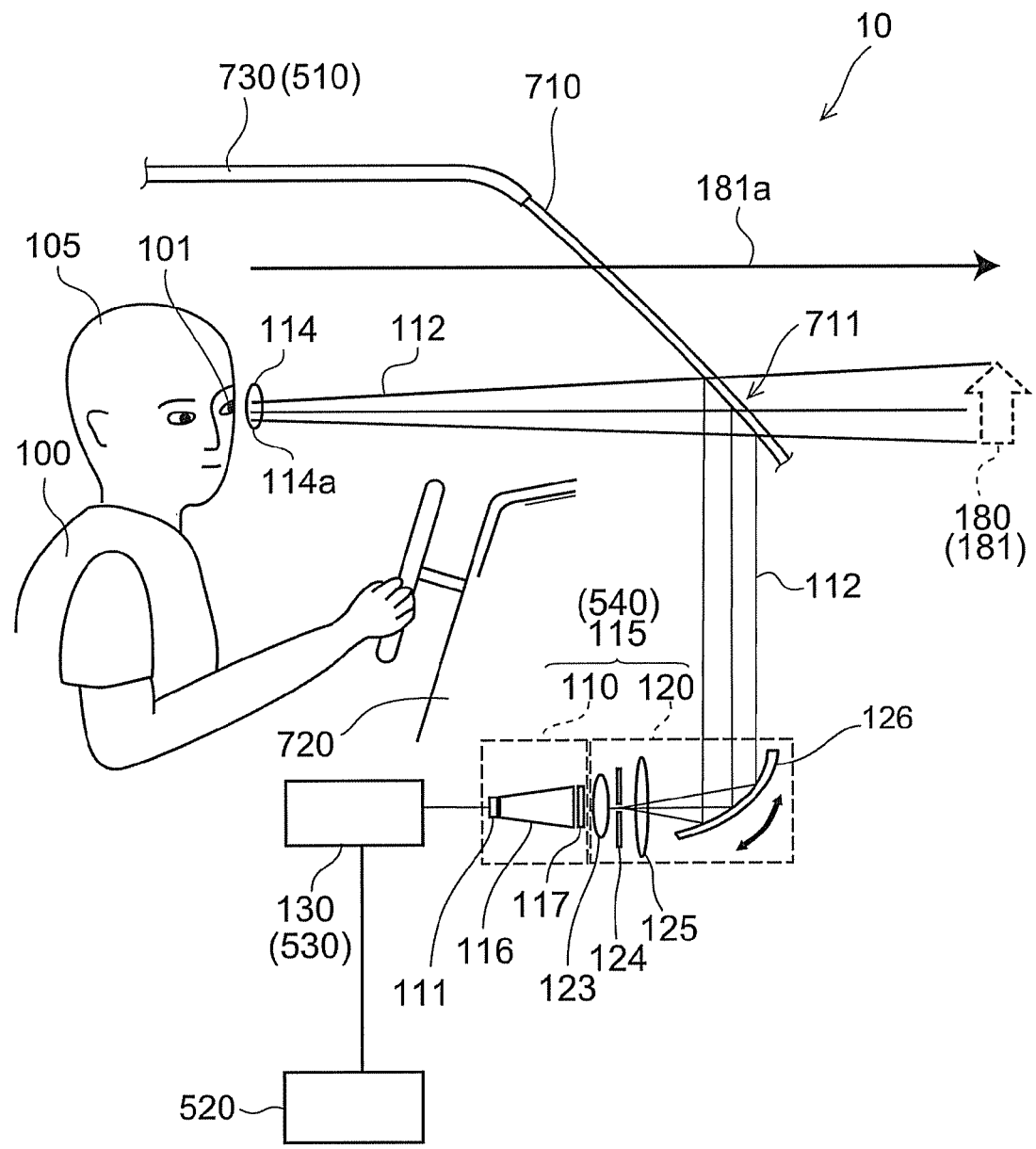
FIG. 3 is a schematic view illustrating the configuration of the display apparatus according to the first embodiment.

FIG. 3 is a schematic view illustrating the configuration of the display apparatus according to the first embodiment.

First, an overview of the configuration of the display apparatus 10 according to the embodiment will be described using FIG. 3.

As shown in FIG. 3, the display apparatus 10 according to the embodiment includes: an information acquisition unit 520 configured to acquire information relating to the state of an operated apparatus 510; a control unit 530 configured to generate image data to include a display object indicating the state of the operated apparatus 510 based on the information acquired by the information acquisition unit 520; and a display unit 540 configured to present an image including the display object generated by the control unit 530 to a human viewer 100 operating the operated apparatus 510.

Hereinbelow, the case is described where the operated apparatus 510 is a vehicle (a moving body).

The display apparatus 10 of the specific example is a HUD; and an image projection unit 115 is used as the display unit 540.

An image data generation unit 130 is used as the control unit 530.

The image projection unit 115 projects a light flux 112 including the image based on the image data generated by the image data generation unit 130 toward the human viewer 100 riding in a vehicle 730 by using a windshield unit 710 (a reflecting unit) of the vehicle 730 to reflect the light flux 112.

The windshield unit 710 includes the windshield of the vehicle 730. For example, the windshield unit 710 may include a reflector 711 (e.g., a combiner) provided in the windshield of the vehicle 730. In such a case, the light flux 112 is reflected by the reflector 711 provided in the windshield of the vehicle 730 and is reflected toward the human viewer 100. The reflector 711 may be provided separately from the windshield further on the interior side of the vehicle 730 than is the windshield. Thus, the reflector 711 provided separately from the windshield also may be considered to be a portion of the windshield unit 710.

The image included in the light flux 112 includes a display object 180. The display object 180 is provided in the image that the display apparatus 10 presents to the human viewer 100. In the specific example, the display object 180 includes information relating to vehicle information that relates to the vehicle 730.

As illustrated in FIG. 3, the image projection unit 115 of the display apparatus 10 may be provided, for example, inside the vehicle 730, that is, in the inner portion of a dashboard 720 of the vehicle 730 as viewed by the human viewer 100, i.e., the operator (the driver).

It is not always necessary to provide the image projection unit 115 integrally with the image data generation unit 130; and the image data generation unit 130 may be mounted, for example, not in the interior of the dashboard 720 but at any location of the vehicle 730. The image data from the image data generation unit 130 is supplied to the image projection unit 115 using a wired or wireless method such as an electrical signal, an optical signal, etc.

The light flux 112 emitted from the image projection unit 115 is reflected by the windshield unit 710 and is incident on the head 105 of the human viewer 100.

At this time, the divergence angle of the light flux 112 is controlled; and the light flux 112 can be designed to be incident on an eye 101 of the human viewer 100. Thereby, for example, the human viewer 100 can view the image included in the light flux 112 with the one eye 101. Thereby, the difficulty of viewing due to binocular parallax when using both eyes to view an image 181 of the display object 180 reflected at the windshield unit 710 is eliminated.

The windshield unit 710 is disposed at a position not less than 21.7 cm from the human viewer 100. Thereby, the sense of depth perceived by the human viewer 100 is increased; and it can be easy for the display object 180 to be perceived at the desired depthward position.

However, the embodiment of the invention is not limited thereto. In some cases, the light flux 112 emitted from the image projection unit 115 may be incident on both eyes of the human viewer 100.

After the light flux 112 is emitted from the display apparatus 10, the light flux 112 is reflected by the windshield unit 710 of the vehicle 730 and reaches the eye of the human viewer 100. The human viewer 100 perceives the image 181 (the virtual image) of the display object 180 formed at an image formation position 181*a* via the windshield unit 710. Thus, the display apparatus 10 can be used as a HUD.

FIG. 2A and FIG. 2B schematically illustrate the image that the human viewer 100 perceives when an external environment image 340 of the external environment information and a display image 330 of the display information presented by the display apparatus 10 are simultaneously viewed. FIG. 2A and FIG. 2B illustrate different display states of the display apparatus 10.

For example, the operated apparatus 510 (in the specific example, the vehicle 730) may have a first state ST1 and a second state ST2. In the second state ST2, a predetermined characteristic value is different from that of the first state ST1.

For example, in the second state ST2, the predetermined characteristic value is larger than that of the first state ST1.

For example, a value relating to various characteristics such as the efficiency of the operation, the stability of the operation, the accuracy of the operation, etc., of the operated apparatus 510 is used as the predetermined characteristic value.

For example, in the case where the operated apparatus 510 is the vehicle 730, a value relating to various characteristics such as the fuel efficiency, the traveling stability, the traveling safety, the comfort inside the passenger compartment, etc., is used as the predetermined characteristic value. Hereinbelow, an example is described in which the fuel efficiency of the vehicle 730 is used as the predetermined, characteristic value.

Herein, the fuel efficiency is taken to be the amount of fuel necessary to travel a predetermined distance.

In other words, the first state ST1 is the state in which the characteristic value relating to the fuel efficiency is small; and the second state ST2 is the state in which the characteristic value relating to the fuel efficiency is large. In other words, the first state ST1 is the operation state of the vehicle 730 in which the fuel efficiency is good; and the second state ST2 is the operation state of the vehicle 730 in which the fuel efficiency is worse than that of the first state ST1.

Thus, the characteristic value being small corresponds to a favorable state; and the characteristic value being large corresponds to an unfavorable state. The favorable state corresponds to the first state ST1; and the state that is relatively less favorable than the first state ST1 corresponds to the second state ST2.

The favorable state (the first state ST1) is the state in which at least one selected from the efficiency of the operation, the stability of the operation, and the accuracy of the operation of the operated apparatus 510 is higher than that of the unfavorable state (the second state ST2). In the case where the operated apparatus 510 is the vehicle 730, the favorable state (the first state ST1) is the state in which at least one selected from the efficiency (the fuel efficiency) of the operation and the stability of the operation (the traveling stability, the traveling safety, and the comfort inside the passenger compartment) of the vehicle 730 is higher than that of the unfavorable state (the second state ST2).

FIG. 2A corresponds to the operation of the display apparatus 10 in the first state ST1; and FIG. 2B corresponds to the operation of the display apparatus 10 in the second state ST2.

As shown in FIG. 2A and FIG. 2B, the display apparatus 10 displays the image including a first display object 180*a* when the operated apparatus 510 (in the specific example, vehicle 730) is in the first state ST1 and displays a second display object 180*b* that is different from the first display object 180*a* when the operated apparatus 510 is in the second state ST2.

In other words, the control unit 530 generates the image data to include the first display object 180*a* when the operated apparatus 510 is in the first state ST1 and generates the image data to include the second display object 180*b* that is different from the first display object 180*a* when the operated apparatus 510 is in the second state ST2 in which the predetermined characteristic value is greater than that of the first state ST1.

FIG. 2A and FIG. 2B illustrate the states of the first display object 180*a* and the second display object 180*b* at some instant; and, for example, the first display object 180*a* and the second display object 180*b* may be changed over time as follows.

Figure 1B:
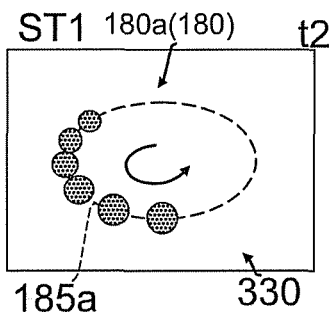
Figure 1C:
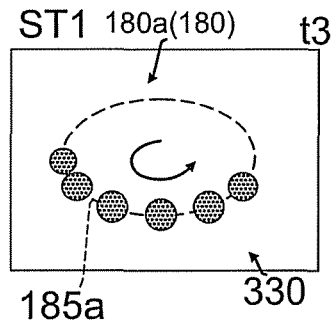
Figure 1D:
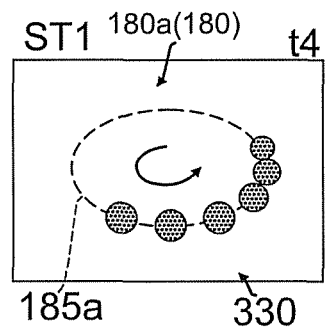
Figure 1E:
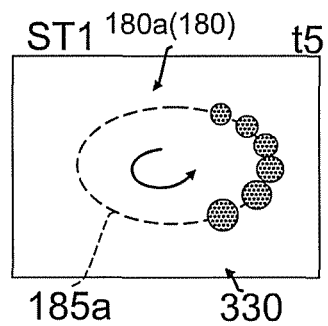
Figure 1F:
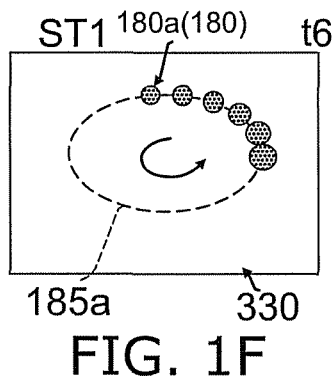

FIG. 1A to FIG. 1F illustrate the first display object 180*a* in the first state ST1; and FIG. 1G to FIG. 1L illustrate the second display object 180*b* in the second state ST2. FIG. 1A is the state at a time t1; FIG. 1B is the state at a time t2 after the time t1; FIG. 1C is the state at a time t3 after the time t2; FIG. 1D is the state at a time t4 after the time t3; FIG. 1E is the state at a time t5 after the time t4; and FIG. 1F is the state at a time t6 after the time t5. Thus, FIG. 1A to FIG. 1F illustrate the change of the first display object 180*a* over time. Similarly, FIG. 1G to FIG. 1L respectively correspond to the time t1 to the time t6 and illustrate the change of the second display object 180*b* over time. The intervals between the times t1 to t6 are the same. In other words, these drawings illustrate the change of the first and second display objects 180*a* and 180*b* with the passage of a constant amount of time.

In the specific example as shown in FIG. 1A to FIG. 1F, an image of a sphere is used as the first display object 180*a*; and the sphere moves counterclockwise (the direction of the arrow inside the drawing) over time. In other words, the position inside the display image 330 of the first display object 180*a* is changed along a constant path (in the specific example, an elliptical first path 185*a*).

In the specific example, an image is presented to give a sense of depth by the size of the first display object 180*a* on the upper side of the screen inside the display image 330 being small and the size of the first display object 180*a* on the lower side of the screen being greater than that of the upper side. Thereby, the incongruity between the external environment image 340 and the display image 330 decreases and the viewing is easier when the human viewer 100 views the display image 330.

On the other hand, as shown in FIG. 1G to FIG. 1L, an image of a sphere also is used as the second display object 180*b*. The sphere moves counterclockwise (the direction of the arrow inside the drawing) over time. However, in the second state ST2, the second display object 180*b* moves not along an elliptical path inside the display image 330 but along a wave-like second path 185*b*.

Thus, the position of the first display object 180*a* moves along the elliptical first path 185*a* inside the display image 330; and the change of the position is a change along the first path 185*a*. Conversely, the position of the second display object 180*b* changes along the wave-like second path 185*b* inside the display image 330. In other words, inside the display image 330, the position of the second display object 180*b* changes along the second path 185*b* that is made by a wave form oscillating in the vertical direction with a small period being superimposed onto the elliptical first path 185*a*. Thus, in the specific example, the temporal change of the position of the second display object 180*b* is greater than the temporal change of the position of the first display object 180*a*.

The first path 185*a* of the first display object 180*a* is an ellipse; and the path of the first display object 180*a* substantially does not change temporally.

Conversely, the second path 185*b* of the second display object 180*b* is wave-like; and the form of the wave may change with time. In other words, for example, the wave form of the second path 185*b* inside the display image 330 may change to propagate along an elliptical path; and the waveform may change randomly over time.

Thus, in the specific example, the temporal change of the position and the path of the second display object 180*b* is greater than the first display object 180*a*.

Thus, for example, an unstable impression is given to the human viewer 100 when viewing the second display object 180*b* more than when viewing the first display object 180*a* because the position and/or the path of the second display object 180*b* changes more complexly than that of the first display object 180*a*. On the other hand, for example, a stable impression is given to the human viewer 100 when viewing the first display object 180*a* more than when viewing the second display object 180*b*.

Thus, in the display apparatus 10 according to the embodiment, the human viewer 100 is caused to intuitively ascertain the state of the operated apparatus 510 not by displaying the state of the operated apparatus 510 using character information such as numerals and the like, scales, designated shapes, etc., but by displaying using the first display object 180*a* which gives the stable impression to the human and the second display object 180*b* which gives the unstable impression. Thereby, the state of the operated apparatus 510 can be ascertained easily and more accurately without obstructing the operation of the operated apparatus 510 (e.g., the driving operation of the vehicle 730).

Thereby, for example, a low-energy operation having good fuel efficiency can be prompted by causing the driver of the vehicle 730, i.e., the human viewer 100, to easily ascertain whether the current driving operation is an operation in which the fuel efficiency is good or poor without negatively affecting the operation.

Not only the position and/or the path of the second display object 180*b* but also other characteristics relating to the display object may be changed from those of the first display object 180*a*.

In other words, in the case where the characteristic value of the second state ST2 is greater than that of the first state ST1, the temporal change of at least one selected from the shape, the size, the number, the color, the brightness, the position, and the path of the second display object 180*b* may be set to be greater than that of the first display object 180*a*. As described below, at least one selected from the recesses and protrusions of the shape and the recesses and protrusions of the path of the second display object 180*b* may be set to be greater than that of the first display object 180*a*.

Thus, in the second state ST2 of the embodiment, the predetermined characteristic value is different from that of the first state ST1. Also, the temporal change of at least one selected from the shape, the size, the number, the color, the brightness, the position, and the path of the second display object 180*b* is different from that of the first display object 180*a*. As described below, at least one selected from the recesses and protrusions of the shape and the recesses and protrusions of the path of the second display object 180*b* may be set to be different from that of the first display object 180*a*.

In the case where the fuel efficiency is taken to be the distance travelable using a predetermined amount of fuel, the characteristic value (the fuel efficiency) of the second state ST2 (the unfavorable state) is less than the characteristic value (the fuel efficiency) of the first state ST1 (the favorable state). In such a case, the temporal change of at least one selected from the shape, the size, the number, the color, the brightness, the position, and the path of the second display object 180*b* may be set to be greater than that of the first display object 180*a*. As described below, at least one selected from the recesses and protrusions of the shape and the recesses and protrusions of the path of the second display object 180*b* may be set to be greater than that of the first display object 180*a*. Such forms also are taken to be included in the embodiment of the invention.

In other words, although the characteristic value of the undesirable second state ST2 may be set to be less than the characteristic value of the desirable first state ST1 according to the definition of the characteristic value, in such a case as well, the temporal change of at least one selected from the shape, the size, the number, the color, the brightness, the position, and the path of the second display object 180*b* corresponding to the undesirable second state ST2 may be set to be greater than that of the first display object 180*a*. Also, at least one selected from the recesses and protrusions of the shape and the recesses and protrusions of the path of the second display object 180*b* may be set to be greater than that of the first display object 180*a*.

The derivation of the predetermined characteristic value in the case where the operated apparatus 510 is the vehicle 730 will now be described.

For example, the information acquisition unit 520 acquires various information relating to the vehicle 730 from various measuring units included in the vehicle 730. For example, the information acquisition unit 520 acquires information relating to the various characteristics recited above from a detector of the speed, the acceleration, the deceleration, and the like of the vehicle 730, a detector of the rotation speed, the temperature, and the like of the engine and/or the motor, a detector of the supply level of the fuel (e.g., the injection state of the fuel, etc.) to the engine, a detector of the state of the battery, a detector of the voltage and/or the current supplied to the lights, a detector of the state of accessory apparatuses such as an air conditioner and the like, a detector of the weight of the vehicle 730 that changes, for example, with the number of passengers, the loaded baggage, and the like, a detector of sounds inside and outside the vehicle 730, a detector of vibrations of the vehicle body of the vehicle 730, a detector of the temperature, the humidity, and the like in the interior of the vehicle 730, a detector of characteristics relating to the road surface state, the weather, and the like where the vehicle 730 travels, etc.

Then, the predetermined characteristic value relating to the vehicle 730 is calculated based on the various information recited above that is acquired. For example, the characteristic value is the fuel efficiency, etc. For example, the calculation of the characteristic value may be performed by the control unit 530 or may be implemented by a computer and the like provided separately in the vehicle 730.

Continuing, the control unit 530 generates the image data relating to the first display object 180*a* and the second display object 180*b* such as those recited above based on the characteristic value (e.g., the fuel efficiency) that is calculated.

In the specific example, the temporal change of at least one selected from the shape, the size, the number, the color, the brightness, the position, and the path of the second display object 180*b* may be set to be greater than that of the first display object 180*a*. Herein, the size of the temporal change of the at least one selected from the shape, the size, the number, the color, the brightness, the position, and the path of the display object 180 is taken as a display object temporal change value.

FIG. 4A to FIG. 4G are schematic views illustrating characteristics of the display apparatus according to the first embodiment.

Namely, these drawings are graphs illustrating relationships between a predetermined characteristic value CV and a display object temporal change value Vt. For example, the display object temporal change value Vt includes at least one selected from a first temporal change value Vta relating to the shape of the display object, a second temporal change value Vtb relating to the size of the display object, a third temporal change value Vtc relating to the number of the display objects, a fourth temporal change value Vtd relating to the color of the display object, a fifth temporal change value Vte relating to the brightness of the display object, a sixth temporal change value Vtf relating to the position of the display object, and a seventh temporal change value Vtg relating to the path of the display object.

FIG. 4A to FIG. 4G illustrate the relationships between the characteristic value CV and the first to seventh temporal change values Vta to Vtg (the display object temporal change values Vt).

As illustrated in FIG. 4A to FIG. 4G, the first to seventh temporal change values Vta to Vtg relating to the shape, the size, the number, the color, the brightness, the position, and the path of the display object increase as the characteristic value CV increases.

Figure 4A:
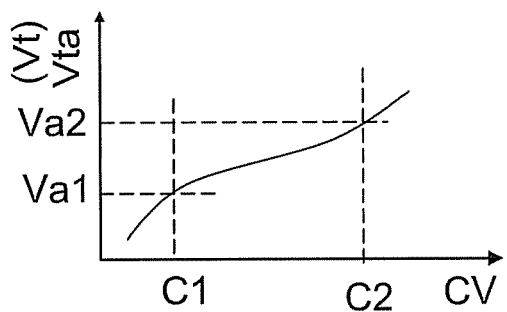
FIG. 4A to FIG. 4G are schematic views illustrating characteristics of the display apparatus according to the first embodiment.
Figure 4B:
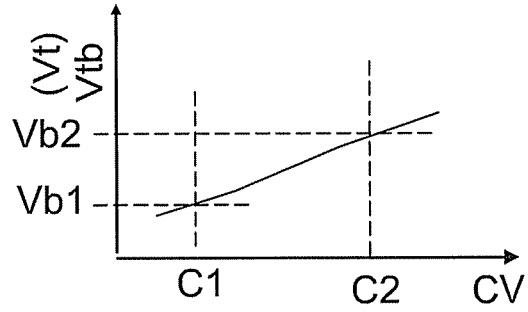
Figure 4C:
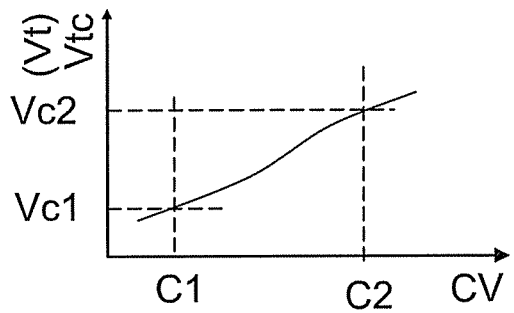
Figure 4D:
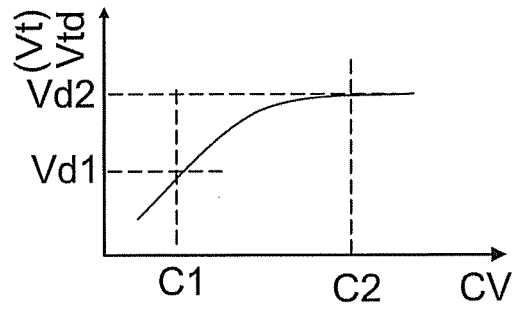
Figure 4E:
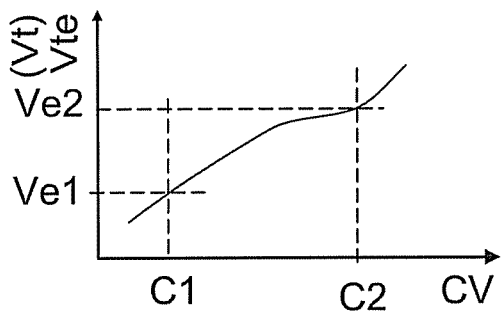
Figure 4F:
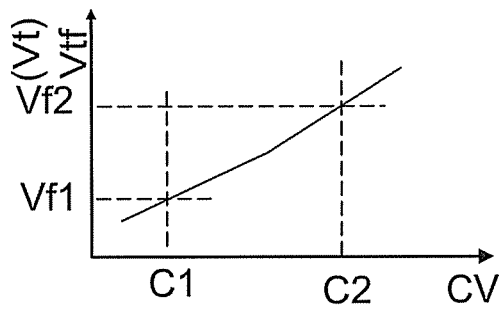
Figure 4G:
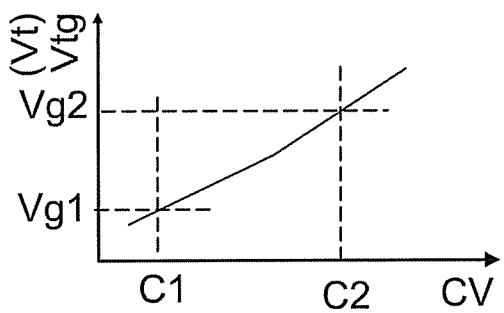

For example, as illustrated in FIG. 4A, the first temporal change value Vta relating to the shape of the display object 180 is set to be a first value Va1 at a first characteristic value C1 of the first state ST1. Then, the first temporal change value Vta relating to the shape of the display object 180 is set to be a second value Va2 that is greater than the first value Va1 at a second characteristic value C2 of the second state ST2. The first display object 180*a* is generated using the first value Va1 as the temporal change value Vta relating to the shape. The second display object 180*b* is generated using the second value Va2 as the temporal change value Vta relating to the shape. In other words, the temporal change of the shape of the second display object 180*b* is greater than that of the first display object 180*a*.

Thus, the display object 180 is generated such that the temporal change of the shape of the display object 180 increases as the characteristic value CV increases.

Similarly, as illustrated in FIG. 4B to FIG. 4G, the second to seventh temporal change values Vtb to Vtg relating to the size, the number, the color, the brightness, the position, and the path of the display object 180, respectively, are set to be first values Vb1 to Vg1 at the first characteristic value C1 of the first state ST1. The second to seventh temporal change values Vtb to Vtg relating to the size, the number, the color, the brightness, the position, and the path of the display object 180, respectively, are set to be second values Vb2 to Vg2 that are greater than the first values Vb1 to Vg1 at the second characteristic value C2 of the second state ST2.

The first display object 180*a* is generated using the first values Vb1 to Vg1 as the temporal change values Vtb to Vtg relating to the size, the number, the color, the brightness, the position, and the path, respectively. The second display object 180*b* is generated using the second values Vb2 to Vg2 as the temporal change values Vtb to Vtg relating to the size, the number, the color, the brightness, the position, and the path, respectively. In other words, the temporal changes of the size, the number, the color, the brightness, the position, and the path of the second display object 180*b* are greater than those of the first display object 180*a*.

Thus, the display object 180 is generated such that the temporal changes of the size, the number, the color, the brightness, the position, and the path of the display object 180 increase as the characteristic value CV increases.

Although the case is recited above where the temporal changes of the shape, the size, the number, the color, the brightness, the position, and the path of the second display object 180*b* are set to be greater than those of the first display object 180*a* to simplify the description, it is sufficient for the temporal change of at least one selected from the shape, the size, the number, the color, the brightness, the position, and the path of the second display object 180*b* to be set to be greater than that of the first display object 180*a*.

Although the particular case is recited above where the state of the vehicle 730 has two states (the first state ST1 and the second state ST2) to simplify the description, the embodiment of the invention is not limited thereto. It is sufficient for there to be two or more states of the vehicle 730.

In other words, as illustrated in FIG. 4A to FIG. 4G, the state of the vehicle 730 may include the case where the predetermined characteristic value CV is less than the first characteristic value C1 of the first state ST1; and in such a case, the display object temporal change values Vt (in this example, the first to seventh temporal change values Vta to Vtg) are set to be values less than the first values Va1 to Vg1. Also, the case may be included where the characteristic value CV that is determined is greater than the second characteristic value C2 of the second state ST2; and in such a case, the display object temporal change values Vt may be set to be values greater than the second values Va2 to Vg2. The case also may be included where the characteristic value CV that is determined is greater than the first characteristic value C1 and less than the second characteristic value C2; and in such a case, the display object temporal change values Vt are set to be values greater than the first values Va1 to Vg1 and less than the second values Va2 to Vg2.

The display object temporal change values Vt (in this example, the first to seventh temporal change values Vta to Vtg) may continuously change or may discontinuously change according to the characteristic value CV. For example, the display object temporal change value Vt may change in stages according to the characteristic value CV and may change by multiple stages in such a case. In other words, a threshold for the change of the display object temporal change value Vt according to the characteristic value CV may be provided; and multiple thresholds may be provided.

In the operated apparatus 510 of the embodiment, the first state ST1 which is the more favorable state and the second state ST2 which is less desirable than the first state ST1 are determined. In other words, relating to the state of the operated apparatus 510, the characteristic value CV is predetermined; and the first characteristic value C1 corresponding to the desirable first state ST1 and the relatively undesirable second characteristic value C2 are determined. The second characteristic value C2 is set to be a value greater than the first characteristic value C1. In other words, the value of the characteristic value CV is small when the state of the operated apparatus 510 is the favorable state; and the value of the characteristic value CV increases when the state of the operated apparatus 510 is the unfavorable state. Then, the first to seventh temporal change values Vta to Vtg relating to the shape, the size, the number, the color, the brightness, the position, and the path of the display object, respectively, have positive correlations with the characteristic value CV.

In other words, in the embodiment, the temporal change of the display object 180 is small when the operated apparatus 510 is in the favorable state; and the temporal change of the display object 180 is large when the operated apparatus 510 is in the unfavorable state.

According to experiments of the inventor, the human viewing the display object 180 easily perceives a sense of instability when the temporal change of the display object 180 is large; and the human viewing the display object 180 easily perceives a sense of stability when the temporal change of the display object 180 is small.

Figure 1G:
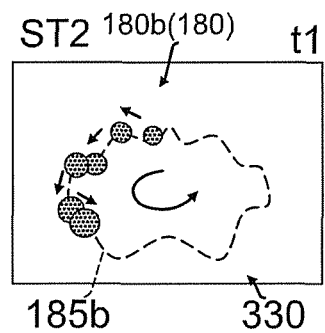
Figure 1H:
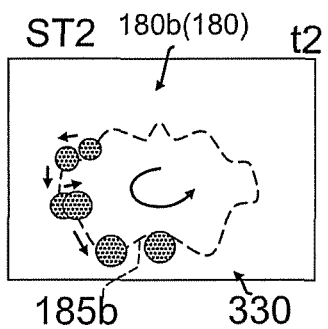
Figure 1I:
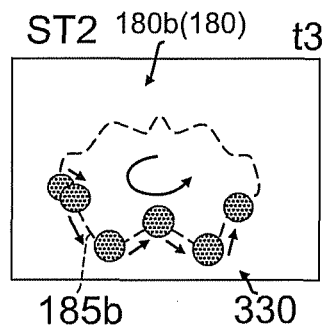
Figure 1J:
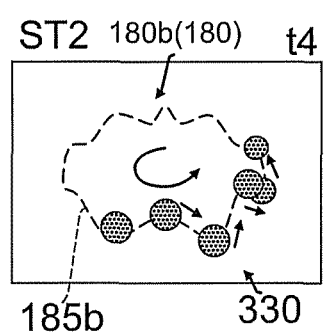
Figure 1K:
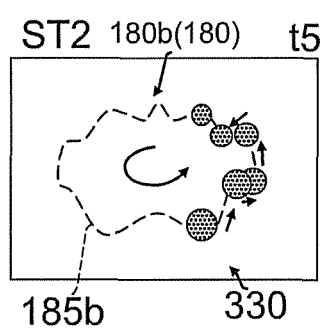
Figure 1L:
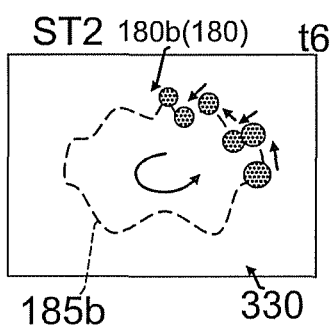

For example, as illustrated in FIG. 1A, the human viewer easily perceives a sense of relative stability in the case where the display object 180 moves along a constant elliptical path inside the display image 330. On the other hand, as illustrated in FIG. 1G, the human viewer easily perceives a sense of instability in the case where the display object 180 moves in a zigzag inside the display image 330. It is considered that this is because the temporal change of the position of the display object 180 is greater for FIG. 1G than for FIG. 1A. Also, this is because the temporal change of the path of the display object 180 is greater for FIG. 1G than for FIG. 1A.

Similarly, the human viewing the display object 180 easily perceives a sense of instability when the temporal change of the shape, the size, the number, the color, and the brightness of the display object 180 is large; and the human viewing the display object 180 easily perceives a sense of stability when the temporal change of the shape, the size, the number, the color, and the brightness of the display object 180 is small.

This phenomenon matches, for example, the known phenomenon that a sense of instability is perceived more when light is flashing (e.g., flickering) than in the case where the light is emitted with a constant luminance, etc.

The perception of the human is relatively sensitive to the temporal change of the object. In other words, the human grows accustomed to the perception of the object and the perceptual sensitivity decreases in the case where the shape, the size, the number, the color, the brightness, the position, and the path of the object are constant. Conversely, the sensitivity of the perception of the object increases when the shape, the size, the number, the color, the brightness, the position, the path and the like of the object change. Further, the sensitivity of the perception of the object further increases when the change of the shape, the size, the number, the color, the brightness, the position, the path, or the like of the object is discontinuous.

The embodiment of the invention is constructed by focusing on such a uniqueness of the perceptual characteristics of the human when viewing the object. In other words, at least one selected from the shape, the size, the number, the color, the brightness, the position, and the path of the display object 180 is changed to correspond to the state of the operated apparatus 510. Thereby, the information that is displayed by the display object 180 can be perceived with high sensitivity based on the temporal change of the display object 180 even without fixating on the display object 180. Thereby, the state of the vehicle 730 can be easily recognized in the state in which it is necessary to view the external environment image 340 with sufficient attention such as during the operation of the vehicle 730; and an efficient and safe operation of the vehicle 730 can be realized.

Then, from the desirable first state ST1 toward the undesirable second state ST2 of the operated apparatus 510, the state of the operated apparatus 510 can be intuitively ascertained by increasing the temporal change of at least one selected from the shape, the size, the number, the color, the brightness, the position, and the path of the display object 180. In other words, by using the first display object 180a which gives a sense of stability corresponding to the desirable first state ST1 of the operated apparatus 510 and the second display object 180b which gives a sense of instability corresponding to the undesirable second state ST2, the state of the operated apparatus 510 can be intuitively ascertained by the impression received from the display object 180 even without fixating on the display object 180.

For example, in the case where the second display object 180b which gives the sense of instability is displayed, utilizing the uniqueness relating to the perceptual characteristics of the human such as that recited above provides the effect of prompting an operation of the human viewer 100 to cause the first display object 180a which gives the sense of stability to be displayed. This effect is high because there is little sense of a burden on the human viewer 100 because the action of the human viewer 100 can be guided naturally and unconsciously because this effect is based on the uniqueness of the perceptual characteristics of the human recited above.

For example, in the case where the second display object 180b illustrated in FIG. 1G is displayed, the human viewer 100 implements the driving operation of the vehicle 730 such that the display object 180 approaches the first display object 180a illustrated in FIG. 1A as much as possible.

Thus, according to the display apparatus 10 according to the embodiment, the driving operation of the driver can be guided to reduce the characteristic value CV (e.g., to improve the fuel efficiency). Further, the burden on the driving operation of the operated apparatus 510 can be suppressed because the display object 180 can be easily recognized and because the state of the operated apparatus 510 represented by the display object 180 can be intuitively recognized.

For example, there are cases where a display apparatus of a music player or the like displays the spectrum of the sound and/or the intensity of the sound included in the sound of music that is played. Although it can be said that the display apparatus displays the state of the music player in such a case, no predetermined characteristic value is set in the music player; and the state of the music player is simply being displayed. Therefore, the human viewing the display apparatus cannot recognize any meaningful information from the display; and there is no effect of being prompted to execute some action by viewing the display.

Conversely, the predetermined characteristic value CV is set in the operated apparatus 510 of the display apparatus 10 according to the embodiment. Then, the display object 180 corresponding to the characteristic value CV is displayed. The display object 180 is changed to correspond to the magnitude of the characteristic value CV. In the specific example, at least one selected from the shape, the size, the number, the color, the brightness, the position, and the path of the display object 180 is changed. At this time, based on the uniqueness of the perceptual characteristics of the human, the change is controlled such that the sense of stability is perceived when the characteristic value CV is small and the sense of instability is perceived when the characteristic value CV is large. Thereby, the state of the operated apparatus 510 can be easily recognized. Further, the human viewer 100 viewing the display object 180 can be prompted naturally and unconsciously to operate the operated apparatus 510 toward a better state.

In the case where the characteristic value CV is the fuel efficiency, the characteristic value CV is calculated based on at least one of the vehicle information (e.g., the rotation speed, the temperature, and the like of the engine and/or the motor, the speed, the acceleration, the deceleration, etc., described above) that is acquired by the information acquisition unit 520; and the display object 180 recited above is controlled based on the characteristic value CV that is calculated. However, the embodiment is not limited thereto. The predetermined characteristic value CV may be one of the vehicle information that is acquired by the information acquisition unit 520. For example, the value of the acceleration of the vehicle 730 that is acquired by the information acquisition unit 520 as the vehicle information may be employed as the characteristic value CV.

For example, in the case where the characteristic value CV is calculated based on multiple vehicle information (first to nth vehicle information x1 to xn), the display object temporal change values Vt, e.g., the first to seventh temporal change values Vta to Vtg, can be expressed as functions of the characteristic value CV. Further, for example, the first to seventh temporal change values Vta to Vtg can be expressed as functions of the first to nth vehicle information x1 to xn. For example, the first to seventh temporal change values Vta to Vtg are determined based on the first to nth vehicle information x1 to xn by using a weighting operation applied to the first to nth vehicle information x1 to xn.

For example, in the case where the characteristic value CV relates to the fuel efficiency, an appropriate function corresponding to the fuel efficiency is set as the function recited above. In such a case, for example, the weighting operation applied to the vehicle information relating to the acceleration, the deceleration, the rotation speed of the engine and/or the motor, the state of the fuel, etc., of the first to nth vehicle information x1 to xn recited above is set to be large.

For example, in the case where the characteristic value CV relates to the livableness in the interior, the weighting operation applied to the vehicle information relating to the vibrations and/or the forces applied to the vehicle body and the interior, the sounds, etc., is set to be large.

Thus, a function of the vehicle information suited to the characteristic value CV is set. For example, the data relating to this function may be stored in a memory unit mounted inside the control unit 530. This function may have the format of a table illustrating the relationship between the characteristic value CV (and the first to nth vehicle information x1 to xn which is the vehicle information) and the display object temporal change values Vt (e.g., the first to seventh temporal change values Vta to Vtg); and such a table may be stored, for example, in a memory unit mounted inside the control unit 530.

For example, multiple characteristic values CV may be displayed as one display object 180. For example, the characteristic value relating to the fuel efficiency may be displayed as a change of the shape of the display object 180; and, for example, the characteristic value relating to the livableness in the interior may be displayed as the change of the color of the display object 180.

Also, the characteristic value relating to the fuel efficiency may be displayed as the change of the shape of the display object 180; and, for example, the characteristic value relating to the temperature in the interior may be displayed as the change of the color of the display object 180.

Thus, the combination of the characteristic value CV that is employed and the characteristic of the display object 180 that is changed is arbitrary.

FIG. 5A to FIG. 5L through FIG. 11A to FIG. 11L are schematic views illustrating other operations of the display apparatus according to the first embodiment.

Namely, FIG. 5A to FIG. 5F, FIG. 6A to FIG. 6F, FIG. 7A to FIG. 7F, FIG. 8A to FIG. 8F, FIG. 9A to FIG. 9F, FIG. 10A to FIG. 10F, and FIG. 11A to FIG. 11F illustrate the temporal change of the first display object 180a in the first state ST1. FIG. 5G to FIG. 5L, FIG. 6G to FIG. 6L, FIG. 7G to FIG. 7L, FIG. 8G to FIG. 8L, FIG. 9G to FIG. 9L, FIG. 10G to FIG. 10L, and FIG. 11G to FIG. 11L illustrate the temporal change of the second display object 180b in the second state ST2.

The elapsed time is the same between these drawings. In other words, these drawings illustrate the change of the display object with the passage of a constant amount of time.

In the specific example as shown in FIG. 5A to FIG. 5F, an image of a circle or a flattened circle is used as the first display object 180a; and the shape of the circle is changed to be laterally long and vertically long over time.

In the specific example as shown in FIG. 5G to FIG. 5L, an image of a circle or a flattened circle is used as the second display object 180b; the shape of the circle is changed to be laterally long and vertically long over time; and the degree of the temporal change of the shape is greater than that of the first display object 180a.

In the specific example as shown in FIG. 6A to FIG. 6F, an image of a circle or a flattened circle is used as the first display object 180*a*; and the shape of the circle is changed to be laterally long and vertically long over time.

In the specific example as shown in FIG. 6G to FIG. 6L, an image of a shape in which the recesses and protrusions of the outline are greater than those of the circle or the flattened circle is used as the second display object 180*b*; the shape is changed over time; and the temporal change of the shape is greater than that of the first display object 180*a*.

In the specific example as shown in FIG. 7A to FIG. 7F, an image of a circle is used as the first display object 180*a*; and the size of the circle is changed over time.

In the specific example as shown in FIG. 7G to FIG. 7L, an image of a circle is used as the second display object 180*b*; the size of the circle is changed over time; and the temporal change of the size is greater than that of the first display object 180*a*.

In the specific example as shown in FIG. 8A to FIG. 8F, an image of a circle is used as the first display object 180*a*; and the number of the circles is changed between three and four circles over time.

In the specific example as shown in FIG. 8G to FIG. 8L, an image of a circle is used as the second display object 180*b*; the number of the circles is changed between two and four circles over time; and the temporal change of the number is greater than that of the first display object 180*a*.

In the specific example as shown in FIG. 9A to FIG. 9F, an image of a circle is used as the first display object 180*a*; and at least one selected from the color and the brightness of the circle is changed over time.

In the specific example as shown in FIG. 9G to FIG. 9L, an image of a circle is used as the second display object 180*b*; at least one selected from the color and the brightness of the circle is changed over time; and the temporal change of the at least one selected from the color and the brightness is greater than that of the first display object 180*a*.

In the specific example as shown in FIG. 10A to FIG. 10F, an image of a circle is used as the first display object 180*a*; and the position of the circle is changed over time. In such a case, the circle moves within a width that is two times the diameter of the circle.

In the specific example as shown in FIG. 10G to FIG. 10L, an image of a circle is used as the second display object 180*b*; and the position of the circle is changed over time. In such a case, the circle moves within a width of four times the diameter of the circle. In other words, the temporal change of the position of the second display object 180*b* is greater than that of the first display object 180*a*.

In the specific example as shown in FIG. 11A to FIG. 11F, an image of a circle is used as the first display object 180*a*; and the circle moves along the first path 185*a* over time. In this example, the first path 185*a* has a straight line configuration inside the display image 330.

In the specific example as shown in FIG. 11G to FIG. 11L, an image of a circle is used as the second display object 180*b*; and the circle moves along the second path 185*b* over time. The second path 185*b* is wave-like inside the display image 330. The wave-like shape changes over time. In other words, the temporal change of the path of the second display object 180*b* is greater than that of the first display object 180*a*. In such a case, the temporal change of the position of the second display object 180*b* corresponds to being greater than that of the first display object 180*a*.

Thus, the temporal change of at least one selected from the shape, the size, the number, the color, the brightness, the position, and the path of the second display object 180*b* is set to be greater than that of the first display object 180*a*. Such a second display object 180*b* causes the human viewer 100 to perceive a relatively greater sense of instability than the first display object 180*a*. Also, the first display object 180*a* causes the human viewer 100 to perceive a relatively greater sense of stability than the second display object 180*b*.

Second Embodiment

The configuration of the display apparatus 11 according to a second embodiment of the invention may be similar to the display apparatus 10, and a description is therefore omitted. Operations of the display apparatus 11 will now be described.

Figure 12A:
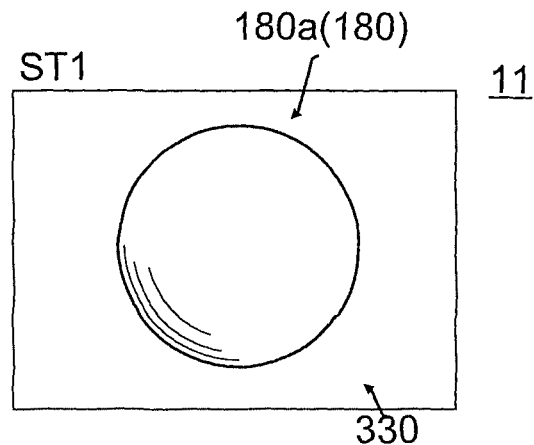
FIG. 12A to FIG. 12C are schematic views illustrating operations of a display apparatus according to a second embodiment.
Figure 12B:
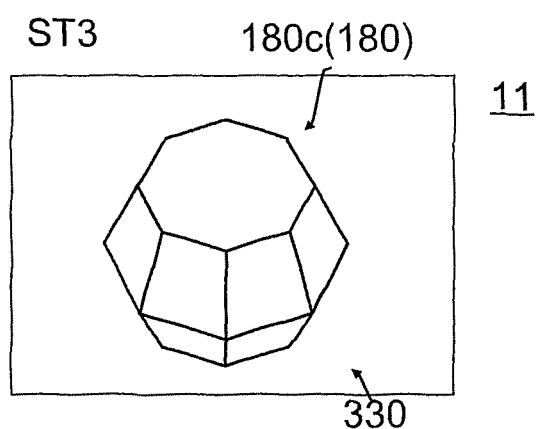
Figure 12C:
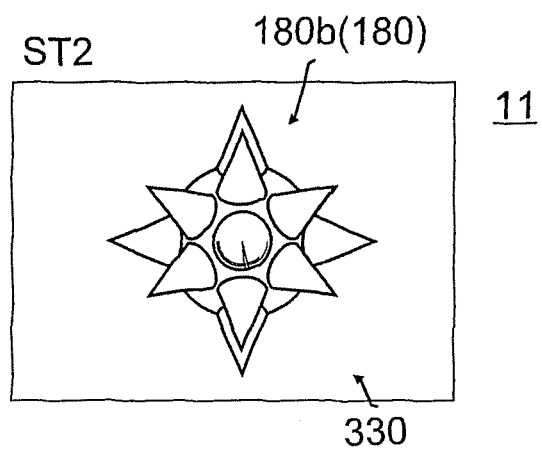
Figure 13A:
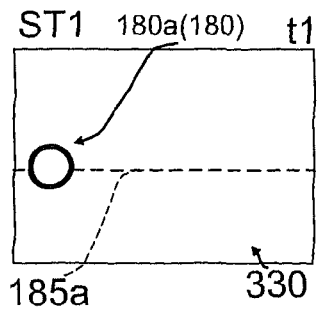
FIG. 13A to FIG. 13L are schematic views illustrating another operation of the display apparatus according to the second embodiment.
Figure 13B:
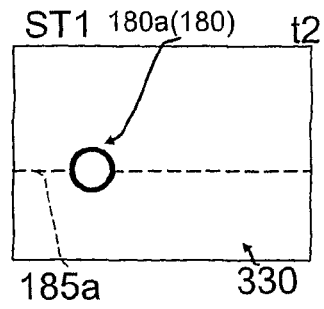
Figure 13C:
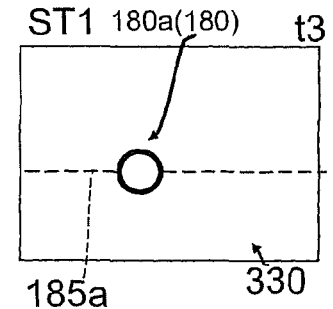
Figure 13D:
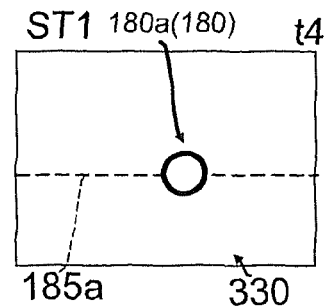
Figure 13E:
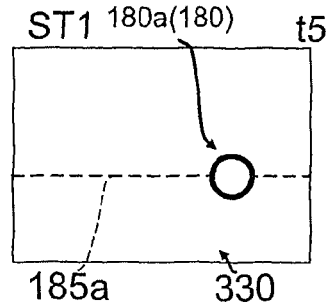
Figure 13F:
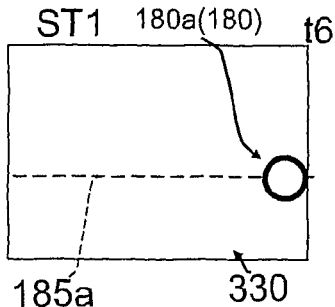
Figure 13G:
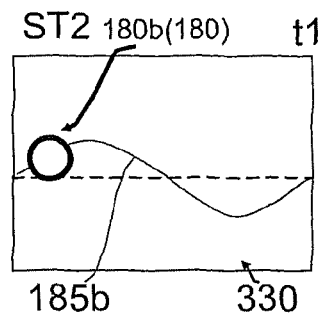
Figure 13H:
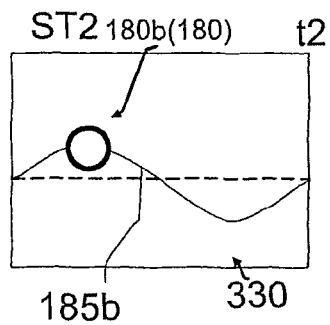
Figure 13I:
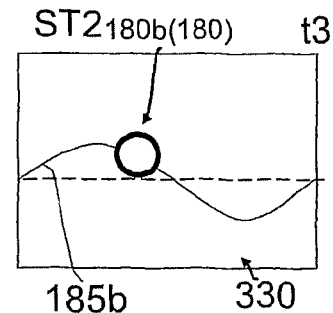
Figure 13J:
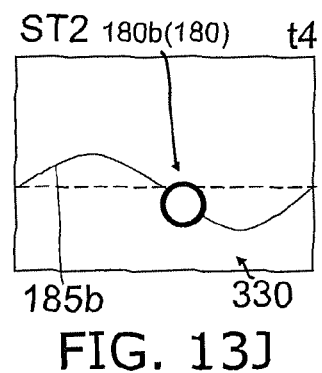
Figure 13K:
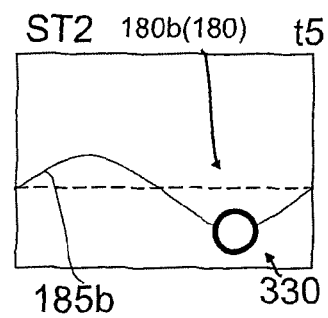
Figure 13L:
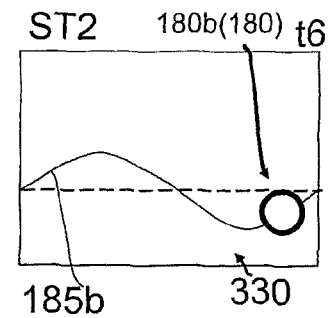
Figure 14A:
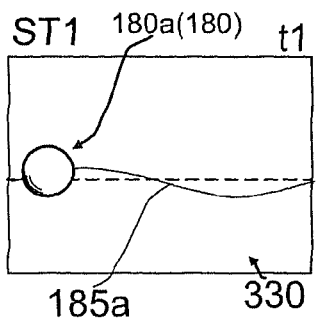
FIG. 14A to FIG. 14L are schematic views illustrating another operation of the display apparatus according to the second embodiment.
Figure 14B:
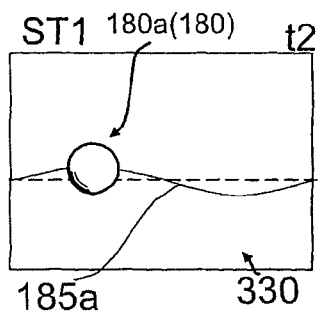
Figure 14C:
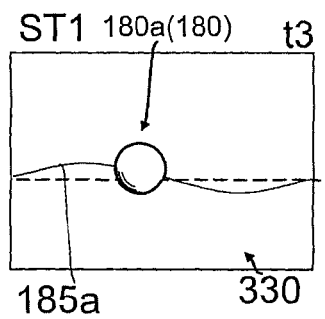
Figure 14D:
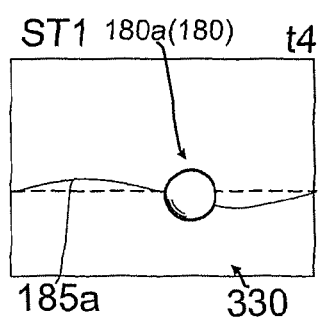
Figure 14E:
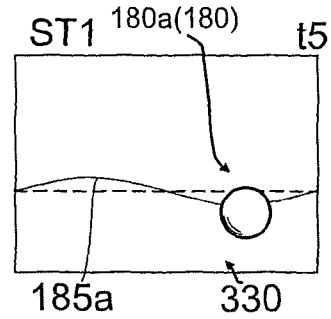
Figure 14F:
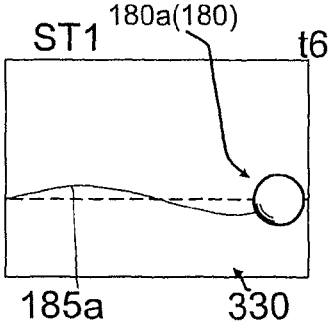
Figure 14G:
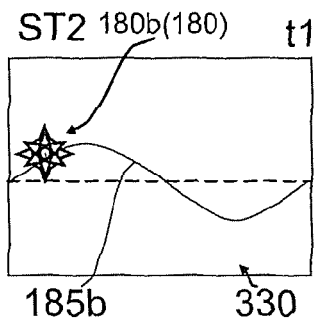
Figure 14H:
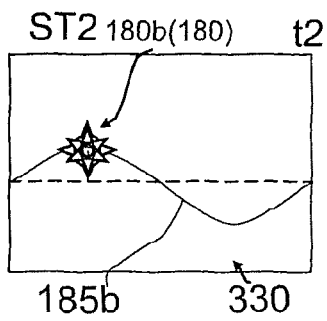
Figure 14I:
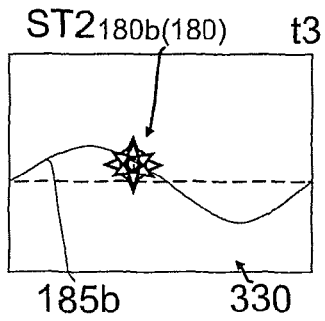
Figure 14J:
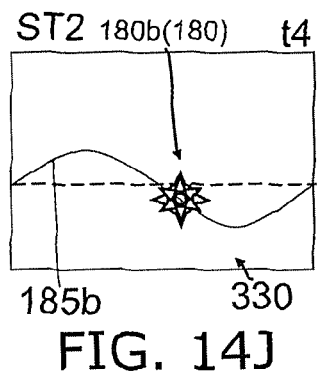
Figure 14K:
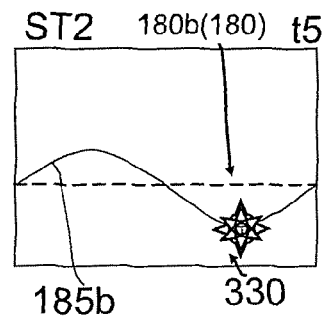
Figure 14L:
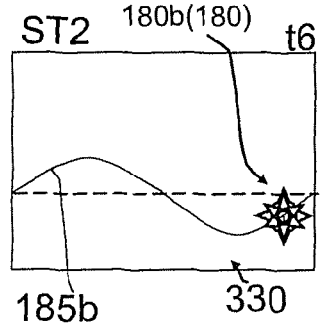
Figure 15A:
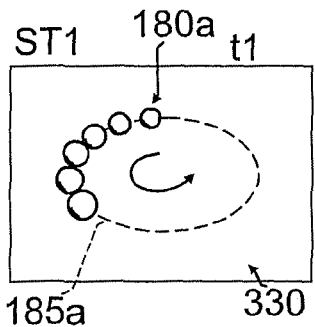
FIG. 15A to FIG. 15L are schematic views illustrating another operation of the display apparatus according to the second embodiment.
Figure 15B:
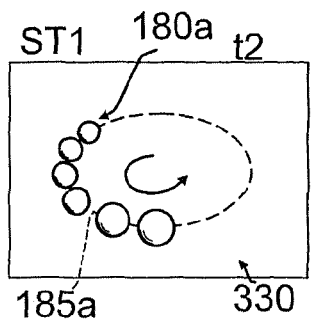
Figure 15C:
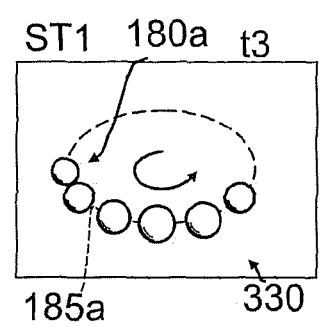
Figure 15D:
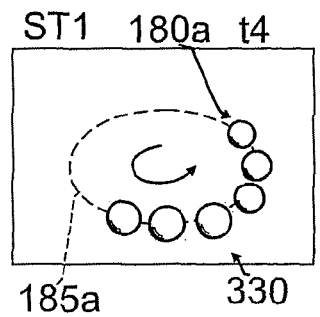
Figure 15E:
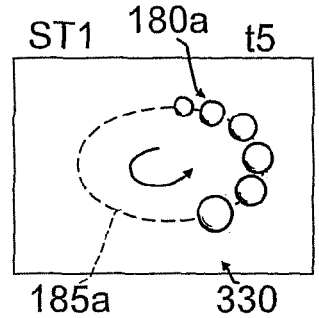
Figure 15F:
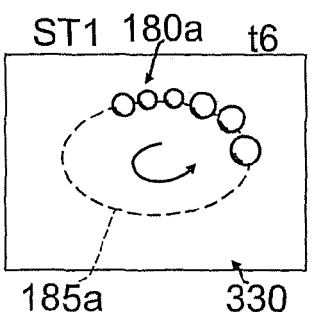
Figure 15G:
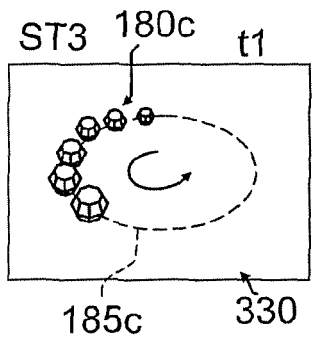
Figure 15H:
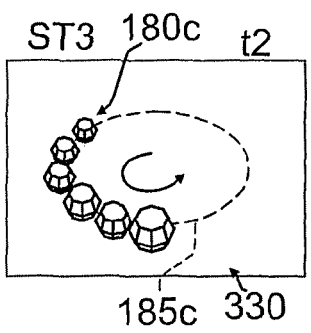
Figure 15I:
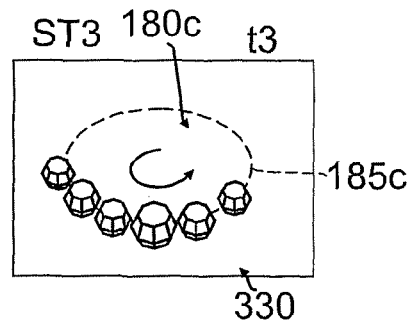
Figure 15J:
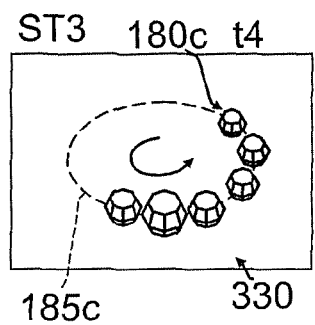
Figure 15K:
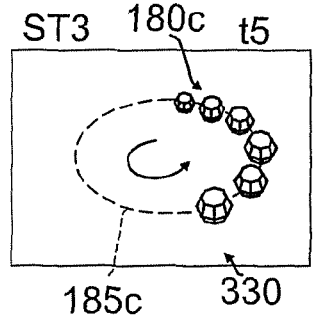
Figure 15L:
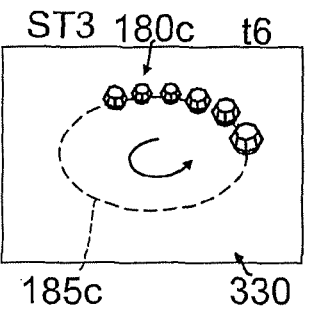
Figure 16A:
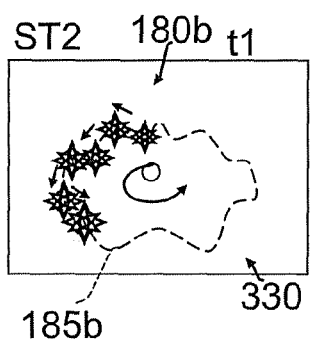
FIG. 16A to FIG. 16F are schematic views illustrating the operation of the display apparatus according to the second embodiment.
Figure 16B:
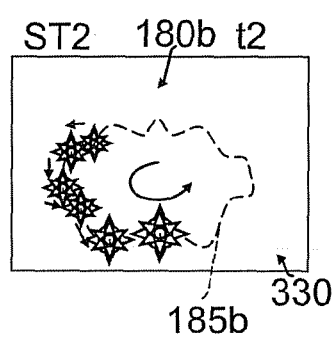
Figure 16C:
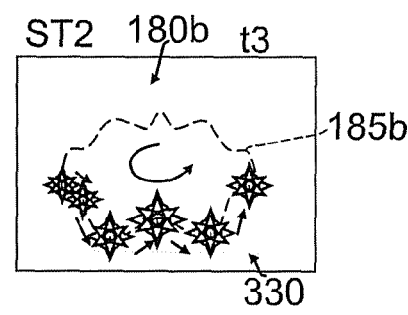
Figure 16D:
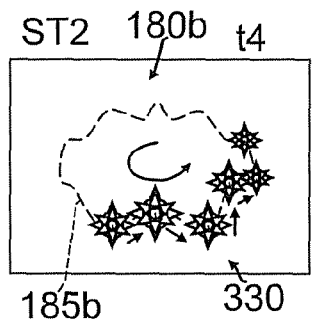
Figure 16E:
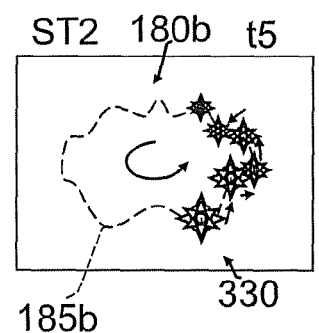
Figure 16F:
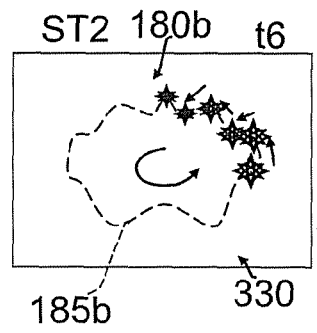

FIG. 12A to FIG. 12C are schematic views illustrating operations of the display apparatus according to the second embodiment.

Namely, FIG. 12A illustrates the first display object 180*a* corresponding to the first state ST1 of the display apparatus 11; and FIG. 12C illustrates the second display object 180*b* corresponding to the second state ST2. Further, in the specific example, a third state ST3 is set between the first state ST1 and the second state ST2; and FIG. 12B illustrates a third display object 180*c* corresponding to the third state ST3. The third state ST3 and the third display object 180*c* may be provided if necessary and are omissible.

These drawings illustrate the display states of the display apparatus 11 at some time.

In the specific example as illustrated in FIG. 12A, an image of a sphere is used as the first display object 180*a*. On the other hand, as illustrated in FIG. 12C, an image having a three-dimensional configuration including protrusions is used as the second display object 180*b*. Thus, the recesses and protrusions of the shape of the second display object 180*b* are greater than the recesses and protrusions of the shape of the first display object 180*a*.

As illustrated in FIG. 12B, a polyhedral configuration having planes at the surface is used as the third display object 180*c*. Thus, the recesses and protrusions of the shape of the third display object 180*c* are greater than the recesses and protrusions of the shape of the first display object 180*a* and less than the recesses and protrusions of the shape of the second display object 180*b*. Thus, the recesses and protrusions of the display object 180 increase from the first display object 180*a* through the third display object 180*c* toward the second display object 180*b*.

Thus, according to experiments of the inventor, the second display object 180*b* which has large recesses and protrusions gives a sense of instability to the human viewer 100; and the first display object 180*a* which has small recesses and protrusions gives a sense of stability to the human viewer. The third display object 180*c* which has recesses and protrusions that are greater than those of the first display object 180*a* which has small recesses and protrusions gives a sense of instability to the human viewer 100; and the second display object 180*b* which has recesses and protrusions even greater than those of the third display object 180*c* gives even more of a sense of instability to the human viewer 100.

It is considered that the second display object 180*b* which has protrusions having spiny configurations gives a dangerous impression to the human, and as a result, gives the greatest sense of instability. On the other hand, the entire first display object 180*a* has a rounded configuration and gives a soft and safe impression to the human. The corners and the sides of the polyhedron of the polyhedral third display object 180*c* give a hard impression and give a more dangerous and unstable impression than the round first display object 180*a*. Thus, the configuration of the display object 180 in which the recesses and protrusions are large and sharp gives a dangerous and unstable impression; and the rounded configuration having few recesses and protrusions gives a safe and stable impression.

In other words, even in the case where the display object does not temporally change, the human viewer 100 perceives more of a sense of instability as the recesses and protrusions of the shape of the display object increase.

The safe and stable impression in the case where the configuration of the object has small recesses and protrusions and the dangerous and unstable impression in the case where the configuration of the object has large recesses and protrusions are applied, for example, in designs of clothes, accessories, industrial goods, etc. For example, this matches cases where rounded designs are suited to clothes, accessories, products, etc., for small children and cases where designs that are linear and have sharp recesses and protrusions are suited to clothes, accessories, and products for adults.

The relationship between the color and the sense of instability relating to the perceptual characteristics that affect vision are somewhat known; and this relationship also is applied to industrial goods, etc. In other words, colors such as green, blue, and the like give a sense of relative stability and calmness to the human viewer 100. On the other hand, yellow and red put the human viewer 100 in a state of instability, danger, and excitement. This characteristic is utilized, for example, when green, yellow, and red are used as the colors of a traffic signal, when yellow and/or red is displayed at dangerous locations of electrical products, or when, for example, switches and the like are colored according to the characteristics of the switches.

On the other hand, applications of the effect of the shape of the object on the human viewer 100 have been limited to the field of designs of clothes, accessories, and products and have not been applied to the control of the operation of the operated apparatus 510.

The embodiment focuses on the uniqueness of the perceptual characteristics of the human relating to the size of the recesses and protrusions of the configuration of the object and the impression received by the human viewer 100 viewing the object, and actively applies this uniqueness to guide the human viewer 100 to operate the operated apparatus 510 in a more efficient, safe, and favorable state.

In other words, the human viewer 100 perceives a sense of stability or a sense of instability due to the recesses and protrusions of the shape of the display object 180 even in the case where the shape does not temporally change. Thus, the configuration of the embodiment was constructed based on the perceptual characteristics of changes of the degree of the sense of stability perceived by the human according to the size of the recesses and protrusions of the shape.

The predetermined characteristic value CV of the operated apparatus 510 is correlated with the sense of instability given to the human by the recesses and protrusions of the shape of the display object 180.

The degree at which the human viewer 100 is given the sense of instability increases from the sense of stability in order of the first display object 180*a*, the third display object 180*c*, and the second display object 180*b* illustrated in FIG. 12A to FIG. 12C. Therefore, the state of the operated apparatus 510 can be intuitively recognized when these display objects 180 are viewed.

Thereby, the information that is displayed by the display object 180 can be perceived with high sensitivity based on the recesses and protrusions of the shape of the display object 180 even without fixating on the display object 180. Thereby, the state of the vehicle 730 can be easily recognized in the state in which it is necessary to view the external environment image 340 with sufficient attention such as during the operation of the vehicle 730; and an efficient and safe operation of the vehicle 730 can be realized.

Then, the state of the operated apparatus 510 can be intuitively ascertained by increasing the recesses and protrusions of the shape of the display object 180 from the desirable first state ST1 of the operated apparatus 510 toward the undesirable second state ST2. In other words, the state of the operated apparatus 510 can be intuitively ascertained by the impression received from the display object 180 even without fixating on the display object 180 by the desirable first state ST1 of the operated apparatus 510 corresponding to the first display object 180*a* which gives the sense of stability and by the undesirable second state ST2 corresponding to the second display object 180*b* which gives the sense of instability.

By utilizing the uniqueness relating to the perceptual characteristics of the human when the second display object 180*b* which gives the sense of instability is displayed, the embodiment provides the effect of prompting an operation of the human viewer 100 to cause the first display object 180*a* which gives the sense of stability to be displayed. Because this effect is based on the uniqueness of the perceptual characteristics of the human recited above, the human viewer 100 has little sense of a burden.

For example, in the case where the second display object 180*b* illustrated in FIG. 12C is displayed, the human viewer 100 implements a driving operation of the vehicle 730 such that the display object 180 approaches the first display object 180*a* illustrated in FIG. 12A as much as possible.

Figure 6A:
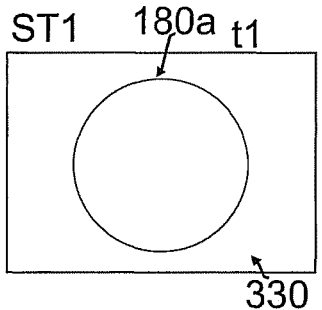
FIG. 6A to FIG. 6L are schematic views illustrating other operations of the display apparatus according to the first embodiment.
Figure 6B:
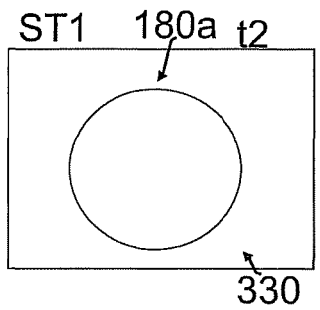
Figure 6C:
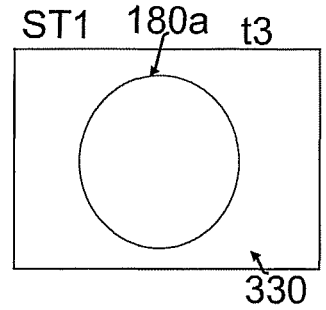
Figure 6D:
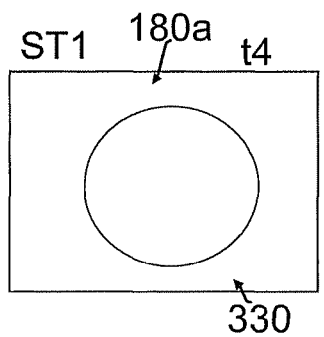
Figure 6E:
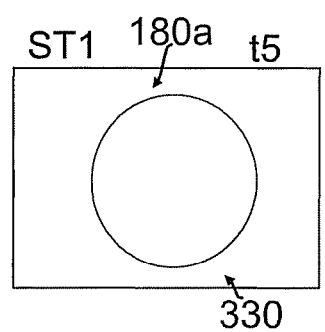
Figure 6F:
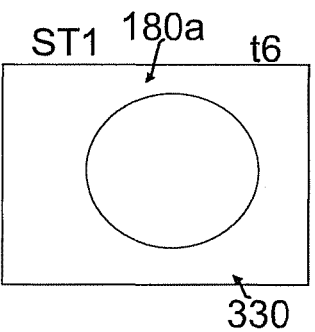
Figure 6G:
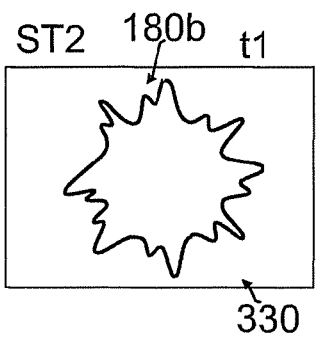
Figure 6H:
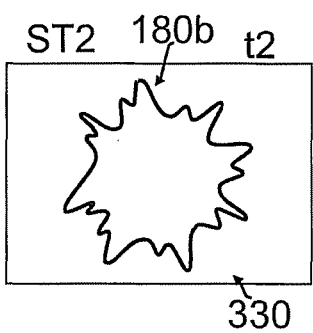
Figure 6I:
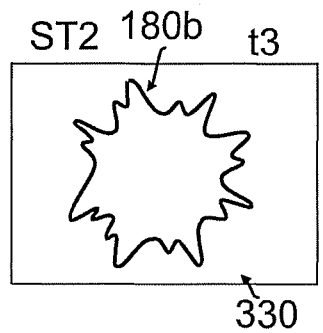
Figure 6J:
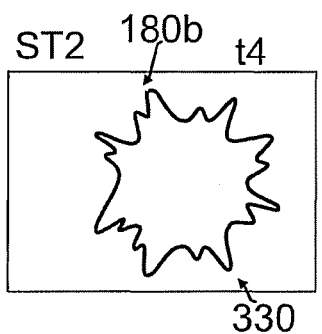
Figure 6K:
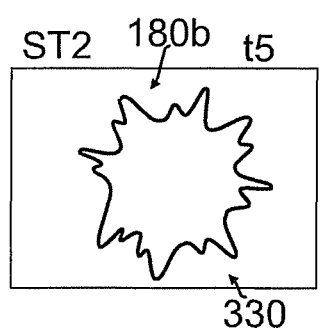
Figure 6L:
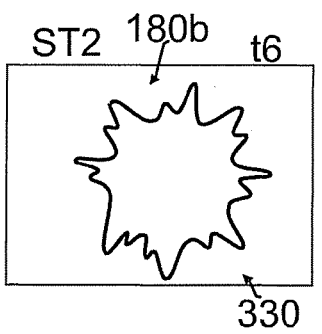
Figure 7A:
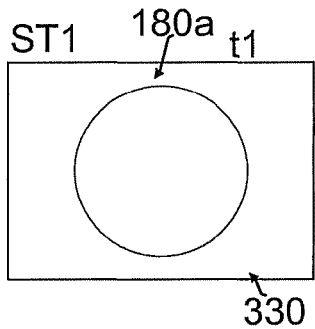
FIG. 7A to FIG. 7L are schematic views illustrating other operations of the display apparatus according to the first embodiment.
Figure 7B:
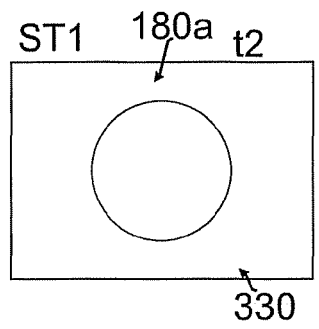
Figure 7C:
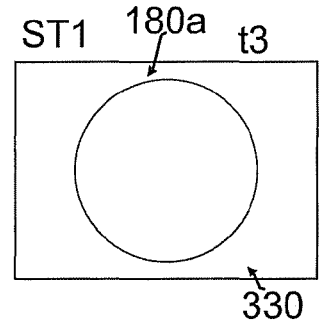
Figure 7D:
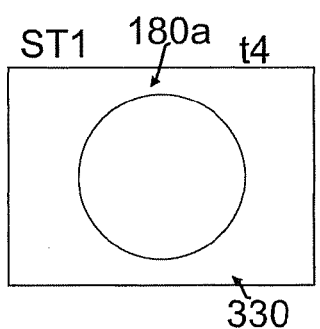
Figure 7E:
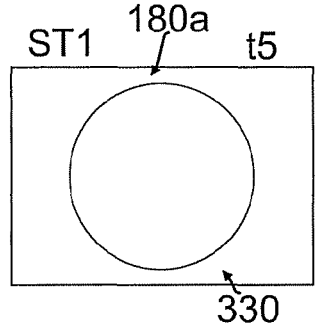
Figure 7F:
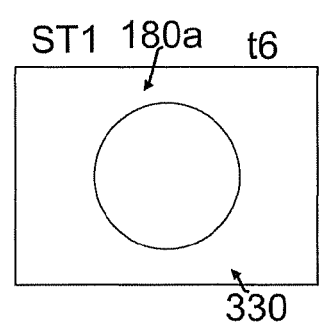
Figure 7G:
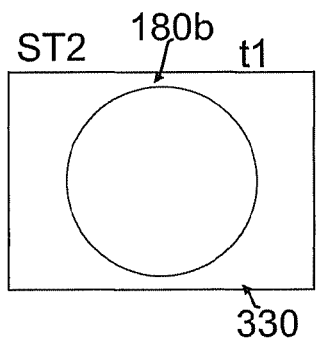
Figure 7H:
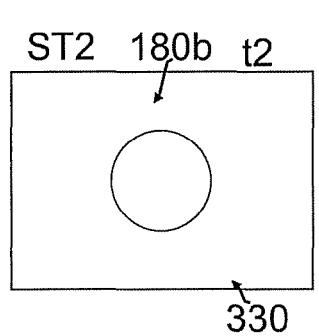
Figure 7I:
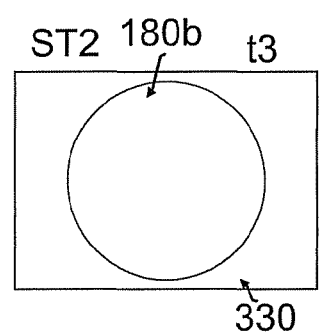
Figure 7J:
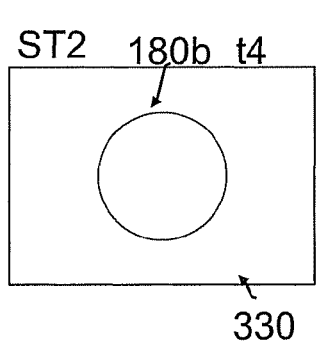
Figure 7K:
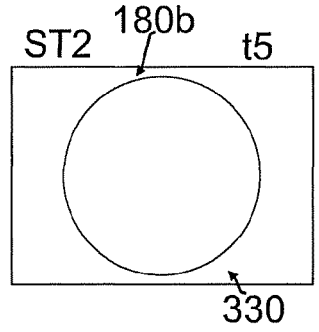
Figure 7L:
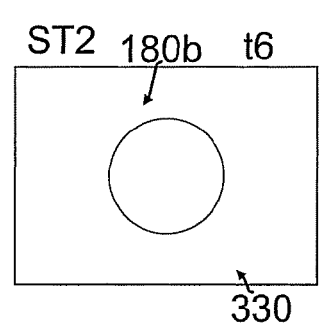
Figure 8A:
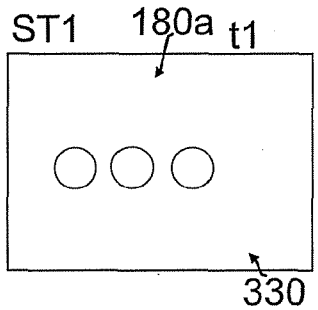
FIG. 8A to FIG. 8L are schematic views illustrating other operations of the display apparatus according to the first embodiment.
Figure 8B:
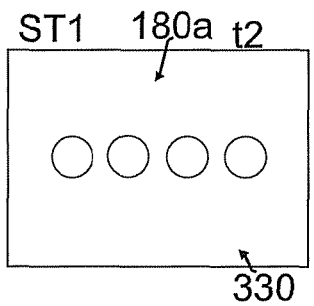
Figure 8C:
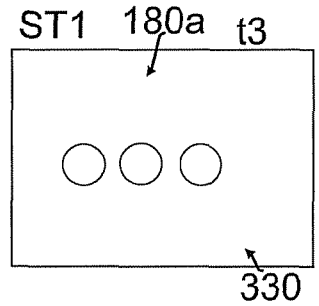
Figure 8D:
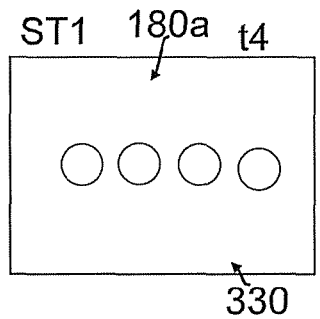
Figure 8E:
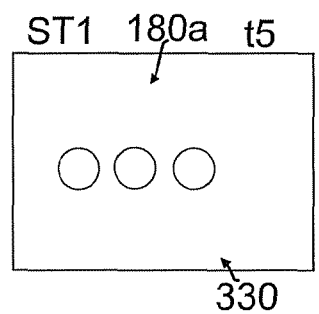
Figure 8F:
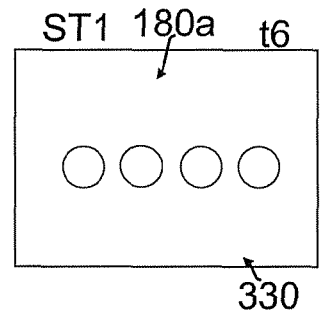
Figure 8G:
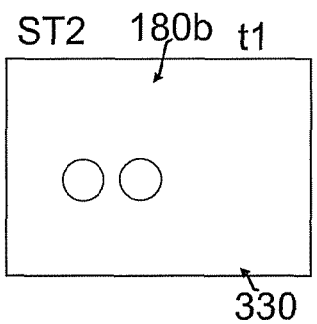
Figure 8H:
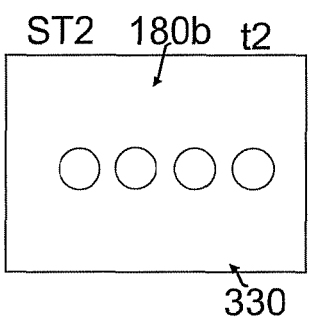
Figure 8I:
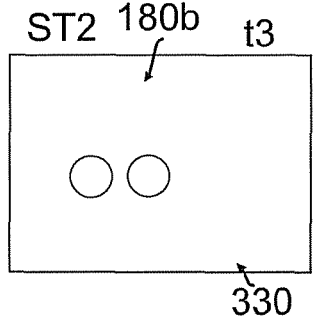
Figure 8J:
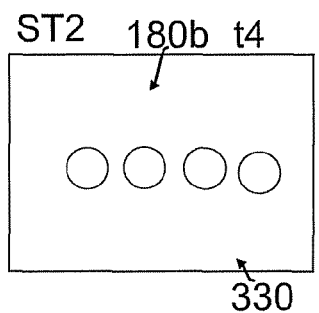
Figure 8K:
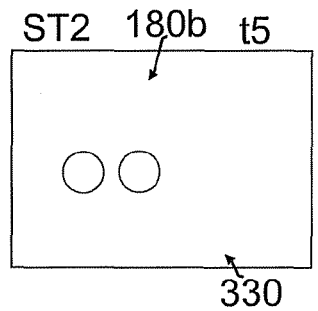
Figure 8L:
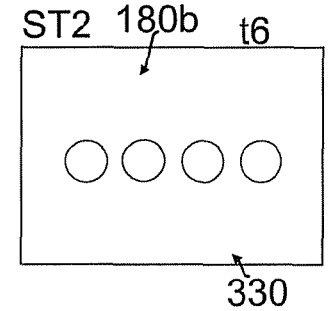
Figure 9A:
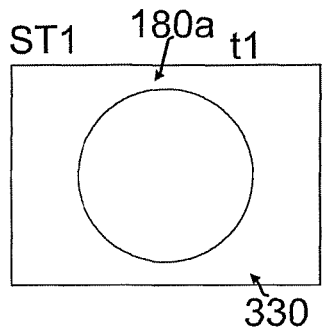
FIG. 9A to FIG. 9L are schematic views illustrating other operations of the display apparatus according to the first embodiment.
Figure 9B:
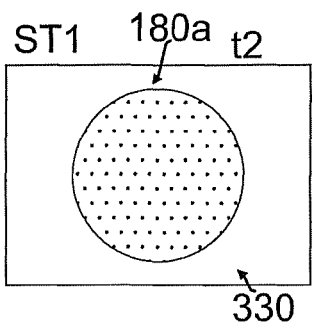
Figure 9C:
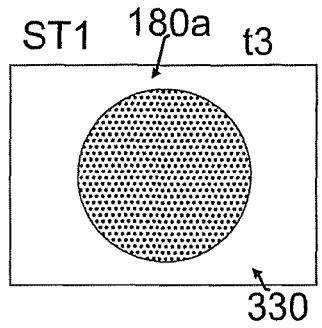
Figure 9D:
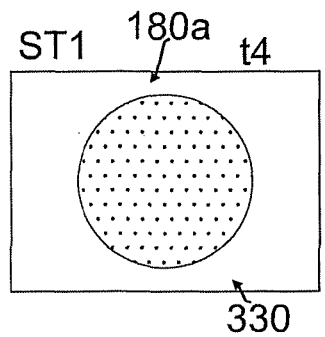
Figure 9E:
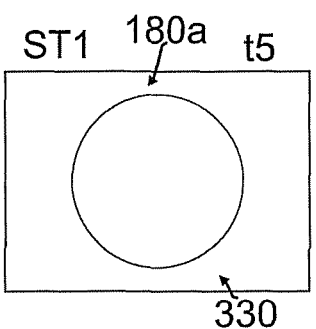
Figure 9F:
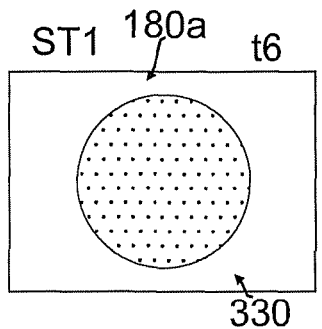
Figure 9G:
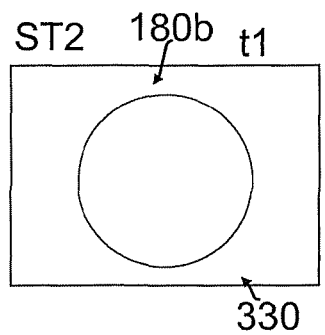
Figure 9H:
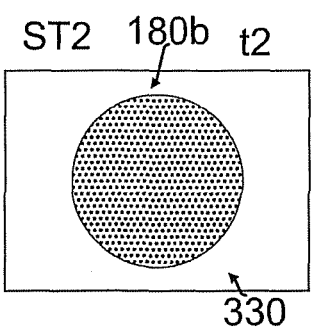
Figure 9I:
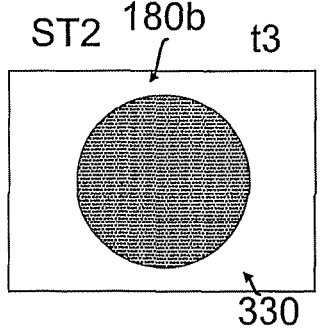
Figure 9J:
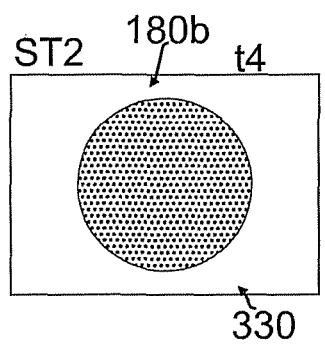
Figure 9K:
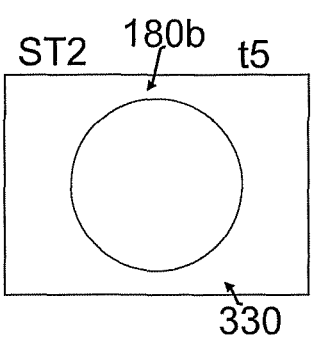
Figure 9L:
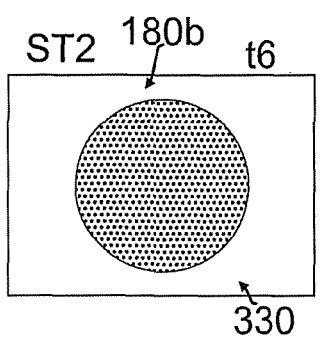
Figure 10A:
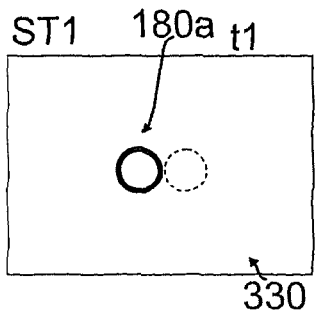
FIG. 10A to FIG. 10L are schematic views illustrating other operations of the display apparatus according to the first embodiment.
Figure 10B:
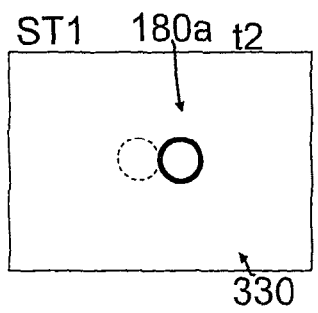
Figure 10C:
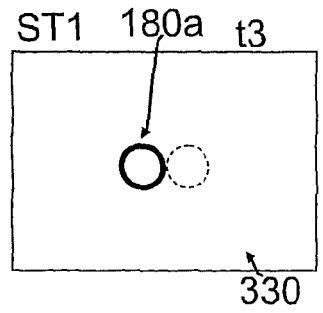
Figure 10D:
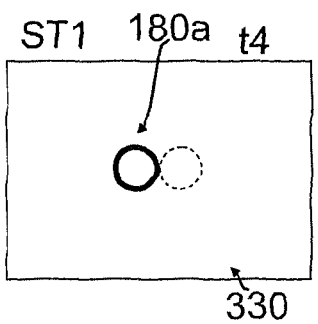
Figure 10E:
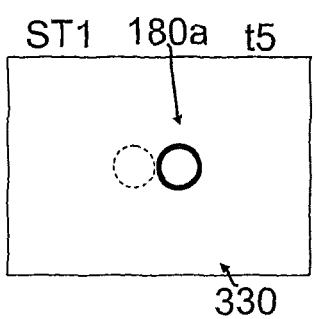
Figure 10F:
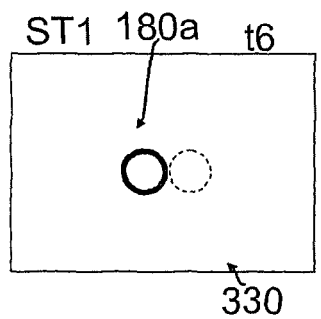
Figure 10G:
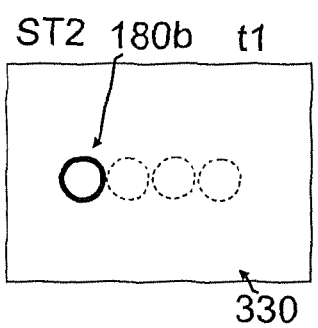
Figure 10H:
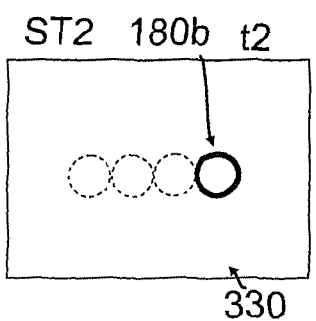
Figure 10I:
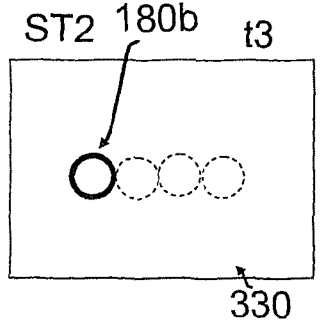
Figure 10J:
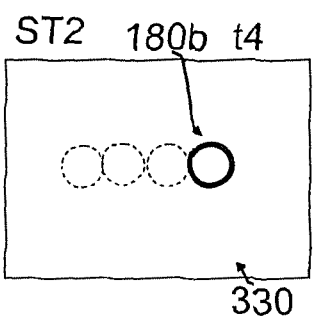
Figure 10K:
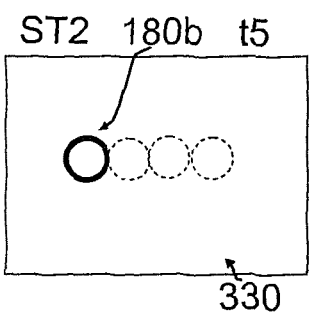
Figure 10L:
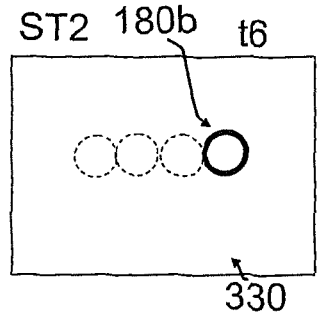
Figure 11A:
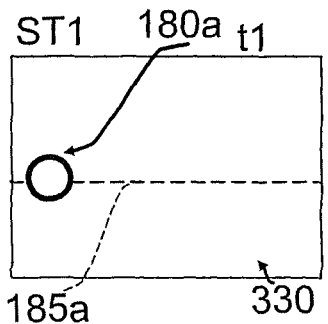
FIG. 11A to FIG. 11L are schematic views illustrating other operations of the display apparatus according to the first embodiment.
Figure 11B:
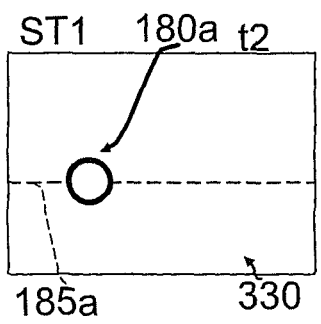
Figure 11C:
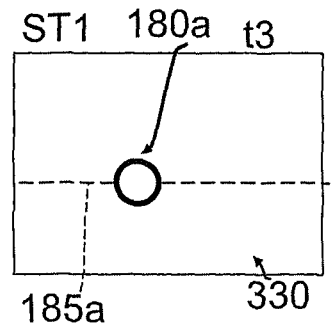
Figure 11D:
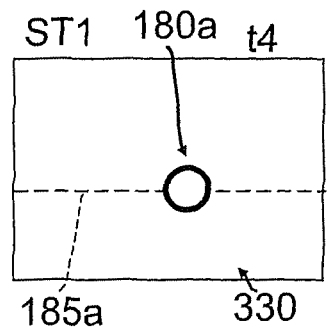
Figure 11E:
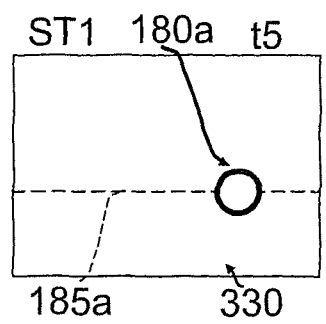
Figure 11F:
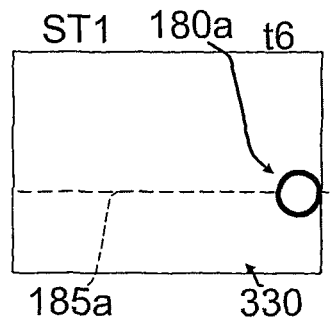
Figure 11G:
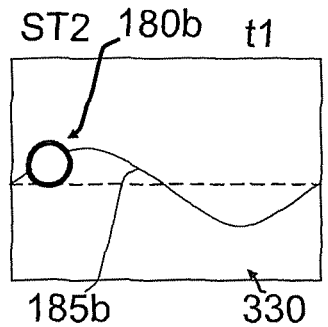
Figure 11H:
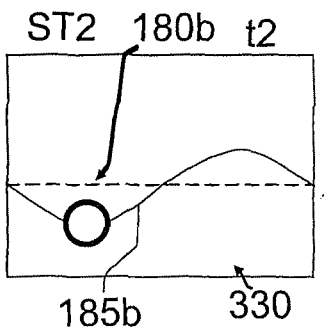
Figure 11I:
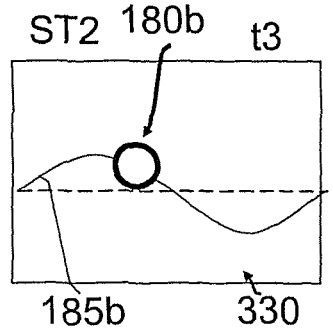
Figure 11J:
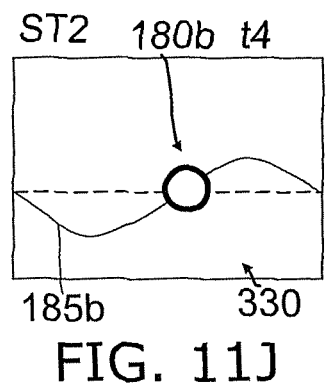
Figure 11K:
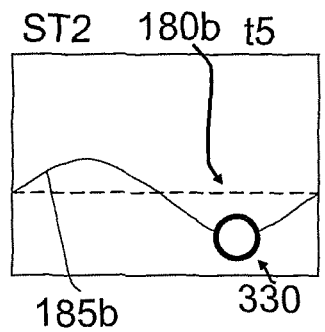
Figure 11L:
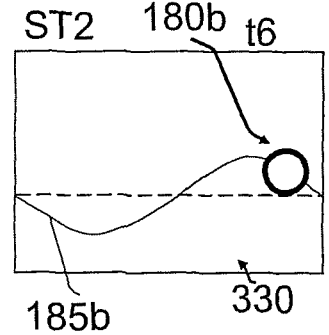

Although the case is described as an example in which the shape of the second display object 180*b* described in regard to FIG. 6G to FIG. 6L temporally changes, for example, the recesses and protrusions of the shape illustrated in FIG. 6G are greater than those of the shapes of the first display objects 180*a* illustrated in FIG. 6A to FIG. 6F. Accordingly, even in the case where the shape of the second display object 180*b* illustrated in FIG. 6G is displayed as a fixed pattern, the human viewer 100 viewing the fixed pattern perceives, for example, a sense of instability that is greater than when viewing the first display object 180*a* illustrated in FIG. 6A.

Also, for example, the color of the second display object 180*b* may be a reddish color; and the color of the first display object 180*a* may be a bluish or greenish color. The color of the third display object 180*c* may be a yellowish color.

Thus, the dominant wavelength of the color included in the second display object 180*b* may be set to be shorter than the dominant wavelength of the color included in the first display object 180*a*.

For example, the human perceives a sense of stability for a bluish or greenish color and perceives a sense of instability for a yellowish and/or reddish color. By utilizing this effect, the state of the operated apparatus 510 can be recognized more easily by using the first display object 180*a* and the second display object 180*b*.

FIG. 13A to FIG. 13L are schematic views illustrating another operation of the display apparatus according to the second embodiment.

Namely, FIG. 13A to FIG. 13F illustrate the temporal change of the first display object 180*a* in the first state ST1. FIG. 13G to FIG. 13L illustrate the temporal change of the second display object 180*b* in the second state ST2. The elapsed time is the same between these drawings. In other words, these drawings illustrate the change of the display object with the passage of a constant amount of time.

In the specific example as shown in FIG. 13A to FIG. 13F, an image of a circle is used as the first display object 180*a*; and the circle moves along the first path 185*a* over time. In this example, the first path 185*a* has a straight line configuration inside the display image 330.

In the specific example as shown in FIG. 13G to FIG. 13L, an image of a circle is used as the second display object 180b; and the circle moves along the wave-like second path 185b over time. The wave-like second path 185b does not temporally change and is constant. In such a case, the path does not temporally change; and the recesses and protrusions of the path of the second display object 180b are greater than those of the first display object 180a.

Comparing the first display object 180a which has small recesses and protrusions of the path to the second display object 180b which has recesses and protrusions of the path that are greater than those of the first display object 180a, the second display object 180b causes the human viewer 100 to perceive more of an uneasiness.

Thus, the control unit 530 generates the image data relating to the first display object 180a and the second display object 180b; and at least one selected from the recesses and protrusions of the shape and the recesses and protrusions of the path of the second display object 180b can be set to be different from that of the first display object 180a (specifically, greater than that of the first display object 180a). Thereby, the state of the operated apparatus 510 can be easily recognized.

In the example shown in FIG. 13A to FIG. 13L, the temporal change of the position of the second display object 180b can be considered to be greater than that of the first display object 180a. Further, in the example shown in FIG. 13A to FIG. 13L, in the case where the display object 180 moves at a relatively fast speed along the path, the entire continuous movement of the display object 180 along the path can be considered to be the display object 180; and in such a case, the difference of the recesses and protrusions of the path of the display object 180 can be considered to be the difference of the recesses and protrusions of the shape of the display object 180.

The first embodiment and the second embodiment may be implemented in combination. In other words, at least one selected from the recesses and protrusions of the shape and the recesses and protrusions of the path of the second display object 180b may be set to be greater than that of the first display object 180a while setting the temporal change of at least one selected from the shape, the size, the number, the color, the brightness, the position, and the path of the second display object 180b to be greater than that of the first display object 180a. In other words, any combination of the controls recited above relating to the display object 180 may be implemented. The color of the display object 180 also may be changed.

FIG. 14A to FIG. 14L are schematic views illustrating another operation of the display apparatus according to the second embodiment.

Namely, FIG. 14A to FIG. 14F illustrate the temporal change of the first display object 180a in the first state ST1. FIG. 14G to FIG. 14L illustrate the temporal change of the second display object 180b in the second state ST2. The elapsed time is the same between these drawings. In other words, these drawings illustrate the change of the display object with the passage of a constant amount of time.

In the specific example as shown in FIG. 14A to FIG. 14F, an image of a sphere is used as the first display object 180a; and the sphere moves along the first path 185a over time. In this example, the first path 185a has a wave-like configuration with a small amplitude inside the display image 330. The first display object 180a is green.

In the specific example as shown in FIG. 14G to FIG. 14L, the image illustrated in FIG. 12C having the three-dimensional configuration including protrusions is used as the second display object 180b; and the three-dimensional configuration moves along the second path 185b over time. The second path 185b has a wave-like configuration with an amplitude larger than that of the first path. The second display object 180b is red.

In other words, in the specific example, the temporal change of the position of the second display object 180b is greater than that of the first display object 180a; and the recesses and protrusions of the shape and the recesses and protrusions of the path of the second display object 180b are greater than those of the first display object 180a. The dominant wavelength of the color included in the second display object 180b is shorter than the dominant wavelength of the color included in the first display object 180a.

Thereby, the second display object 180b causes the human viewer 100 to perceive more of a sense of instability than the first display object 180a.

FIG. 15A to FIG. 15L are schematic views illustrating another operation of the display apparatus according to the second embodiment.

FIG. 16A to FIG. 16F are schematic views illustrating the operation of the display apparatus according to the second embodiment.

Namely, FIG. 15A to FIG. 15F illustrate the temporal change of the first display object 180a in the first state ST1. FIG. 15G to FIG. 15L illustrate the temporal change of the third display object 180c in the third state ST3. FIG. 16A to FIG. 16F illustrate the temporal change of the second display object 180b in the second state ST2. The elapsed time is the same between these drawings. In other words, these drawings illustrate the change of the display object with the passage of a constant amount of time.

In the specific example as shown in FIG. 15A to FIG. 15F, an image of a sphere is used as the first display object 180a; and the sphere moves along the first path 185a over time. In this example, the first path 185a is an ellipse inside the display image 330. The size of the sphere of the first display object 180a is large in the lower portion of the display image 330 and is relatively smaller in the upper portion than in the lower portion. Therefore, such a first display object 180a causes the human viewer 100 to perceive a sense of depth. The first display object 180a is green.

In the specific example as shown in FIG. 15G to FIG. 15L, the image illustrated in FIG. 12B having the polyhedral configuration having planes at the surface is used as the third display object 180c. This polyhedron moves along a third path 185c over time. In this example, the third path 185c is substantially similar to the first path 185a of the first display object 180a. In such a case as well, the size of the polyhedron of the first display object 180a is large in the lower portion of the display image 330 and is relatively smaller in the upper portion than in the lower portion. Thereby, a sense of depth is perceived. The third display object 180c is yellow. Thus, the recesses and protrusions of the shape of the third display object 180c are greater than those of the first display object 180a. The dominant wavelength of the color of the third display object 180c is longer than that of the first display object 180a.

In the specific example as shown in FIG. 16A to FIG. 16F, the image illustrated in FIG. 12C having the three-dimensional configuration including the protrusions is used as the second display object 180b. This three-dimensional shape moves along the second path 185b over time. In this example, the second path 185b has an elliptical configuration and a configuration in which a wave-like configuration oscillates in a direction crossing the elliptical path. In such a case as well, the size of the three-dimensional shape of the first display object 180a is large in the lower portion of the display image 330 and is relatively smaller in the upper portion than in the lower portion. Thereby, a sense of depth is perceived. The second display object 180*b* is red. Thus, the recesses and protrusions of the shape of the second display object 180*b* are greater than those of the first display object 180*a* and the third display object 180*c*. The recesses and protrusions of the path of the second display object 180*b* are greater than those of the first display object 180*a* and the third display object 180*c*. The temporal change of the position of the second display object 180*b* is greater than those of the first display object 180*a* and the third display object 180*c*. The dominant wavelength of the color of the second display object 180*b* is longer than those of the first display object 180*a* and the third display object 180*c*.

The state of the operated apparatus 510 can be easily recognized by using such a first display object 180*a* and such a second display object 180*b*.

Figure 17A:
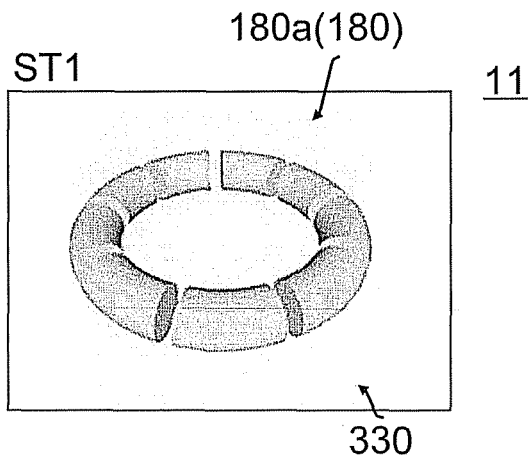
FIG. 17A to FIG. 17C are schematic views illustrating another operation of the display apparatus according to the second embodiment.
Figure 17B:
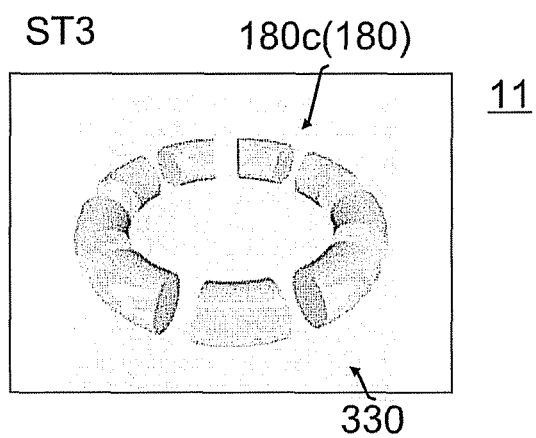
Figure 17C:
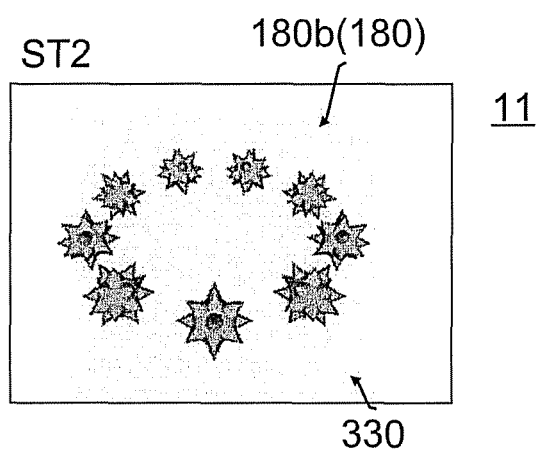

FIG. 17A to FIG. 17C are schematic views illustrating another operation of the display apparatus according to the second embodiment.

Namely, FIG. 17A illustrates the first display object 180*a* corresponding to the first state ST1 of the display apparatus 11; and FIG. 17C illustrates the second display object 180*b* corresponding to the second state ST2. In the specific example, the third state ST3 is set between the first state ST1 and the second state ST2; and FIG. 17B illustrates the third display object 180*c* corresponding to the third state ST3. The third state ST3 and the third display object 180*c* may be provided if necessary and are omissible.

These drawings illustrate the display state of the display apparatus 11 at some time.

In the specific example as illustrated in FIG. 17A, an image having a circular ring-shaped pipe configuration is used as the first display object 180*a*. For example, the first display object 180*a* is green.

As illustrated in FIG. 17C, an image having a three-dimensional configuration including protrusions is used as the second display object 180*b*. Thus, the recesses and protrusions of the shape of the second display object 180*b* are greater than the recesses and protrusions of the shape of the first display object 180*a*. For example, the second display object 180*b* is red.

As illustrated in FIG. 12B, an image having a circular ring-shaped pipe configuration is used as the third display object 180*c*. For example, the third display object 180*c* is yellow.

By using the display object 180 having such a configuration as well, the state of the operated apparatus 510 can be easily recognized.

Figure 18A:
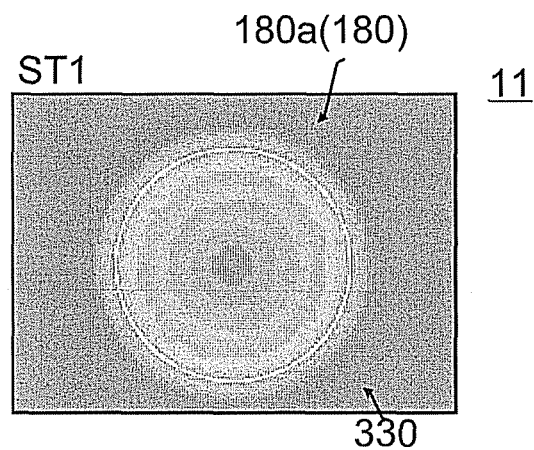
FIG. 18A to FIG. 18C are schematic views illustrating another operation of the display apparatus according to the second embodiment.
Figure 18B:
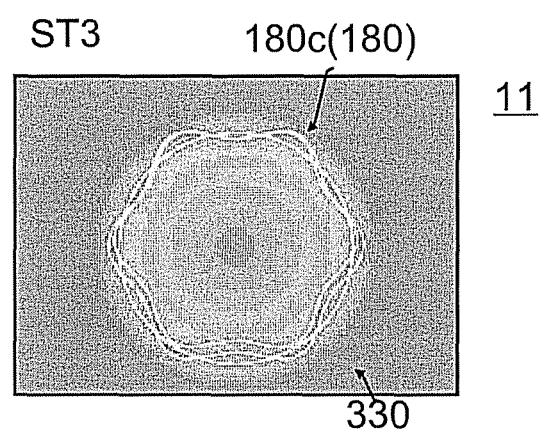
Figure 18C:
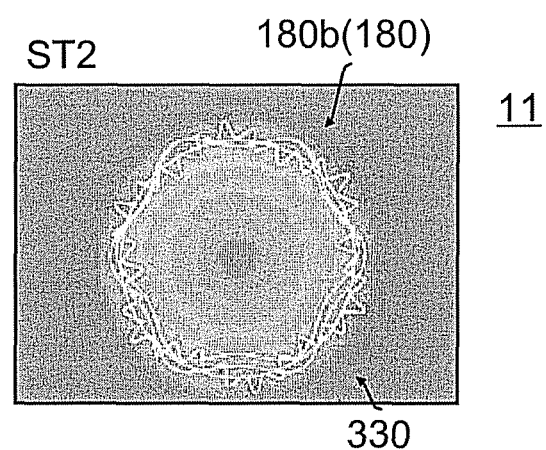

FIG. 18A to FIG. 18C are schematic views illustrating another operation of the display apparatus according to the second embodiment.

Namely, FIG. 18A illustrates the first display object 180*a* corresponding to the first state ST1 of the display apparatus 11; and FIG. 18C illustrates the second display object 180*b* corresponding to the second state ST2. In the specific example, the third state ST3 is set between the first state ST1 and the second state ST2; and FIG. 18B illustrates the third display object 180*c* corresponding to the third state ST3. The third state ST3 and the third display object 180*c* may be provided if necessary and are omissible.

These drawings illustrate the display state of the display apparatus 11 at some time.

In the specific example as illustrated in FIG. 18A, an image of a circular configuration is used as the first display object 180*a*.

As illustrated in FIG. 18C, an image having a configuration in which a wave-like configuration fluctuates in a direction crossing the direction of the circumference at positions along the circumference is used as the second display object 180*b*. Thus, the recesses and protrusions of the shape of the second display object 180*b* are greater than the recesses and protrusions of the shape of the first display object 180*a*.

Also, as illustrated in FIG. 18B, an image having a configuration in which a wave-like configuration fluctuates in a direction crossing the direction of the circumference at positions along the circumference is used as the third display object 180*c*. The period of the fluctuation of the wave is greater than that of the second display object 180*b*; and the recesses and protrusions of the wave are less than those of the second display object 180*b*.

The first to third display objects 180*a* to 180*c* are brighter than the background of the display image 330.

By using the display object 180 having such a configuration as well, the state of the operated apparatus 510 can be easily recognized.

The display unit 540 (the image projection unit 115) illustrated in FIG. 3 is one specific example of the display apparatus 10.

As shown in FIG. 3, the image projection unit 115 includes an image light formation unit 110 and a light flux projection unit 120.

For example, the image light formation unit 110 includes a light source 111 and an image formation unit 117.

The light source 111 emits light from which the light flux 112 is formed. The light source 111 may include various LEDs (Light Emitting Diodes), high pressure mercury lamps, halogen lamps, lasers, etc. By using an LED as the light source 111, the power consumption can be reduced; and the apparatus can be lighter and smaller.

The image formation unit 117 may include, for example, an optical switch such as a liquid crystal display apparatus (LCD), etc. The image data from the image data generation unit 130 is supplied to the image formation unit 117; and the image formation unit 117 generates the light flux 112 including the display image 330 based on the image data.

In the specific example, the image light formation unit 110 further includes a tapered light guide 116 provided between the light source 111 and the image formation unit 117. The light emitted from the light source 111 is controlled by the tapered light guide 116 to have a divergence angle within some range. By passing through the image formation unit 117, the light becomes the light flux 112 including the display image 330, and the divergence angle of the light flux 112 is controlled to be within some range.

The light flux projection unit 120 projects the light flux 112 emitted from the image light formation unit 110 toward the human viewer 100 by causing the light flux 112 to be reflected by the windshield unit 710 of the vehicle 730. The light flux projection unit 120 may include, for example, various lenses, mirrors, and various optical elements that control the divergence angle (the diffusion angle).

In the specific example, the light flux projection unit 120 includes a light source side lens 123, an aperture 124, an emerging side lens 125, and an emerging-side mirror 126.

Along the travel direction of the light flux 112, the light source side lens 123 is disposed between the image light formation unit 110 and the emerging-side mirror 126; the aperture 124 is disposed between the light source side lens 123 and the emerging-side mirror 126; and the emerging side lens 125 is disposed between the aperture 124 and the emerging-side mirror 126.

In the specific example, the emerging-side mirror 126 has a concave configuration. Thereby, the image of the display image 330 included in the light flux 112 can be enlarged and projected toward the human viewer 100. The emerging-side mirror 126 may be movable; and the light flux 112 can be projected appropriately toward the eye 101 of the human viewer 100 by, for example, manually or automatically adjusting the position and/or the angle of the emerging-side mirror 126 to match the position and/or the movement of the head 105 of the human viewer 100.

By such a configuration, the divergence angle of the light flux 112 is controlled; and a projection region 114 of the light flux 112 is controlled to be within a constant range at the position of the human viewer 100.

The spacing between the eyes (the pupils) of the human viewer 100 is, for example, 60 millimeters (mm) to 75 mm. Therefore, the size (the width in the lateral direction) of the projection region 114 of the light flux 112 at the position of the human viewer 100 may be set to be, for example, not more than about 60 mm to 75 mm in the case where the viewing is performed with the one eye 101. The size of the projection region 114 may be controlled mainly by the optical elements included in the light flux projection unit 120.

A projection position 114a of the light flux 112 at the position of the human viewer 100 can be controlled by, for example, changing the placement position and/or the angle of the image projection unit 115. For example, the projection position 114a can be controlled by changing at least one selected from the placement position of the image light formation unit 110, the angle of the image light formation unit 110, the placement position of the light flux projection unit 120, and the angle of the light flux projection unit 120.

Various modifications of the configurations of the image light formation unit 110 and the light flux projection units 120 are possible. The dispositions of the components included in the image light formation unit 110 and the components included in the light flux projection unit 120 are arbitrary. For example, the image light formation unit 110 (and the components included in the image light formation unit 110) may be interposed between the components included in the light flux projection unit 120.

Various modifications of the image projection unit 115 are possible in addition to the specific examples recited above.

The configuration of the display unit 540 (the image projection unit 115) used in the display apparatuses 10 and 11 according to the embodiments of the invention is arbitrary. Because the light flux 112 recited above is incident on the eye 101 of the human viewer 100, the difficulty of viewing due to binocular parallax is eliminated; and the effects according to the embodiment recited above can be realized further because the sense of depth perceived by the human viewer 100 is increased.

Other than an LCD, various optical switches such as a DMD (Digital Micromirror Device), a MEMS (Micro-electro-mechanical System), etc., may be used as the image formation unit 117 of the display apparatuses 10 and 11 according to the embodiments of the invention. The image light formation unit 110 may include a laser projector, an LED projector, etc. In such a case, the image is formed by a laser beam or light from an LED.

The vehicle 730 (the moving body) in which the display apparatus according to the embodiment is mounted may be not only a four-wheeler but also a two-wheeler. Also, the display apparatus according to the embodiment may be mounted in a railway car, a bus, etc. Further, the display apparatus according to the embodiment may be mounted in not only a vehicle but in any moving body including an aircraft, a ship, etc.; and similar effects are obtained by performing similar operations.

The display apparatus according to the embodiment may be used also in various simulators that simulate vehicles, aircraft, etc. It is also possible to apply the display apparatus according to the embodiment to, for example, recreational display apparatuses such as games, etc.

Third Embodiment

The third embodiment of the invention is a display method.

Figure 19:
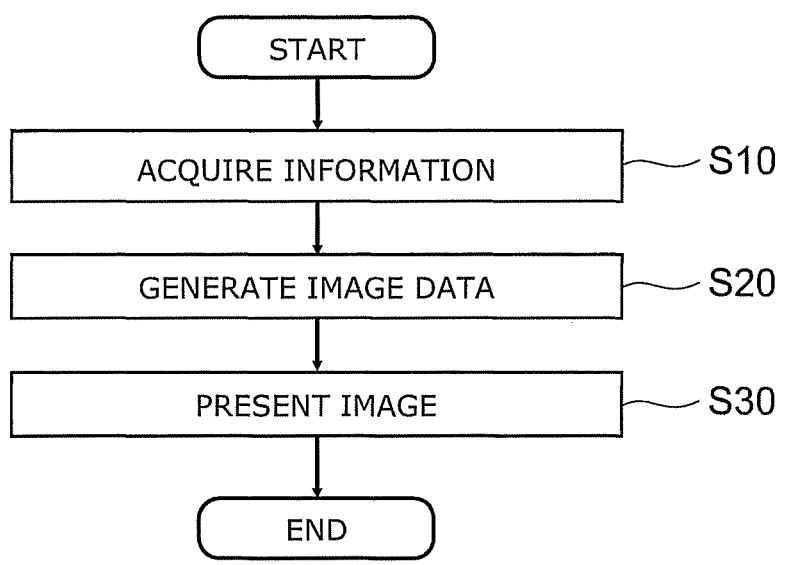
FIG. 19 is a flowchart illustrating a display method according to a third embodiment of the invention.

FIG. 19 is a flowchart illustrating the display method according to the third embodiment of the invention.

In the display method according to the embodiment as shown in FIG. 19, information relating to the state of the operated apparatus 510 (e.g., the vehicle 730) is acquired (step S10).

Then, the image data is generated to include the display object 180 that indicates the state of the operated apparatus 510 based on the information that is acquired (step S20).

Continuing, the image including the display object 180 that is based on the image data that is generated is presented to the human viewer 100 operating the operated apparatus 510 (step S30).

Then, the first display object 180a is displayed when the operated apparatus 510 is in the first state ST1; and the second display object 180b that is different from the first display object 180a is displayed when the operated apparatus 510 is in the second state ST2 in which the predetermined characteristic value CV is different from that of the first state ST1.

At least one selected from the recesses and protrusions of the path of the second display object 180b, the recesses and protrusions of the shape of the second display object 180b, and the temporal change of at least one selected from the shape, the size, the number, the color, the brightness, the position, and the path of the second display object 180b is different from that of the first display object 180a.

More specifically, the first display object 180a is displayed when the operated apparatus 510 is in the first state ST1; and the second display object 180b that is different from the first display object 180a is displayed when the operated apparatus 510 is in the second state ST2 in which the predetermined characteristic value CV is greater than that of the first state ST1.

At least one selected from the recesses and protrusions of the path of the second display object 180b, the recesses and protrusions of the shape of the second display object 180b, and the temporal change of at least one selected from the shape, the size, the number, the color, the brightness, the position, and the path of the second display object 180b is greater than that of the first display object 180a.

In other words, the various display objects 180 described in regard to FIG. 1A to FIG. 1L, FIG. 2A, FIG. 2B, and FIG. 4A to FIG. 4G to FIG. 18A to FIG. 18C are displayed. Thereby, the state of the operated apparatus 510 can be easily recognized.

In the display method according to the embodiment as well, the dominant wavelength of the color included in the second display object 180b may be set to be longer than the dominant wavelength of the color included in the first display object 180a.

Fourth Embodiment

According to a fourth embodiment of the invention, one of the display apparatuses according to the embodiments of the invention is mounted in a moving body (the vehicle 730).

In other words, for example, as shown in FIG. 3, the vehicle 730 (the moving body) may be employed as the operated apparatus 510 according to the embodiment.

The moving body (e.g., the vehicle 730) includes the display apparatus (e.g., the display apparatus 11 or the display apparatus 11) according to the embodiment of the invention and a reflecting unit (e.g., the windshield unit 710) configured to reflect the light flux 112 emitted from the display apparatus toward the human viewer 100.

The reflector 711 may be additionally provided in the reflecting unit (the windshield unit 710); or the windshield unit 710 may include the reflector 711.

According to the moving body (e.g., the vehicle 730) according to the embodiment, a moving body that enables easy recognition of the state of the moving body, i.e., the operated apparatus, can be provided.

A specific example of the operation of the display apparatuses (the display apparatus 10, the display apparatus 11, and modifications of the display apparatus 10 and the display apparatus 11) according to the embodiments will now be described.

FIG. 20A to FIG. 20D are schematic views illustrating an operation of the display apparatus according to the embodiment.

Figure 20A:
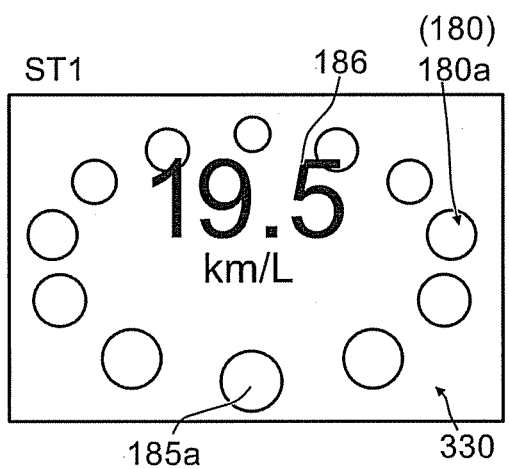
FIG. 20A to FIG. 20D are schematic views illustrating an operation of the display apparatus according to the embodiment.
Figure 20B:
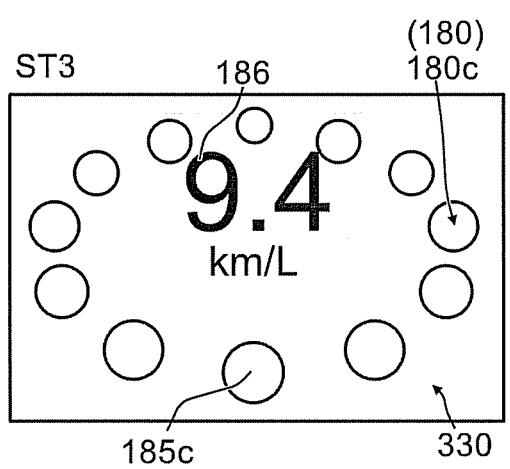
Figure 20C:
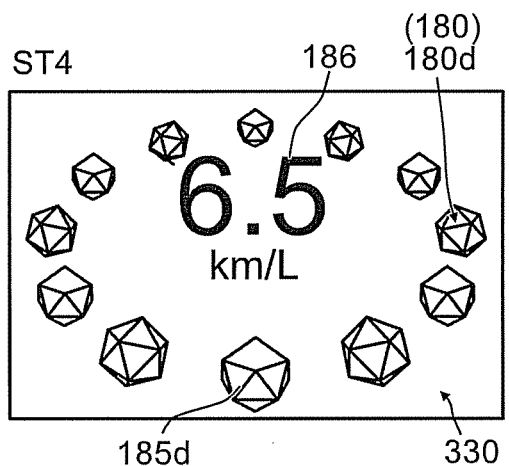
Figure 20D:
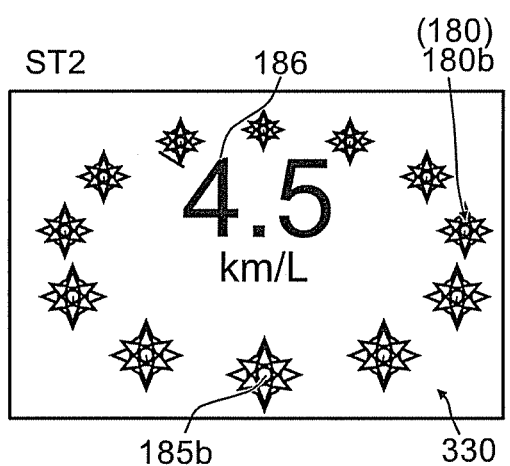

Namely, FIG. 20A illustrates the first display object 180a of the first state ST1. FIG. 20D illustrates the second display object 180b of the second state ST2. FIG. 20B illustrates the third display object 180c of the third state ST3 between the first state ST1 and the second state ST2. FIG. 20C illustrates a fourth display object 180d of a fourth state ST4 between the third state ST3 and the second state ST2. FIG. 20A to FIG. 20D illustrate the paths (the first path 185a, the third path 185c, a fourth path 185d, and the second path 185b) of the first, third, fourth, and second states ST1, ST3, ST4, and ST2. These paths are substantially ellipses. The shapes of these display objects move along these paths. These drawings illustrate the display state of the display object 180 at some time.

In this example, the first to fourth display objects 180a to 180d illustrate the distance travelable using a predetermined amount of fuel (e.g., the instantaneous value of the travelable distance per unit amount of fuel). Herein, an instantaneous fuel travelable distance $E_2$ (described below) is used as the instantaneous value of the travelable distance per unit amount of fuel.

In these examples, a character display object 186 that indicates the instantaneous fuel travelable distance $E_2$ is provided in the image in addition to the first to fourth display objects 180a to 180d. Thus, in the embodiment, any content may be displayed in addition to the display object 180 (the first to fourth display objects 180a to 180d, etc.).

As shown in FIG. 20A to FIG. 20D, the instantaneous fuel travelable distance $E_2$ is 19.5 km/L, 9.4 km/L, 6.4 km/L, and 4.5 km/L in the first, third, fourth, and second states ST1, ST3, ST4, and ST2, respectively.

A reference value (or a reference range) is provided for the instantaneous fuel travelable distance $E_2$ (the energy efficiency). For example, first to third reference values are set for the instantaneous fuel travelable distance $E_2$. For example, the first reference value is 5.0 km/L. For example, the second reference value is 8.0 km/L. For example, the third reference value is 12 km/L. The first to fourth display objects are set by using these reference values.

For example, in the case where the detected value (the acquired value) of the instantaneous fuel travelable distance $E_2$ is less than the first reference value (less than 5.0 km/L), the second display object 180b is displayed. For example, in the case where the detected value (the acquired value) of the instantaneous fuel travelable distance $E_2$ is not less than the first reference value and is less than the second reference value (not less than 5.0 km/L and less than 8.0 km/L), the fourth display object 180d is displayed. For example, in the case where the detected value (the acquired value) of the instantaneous fuel travelable distance $E_2$ is not less than the second reference value and is less than the third reference value (not less than 8.0 km/L and less than 12.0 km/L), the third display object 180c is displayed. For example, in the case where the detected value (the acquired value) of the instantaneous fuel travelable distance $E_2$ is not less than the third reference value (not less than 12 km/L), the first display object 180a is displayed.

As shown in FIG. 20A, an image of a sphere is used as the first display object 180a. For example, the color of the sphere is green. As shown in FIG. 20B, an image of a sphere is used as the third display object 180c; and, for example, the color of the sphere is yellow. As shown in FIG. 20C, an image having a polyhedral configuration having planes at the surface is used as the fourth display object 180d. For example, the color of the polyhedral configuration is orange. As shown in FIG. 20D, an image having a three-dimensional configuration including protrusions is used as the second display object 180b. For example, the color of the three-dimensional configuration is red.

Thus, in this example, the recesses and protrusions of the shape of the display object 180 are modified according to the instantaneous fuel travelable distance $E_2$ (the energy efficiency).

As shown in FIG. 20A to FIG. 20D, the control unit 530 causes the height (the depth) of the recesses and protrusions of the shape (the second configuration) of the second display object 180b to be greater than the height (the depth) of the recesses and protrusions of the shape (the first configuration) of the first display object 180a. The control unit 530 causes the number of the recesses and protrusions of the second configuration to be greater than the number of the recesses and protrusions of the first configuration. The control unit 530 causes the surface area of the three-dimensional shape of the second configuration to be greater than the surface area of the three-dimensional shape of the first configuration.

As shown in FIG. 20D, the control unit 530 causes the diameters of the tip portions of the protrusions of the second configuration to be less than the diameters of the base portions of the protrusions of the second configuration.

Also, in this example, the color of the display object 180 is modified according to the instantaneous fuel travelable distance $E_2$ (the energy efficiency). Further, at least one selected from the temporal change of the path and the recesses and protrusions of the path of the display object 180 may be further modified according to the instantaneous fuel travelable distance $E_2$ (the energy efficiency).

Although the character display object 186 indicates the instantaneous fuel travelable distance $E_2$ in this example, the character display object 186 may indicate any information. For example, any information including the speed (the vehicle speed), the remaining amount of the fuel, the distance to the destination, the predicted arrival time at the destination, the current time, etc., may be displayed by the character display object 186.

FIG. 21A to FIG. 21D are schematic views illustrating an operation of the display apparatus according to the embodiment.

Namely, FIG. 21A, FIG. 21B, FIG. 21C, and FIG. 21D illustrate the first display object 180a, the third display object 180c, the fourth display object 180d, and the second display object 180b, respectively. In such a case as well, the path is an ellipse.

In this example, the first to fourth display objects 180a to 180d illustrate the rotation speed of the engine. In such a case as well, the character display object 186 is further provided. In this example, the character display object 186 indicates the speed. However, the information indicated by the character display object 186 is arbitrary.

For example, the rotation speed of the engine in the first state ST1 is 1000 rpm. For example, the rotation speed of the engine in the third state ST3 is 1600 rpm. For example, the rotation speed of the engine in the fourth state ST4 is 2100 rpm. For example, the rotation speed of the engine in the second state ST2 is 2800 rpm.

For example, in the case where the detected value (the acquired value) of the rotation speed of the engine exceeds the first reference value (e.g., exceeds 2500 rpm), the second display object 180b is displayed. For example, in the case where the detected value (the acquired value) of the rotation speed of the engine exceeds the second reference value and is not more than the first reference value (e.g., exceeds 2000 rpm and is not more than 2500 rpm), the fourth display object 180d is displayed. For example, in the case where the detected value (the acquired value) of the rotation speed of the engine exceeds the third reference value and is not more than the second reference value (exceeds 1500 rpm and is not more than 2000 rpm), the third display object 180c is displayed. For example, in the case where the detected value (the acquired value) of the rotation speed of the engine is not more than the third reference value (not more than 1500 rpm), the first display object 180a is displayed.

Figure 21A:
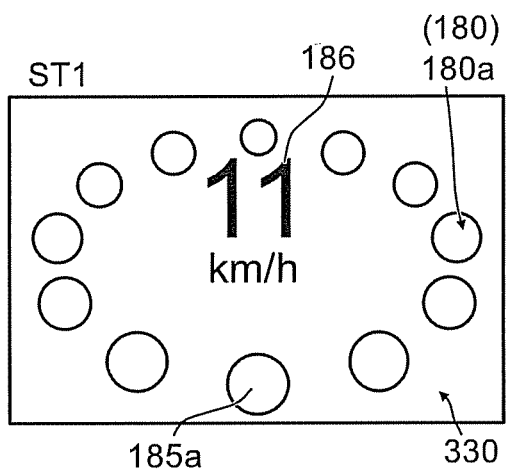
FIG. 21A to FIG. 21D are schematic views illustrating an operation of the display apparatus according to the embodiment.
Figure 21B:
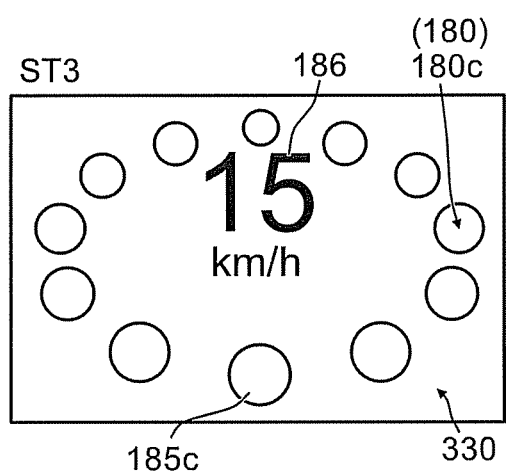
Figure 21C:
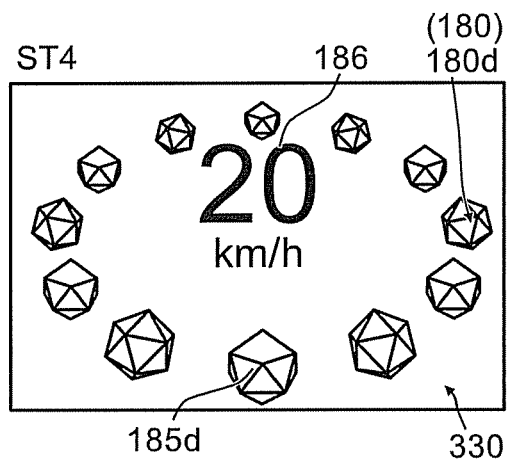
Figure 21D:
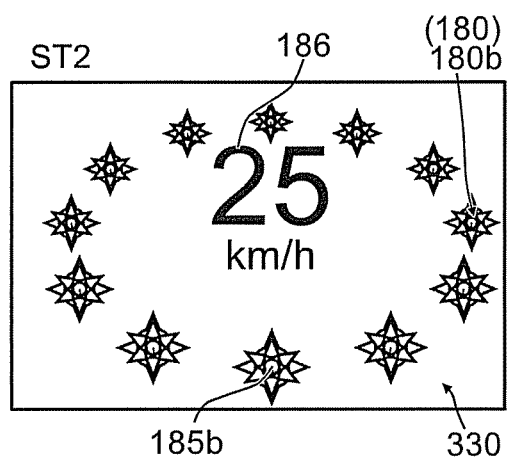
Figure 22A:
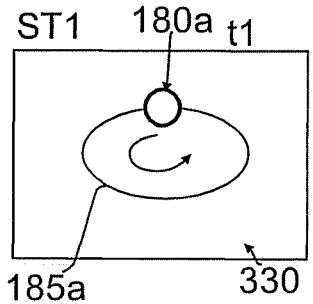
FIG. 22A to FIG. 22L are schematic views illustrating other operations of the display apparatus according to the embodiment.
Figure 22B:
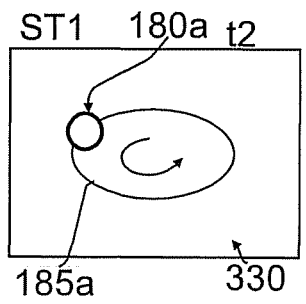
Figure 22C:
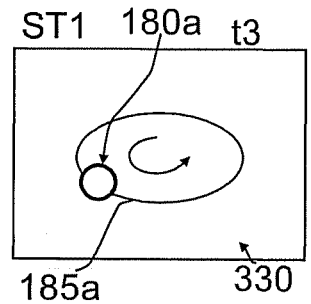
Figure 22D:
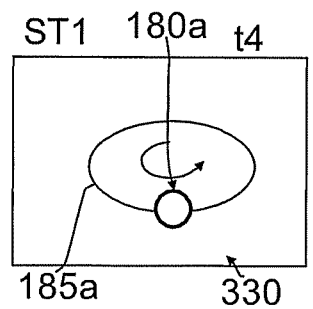
Figure 22E:
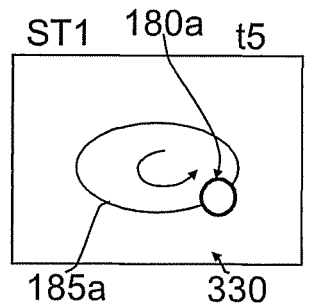
Figure 22F:
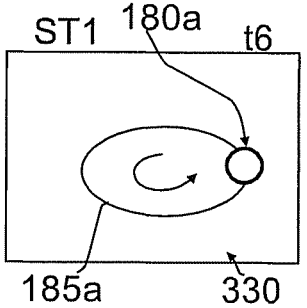
Figure 22G:
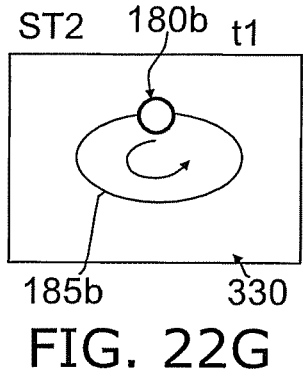
Figure 22H:
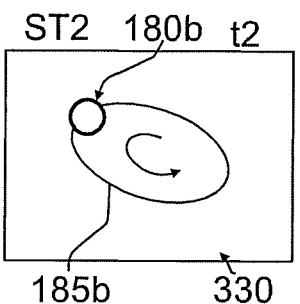
Figure 22I:
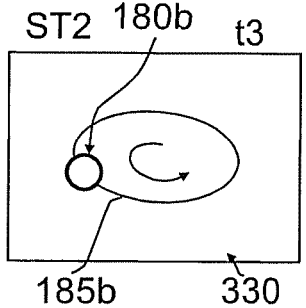
Figure 22J:
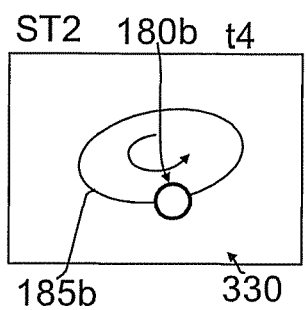
Figure 22K:
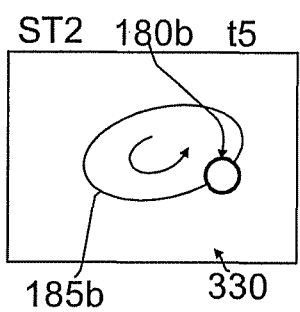
Figure 22L:
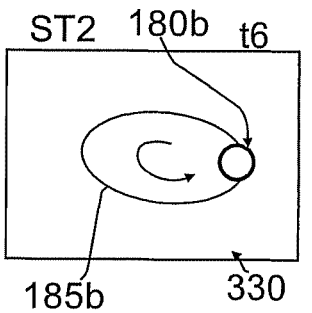
Figure 23A:
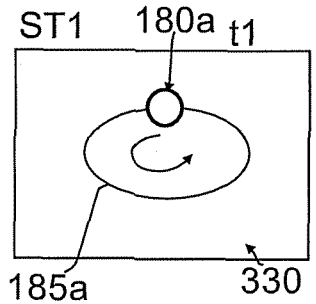
FIG. 23A to FIG. 23L are schematic views illustrating other operations of the display apparatus according to the embodiment.
Figure 23B:
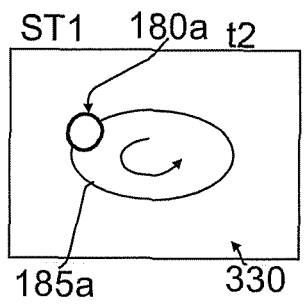
Figure 23C:
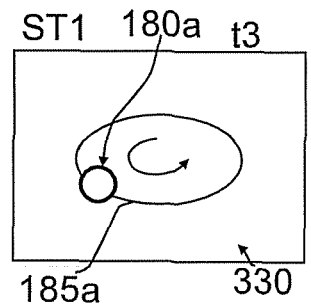
Figure 23D:
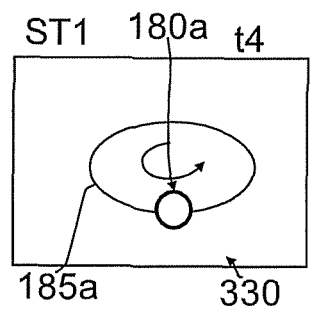
Figure 23E:
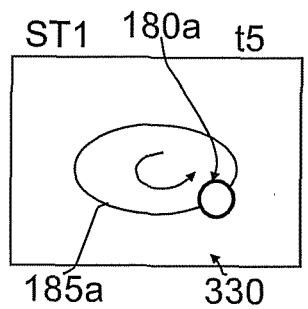
Figure 23F:
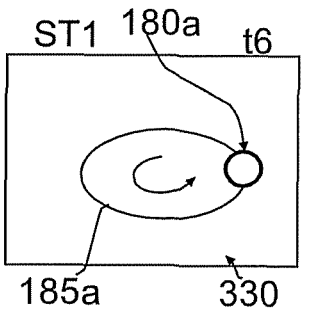
Figure 23G:
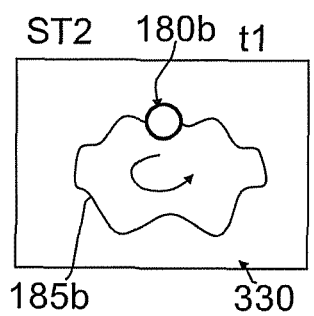
Figure 23H:
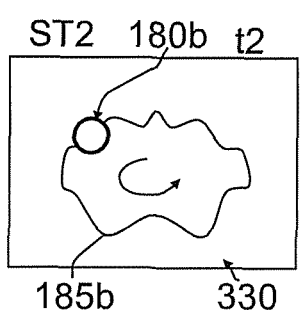
Figure 23I:
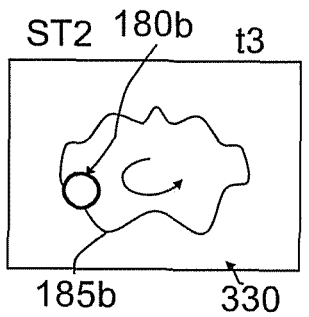
Figure 23J:
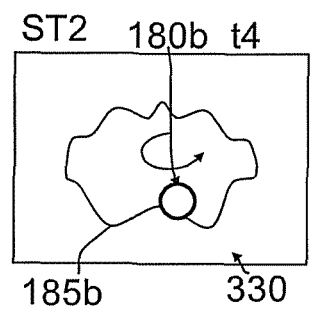
Figure 23K:
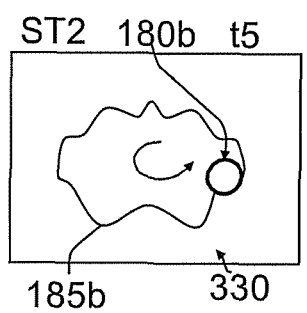
Figure 23L:
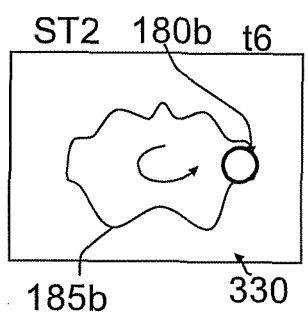
Figure 24A:
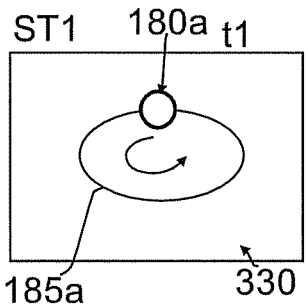
FIG. 24A to FIG. 24L are schematic views illustrating other operations of the display apparatus according to the embodiment.
Figure 24B:
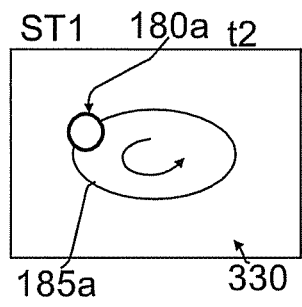
Figure 24C:
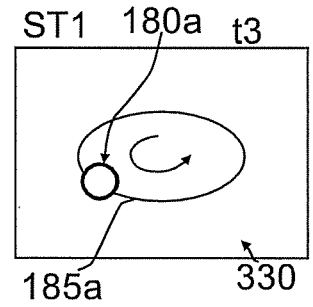
Figure 24D:
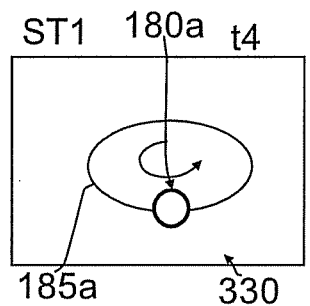
Figure 24E:
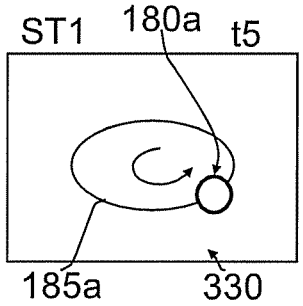
Figure 24F:
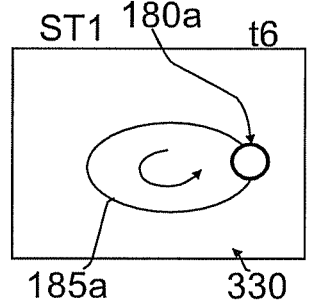
Figure 24G:
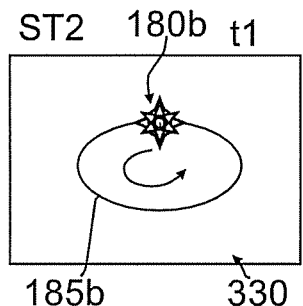
Figure 24H:
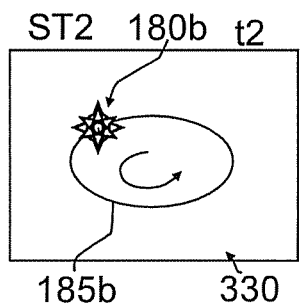
Figure 24I:
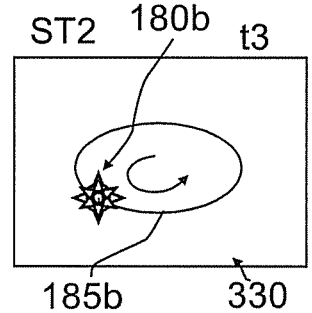
Figure 24J:
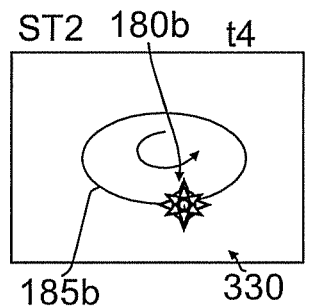
Figure 24K:
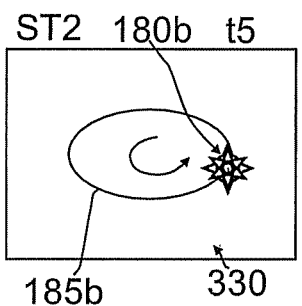
Figure 24L:
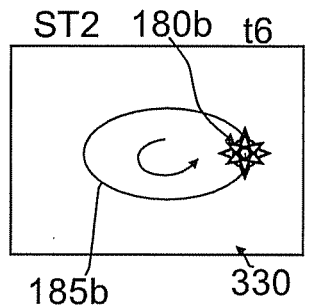

As shown in FIG. 21A, an image of a sphere is used as the first display object 180a. For example, the color of the sphere is green. As shown in FIG. 21B, an image of a sphere is used as the third display object 180c; and, for example, the color of the sphere is yellow. As shown in FIG. 21C, an image having a polyhedral configuration having planes at the surface is used as the fourth display object 180d. For example, the color of the polyhedral configuration is orange. As shown in FIG. 21D, an image having a three-dimensional configuration including protrusions is used as the second display object 180b. For example, the color of the three-dimensional configuration is red.

Thus, other information can be displayed by the character display object 186 and the like while displaying the characteristic value CV (e.g., the instantaneous fuel travelable distance $E_2$, the rotation speed of the engine, etc.) using the display object 180.

In the embodiment, the energy efficiency of the moving body (e.g., the vehicle 730) is used as the predetermined characteristic value CV. The energy efficiency is the energy efficiency during the operation (the travel) of the moving body (e.g., the vehicle 730).

The energy efficiency may include, for example, an instantaneous fuel consumption amount $E_1$. For example, the instantaneous fuel consumption amount is the consumed amount of the fuel per unit time. For example, the instantaneous fuel consumption amount $E_1$ is the consumed amount of the fuel per second. For example, the units of the instantaneous fuel consumption amount $E_1$ are volume/hour. For example, $cm^3/s$ (cubic centimeters/second) (or cc/s) is used as the units of the instantaneous fuel consumption amount $E_1$. For example, the value of the flow meter of the fuel is used as the instantaneous fuel consumption amount $E_1$.

The state in which the instantaneous fuel consumption amount $E_1$ is small corresponds to the state in which the energy efficiency is high (e.g., the first state ST1). The state in which the instantaneous fuel consumption amount $E_1$ is large corresponds to the state in which the energy efficiency is low (e.g., the second state ST2). For example, a set value is provided for the instantaneous fuel consumption amount $E_1$. When the measured value (the acquired value) of the instantaneous fuel consumption amount $E_1$ is not more than the set value, the first display object is generated. When the measured value (the acquired value) of the instantaneous fuel consumption amount $E_1$ exceeds the set value, the second display object is generated. Multiple set values may be provided; and the number of the types of the display objects that correspond may be three or more.

For example, the energy efficiency may include the instantaneous value of the travelable distance per unit amount of fuel (the instantaneous fuel travelable distance $E_2$). For example, the distance traveled per unit amount of fuel is used as the instantaneous fuel travelable distance $E_2$. For example, the units of the instantaneous fuel travelable distance $E_2$ are length/volume. For example, km/L (kilometers/liter) is used as the units of the instantaneous fuel travelable distance $E_2$. For example, the instantaneous fuel travelable distance $E_2$ is calculated from the instantaneous fuel consumption amount $E_1$, the distance traveled, the speed, etc. For example, the distance traveled is determined from the odometer. For example, the speed is determined from the speedometer.

The state in which the instantaneous fuel travelable distance $E_2$ is long corresponds to a state (e.g., the first state ST1) in which the energy efficiency is high. The state in which the instantaneous fuel travelable distance $E_2$ is short corresponds to a state (e.g., the second state ST2) in which the energy efficiency is low. For example, a set value is provided for the instantaneous fuel travelable distance $E_2$. When the measured value (the acquired value) of the instantaneous fuel travelable distance $E_2$ is not less than the set value, the first display object is generated. When the measured value (the acquired value) of the instantaneous fuel travelable distance $E_2$ is less than the set value, the second display object is generated.

For example, the energy efficiency may include a degree of remoteness (a rotation speed remoteness degree $E_3$) from a predetermined relationship to the relationship between the speed and the rotation speed of the engine. For example, the relationship between the speed and the rotation speed of the engine that causes the instantaneous fuel travelable distance $E_2$ to increase is predetermined for each of the vehicles 730. The rotation speed remoteness degree $E_3$ is an index of the degree of remoteness from this predetermined relationship. For example, the rotation speed of the engine that causes the instantaneous fuel travelable distance $E_2$ to increase is defined by a function (or a table) of the speed, etc. The difference between the values of this function and the values of the rotation speed and the speed that are measured (acquired) may be used as the index.

The state in which the rotation speed remoteness degree $E_3$ is small corresponds to the state (the first state ST1), e.g., in which the energy efficiency is high. The state in which the rotation speed remoteness degree $E_3$ is large corresponds to the state (the second state ST2), e.g., in which the energy efficiency is low. For example, a set value is provided for the rotation speed remoteness degree $E_3$. When the measured value (the acquired value) of the rotation speed remoteness degree $E_3$ is not less than the set value, the first display object is generated. When the measured value (the acquired value) of the rotation speed remoteness degree $E_3$ is less than the set value, the second display object is generated.

The degree of proximity (the rotation speed efficiency) from the predetermined relationship to the relationship between the speed and the rotation speed of the engine may be used as the index. In such a case, when the measured value (the acquired value) of the rotation speed efficiency is not more than the set value, the first display object is generated.

When the measured value (the acquired value) of the rotation speed efficiency exceeds the set value, the second display object is generated.

For example, in the case where electricity is used as the energy of the driving force of the moving body 510 (the vehicle 730), the following index may be used.

For example, the energy efficiency may include an instantaneous battery current consumption value $E_4$. For example, the instantaneous battery current consumption value $E_4$ is the value of an ammeter. For example, the units of the instantaneous battery current consumption value $E_4$ are A (amperes).

The state in which the instantaneous battery current consumption value $E_4$ is small corresponds to the state (e.g., the first state ST1) in which the energy efficiency is high. The state in which the instantaneous battery current consumption value $E_4$ is large corresponds to the state (e.g., the second state ST2) in which the energy efficiency is low. For example, a set value is provided for the instantaneous battery current consumption value $E_4$. When the measured value (the acquired value) of the instantaneous battery current consumption value $E_4$ is not more than the set value, the first display object is generated. When the measured value (the acquired value) of the instantaneous battery current consumption value $E_4$ exceeds the set value, the second display object is generated.

The instantaneous electric power consumption value may be used instead of the instantaneous battery current consumption value $E_4$. The product of the instantaneous battery current consumption value $E_4$ and the voltage value is used as the instantaneous electric power consumption value. For example, the units of the instantaneous electric power consumption value are W (watts). When the measured value (the acquired value) of the instantaneous electric power consumption value is not more than the set value, the first display object is generated. When the measured value (the acquired value) of the instantaneous electric power consumption value exceeds the set value, the second display object is generated.

For example, the energy efficiency may include the instantaneous value of the travelable distance per unit amount of electrical power (an instantaneous battery travelable distance $E_5$). For example, the distance traveled per unit amount of electrical power is used as the instantaneous battery travelable distance $E_5$. For example, the units of the instantaneous battery travelable distance $E_5$ are length/(electrical power·time). For example, kilometers/(watt·hour) (km/(W·h)) is used as the units of the instantaneous battery travelable distance $E_5$. For example, the instantaneous battery travelable distance $E_5$ is calculated from the power consumption (the current), the distance traveled, the speed, etc.

The state in which the instantaneous battery travelable distance $E_5$ is long corresponds to the state (e.g., the first state ST1) in which the energy efficiency is high. The state in which the instantaneous battery travelable distance $E_5$ is short corresponds to the state (e.g., the second state ST2) in which the energy efficiency is low. For example, a set value is provided for the instantaneous battery travelable distance $E_5$. When the measured value (the acquired value) of the instantaneous battery travelable distance $E_5$ is not less than the set value, the first display object is generated. When the measured value (the acquired value) of the instantaneous battery travelable distance $E_5$ is less than the set value, the second display object is generated.

For example, the energy efficiency may include the distance travelable using the remaining capacity of the battery (a remaining capacity travelable distance $E_6$). For example, the remaining capacity travelable distance $E_6$ is determined from the remaining capacity of the battery and the instantaneous battery travelable distance $E_5$ (determined from the instantaneous battery current consumption or the instantaneous electrical power consumption). The units of the remaining capacity travelable distance $E_6$ are units of length. For example, km is used as the units of the remaining capacity travelable distance $E_6$.

The state in which the remaining capacity travelable distance $E_6$ is long corresponds to the state (e.g., the first state ST1) in which the energy efficiency is high. The state in which the remaining capacity travelable distance $E_6$ is short corresponds to the state (e.g., the second state ST2) in which the energy efficiency is low. For example, a set value is provided for the remaining capacity travelable distance $E_6$. When the measured value (the acquired value) of the remaining capacity travelable distance $E_6$ is not less than the set value, the first display object is generated. When the measured value (the acquired value) of the remaining capacity travelable distance $E_6$ is less than the set value, the second display object is generated.

For example, the energy efficiency may include the margin until the next energy replenishing point (a replenishing margin $E_7$). The distance to the next energy replenishing point is determined from the travel route of the vehicle 730, map information relating to energy replenishing locations existing along the travel route (gas stations, recharging stations, etc.), and the current position of the vehicle 730. For example, the replenishing margin $E_7$ is calculated based on the distance to the next energy replenishing point and one selected from the instantaneous fuel consumption amount $E_1$, the instantaneous fuel travelable distance $E_2$, and the remaining capacity travelable distance $E_6$. For example, the difference (or the proportion) from the remaining capacity travelable distance $E_6$ to the next energy replenishing point is used as the replenishing margin $E_7$.

The state in which the replenishing margin $E_7$ is large corresponds to the state (e.g., the first state ST1) in which the energy efficiency is high. The state in which the replenishing margin $E_7$ is small corresponds to the state (e.g., the second state ST2) in which the energy efficiency is low. For example, a set value is provided for the replenishing margin $E_7$. When the measured value (the acquired value) of the replenishing margin $E_7$ is not less than the set value, the first display object is generated. When the measured value (the acquired value) of the replenishing margin $E_7$ is less than the set value, the second display object is generated.

For example, the energy efficiency may include an instantaneous consumption cost $E_8$. For example, the instantaneous consumption cost $E_8$ is the cost of the energy (the fuel or the battery) consumed per unit time. The units of the instantaneous consumption cost $E_8$ are the amount of a currency per hour. For example, yen/s or the like is used as the units of the instantaneous consumption cost $E_8$. For example, the instantaneous consumption cost $E_8$ is determined from a combination of the instantaneous fuel consumption amount $E_1$ and the amount of money of the fuel, or a combination of the instantaneous battery current consumption value $E_4$ and the like with the cost (the amount of money) of charging the battery.

The state in which the instantaneous consumption cost $E_8$ is small corresponds to the state (e.g., the first state ST1) in which the energy efficiency is high. The state in which the instantaneous consumption cost $E_8$ is large corresponds to the state (e.g., the second state ST2) in which the energy efficiency is low. For example, a set value is provided for the instantaneous consumption cost $E_8$. When the measured value (the acquired value) of the instantaneous consumption cost $E_8$ is not more than the set value, the first display object is generated. When the measured value (the acquired value)

of the instantaneous consumption cost $E_8$ exceeds the set value, the second display object is generated.

For example, the energy efficiency may include a rotation speed $E_9$ of the engine that relates to the energy consumed per unit time. For example, the units of the rotation speed $E_9$ of the engine are rotations/hour. For example, rpm or the like is used as the units of the rotation speed $E_9$ of the engine. When the rotation speed $E_9$ of the engine is high, the amount of fuel consumed per unit time is large.

The state in which the rotation speed $E_9$ of the engine is low corresponds to the state (e.g., the first state ST1) in which the energy efficiency is high. The state in which the rotation speed $E_9$ of the engine is high corresponds to the state (e.g., the second state ST2) in which the energy efficiency is low. For example, a set value is provided for the rotation speed $E_9$ of the engine. When the measured value (the acquired value) of the rotation speed $E_9$ of the engine is not more than the set value, the first display object is generated. When the measured value (the acquired value) of the rotation speed $E_9$ of the engine exceeds the set value, the second display object is generated.

For example, the energy efficiency may include the energy generated when the vehicle 730 decelerates (a generated energy $E_{10}$). For example, the difference (the absolute value of the difference) between the energy used to travel and the energy generated per prescribed amount of time or prescribed distance traveled is used as the index of the energy efficiency.

The state in which the generated energy $E_9$ is large corresponds to the state (e.g., the first state ST1) in which the energy efficiency is high. The state in which the generated energy $E_{10}$ is small corresponds to the state (e.g., the second state ST2) in which the energy efficiency is low. For example, a set value is provided for the generated energy $E_{10}$. When the measured value (the acquired value) of the generated energy $E_{10}$ is not more than the set value, the first display object is generated. When the measured value (the acquired value) of the generated energy $E_{10}$ exceeds the set value, the second display object is generated.

The calculation of E1 to El0 and the modifications of E1 to El0 recited above may be performed by calculating a value inside a predetermined interval up to the time of calculating the value. Therefore, for example, the case of being instantaneous also includes the case where, for example, an average inside the predetermined interval is employed.

For E1 to El0 and the modifications of E1 to El0 recited above, multiple set values may be provided; and the number of the types of the display objects that correspond may be three or more.

The energy efficiency includes at least one selected from the instantaneous fuel consumption amount $E_1$, the instantaneous fuel travelable distance $E_2$, the rotation speed remoteness degree $E_3$, the instantaneous battery current consumption value $E_4$, the instantaneous battery travelable distance $E_5$, the remaining capacity travelable distance $E_6$, the replenishing margin $E_7$, the instantaneous consumption cost $E_8$, and the rotation speed $E_9$ of the engine. The energy efficiency may further include the generated energy $E_{10}$.

The energy efficiency may include the value of a combination selected from the instantaneous fuel consumption amount $E_1$, the instantaneous fuel travelable distance $E_2$, the rotation speed remoteness degree $E_3$, the instantaneous battery current consumption value $E_4$, the instantaneous battery travelable distance $E_5$, the remaining capacity travelable distance $E_6$, the replenishing margin $E_7$, the instantaneous consumption cost $E_8$, the rotation speed $E_9$ of the engine, and the generated energy $E_{10}$.

Here, the values recited above for which the energy efficiency increases as these values decrease may be converted to values for which the energy efficiency increases as these values increase.

For example, the energy efficiency is high when the value is small for the instantaneous fuel consumption amount $E_1$, the rotation speed remoteness degree $E_3$, the instantaneous battery current consumption value $E_4$, the instantaneous consumption cost $E_8$, and the rotation speed $E_9$ of the engine. For example, the reciprocals of these values may be employed as the values after the conversion. Or, the values of these values subtracted from a constant may be employed as the values after the conversion. Hereinbelow, the case is described as an example where the reciprocal is employed as the value after the conversion.

Namely, the conversions are as follows. The conversions include an instantaneous fuel consumption amount $e_1=1/E_1$, a rotation speed remoteness degree $e_3=1/E_3$, an instantaneous battery current consumption value $e_4=1/E_4$, an instantaneous consumption cost $e_8=1/E_8$, and a rotation speed $e_9$ of the engine=$1/E_9$.

On the other hand, the energy efficiency is high when the value is large for the instantaneous fuel travelable distance $E_2$, the instantaneous battery travelable distance $E_5$, the remaining capacity travelable distance $E_6$, the replenishing margin $E_7$, and the generated energy $E_{10}$. Therefore, these values are not converted. However, the symbols are renewed as follows. An instantaneous fuel travelable distance $e_2=E_2$, an instantaneous battery travelable distance $e_5=E_5$, a remaining capacity travelable distance $e_6=E_6$, a replenishing margin $e_7=E_7$, and a generated energy $e_{10}=E_{10}$.

For example, an energy efficiency EF can be represented by the first formula recited below.

$$EF = f((k_i e_i)) \quad (1)$$

Here, $e_i$ are values of items relating to the energy efficiency, e.g., the instantaneous fuel consumption amount $e_1$, the instantaneous fuel travelable distance $e_2$, the rotation speed remoteness degree $e_3$, the instantaneous battery current consumption value $e_4$, the instantaneous battery travelable distance $e_5$, the remaining capacity travelable distance $e_6$, the replenishing margin $e_7$, the instantaneous consumption cost $e_8$, the rotation speed $e_9$ of the engine, and the generated energy $e_{10}$ recited above, etc. Here, $k_i$ are coefficients of items relating to the energy efficiency. The coefficient $k_i$ includes 0.

Thus, the energy efficiency EF can be represented as a function of $k_i e_i$ (i.e., a function of $e_i$).

For example, the energy efficiency EF can be represented by the second formula recited below.

$$EF = \sum_{i=1}^{n} (k_i e_i) \quad (2)$$

Here, n is an integer not less than 1.

For example, the energy efficiency EF can be set to have the desired characteristics by determining the coefficient $k_i$ at the desired value.

The information relating to the energy efficiency of the moving body 510 (the vehicle 730) may include information relating to at least one selected from the instantaneous fuel consumption amount $E_1$ (or $e_1$), the instantaneous fuel travelable distance $E_2$ (or $e_2$), the rotation speed remoteness degree $E_3$ (or $e_3$), the instantaneous battery current consumption value $E_4$ (or $e_4$), the instantaneous battery travelable distance $E_5$ (or $e_5$), the remaining capacity travelable distance $E_6$ (or $e_6$), the replenishing margin $E_7$ (or $e_7$), the instantaneous consumption cost $E_8$ (or $e_8$), the rotation speed $E_9$ (or $e_9$) of the engine, and the generated energy $E_{10}$ (or $e_{10}$) (including information relating to combinations of these values).

The information relating to the energy efficiency may further include information relating to the carbon dioxide emission amount. For example, an instantaneous carbon dioxide emission amount $E_{11}$ may be used as an index relating to the energy efficiency. For example, the units of the instantaneous carbon dioxide emission amount $E_{11}$ are volume/time. For example, the units of the instantaneous carbon dioxide emission amount $E_{11}$ are liters/second (L/s), cubic centimeters/second ($cm^3$/s or cc/s), etc.

The state in which the instantaneous carbon dioxide emission amount $E_{11}$ is small corresponds to the state (e.g., the first state ST1) in which the energy efficiency is high. The state in which the instantaneous carbon dioxide emission amount $E_{11}$ is large corresponds to the state (e.g., the second state ST2) in which the energy efficiency is low. For example, a set value is provided for the instantaneous carbon dioxide emission amount $E_{11}$. When the measured value (the acquired value) of the instantaneous carbon dioxide emission amount $E_{11}$ is not more than the set value, the first display object is generated. When the measured value (the acquired value) of the instantaneous carbon dioxide emission amount $E_{11}$ exceeds the set value, the second display object is generated. Multiple set values may be provided; and the number of the types of the display objects that correspond may be three or more.

Thus, the display objects 180 (the first display object 180*a* and the second display object 180*b*) illustrate the energy efficiency. The display objects 180 (the first display object 180*a* and the second display object 180*b*) may further indicate at least one selected from the speed (the vehicle speed) of the moving body 510, the stability of the traveling, the traveling safety, the comfort, and the accuracy of the traveling.

For example, the display object 180 may indicate the instantaneous fuel travelable distance $E_2$ and further indicate the stability of the traveling. For example, the recesses and protrusions of the path and/or the temporal change of the path of the display object 180 may indicate the instantaneous fuel travelable distance $E_2$; and the color of the display object 180 may indicate the stability of the traveling. Thus, in the embodiment, various modifications of the display object 180 are possible.

In the embodiment, it is particularly desirable for the energy efficiency of the moving body (e.g., the vehicle 730) to be used as the predetermined characteristic value CV.

For example, it is desirable to provide the information by a method that sufficiently arouses the attention of the human viewer 100 (the driver) when displaying characteristics for which an urgent response is necessary to ensure the traveling safety of the vehicle 730. For example, it is desirable for a warning to be displayed so that the perception of the human viewer 100 can be sufficiently clear when providing information such as excessive speed, departure from the travel lane, an extreme decrease of the distance between vehicles, etc.

On the other hand, the energy efficiency is displayed to prompt an operation of higher efficiency when the operated apparatus 510 (the vehicle 730) is being operated somewhat safely. Therefore, for example, it is considered that it is particularly important not to impede urgent responses to ensure safety.

In other words, the display apparatus of the embodiment does not cause excessive recognition by the human viewer 100 of the display until reaching the state of being operated somewhat safely; and the perception of the display may have moderate sensitivity when the state of being operated somewhat safely is reached.

In other words, in the embodiment, the information that is displayed by the display object 180 can be perceived with high sensitivity even without fixating on the display object 180. Thereby, the state (the energy efficiency) of the vehicle 730 can be easily recognized in the state in which it is necessary to view the external environment image 340 with sufficient attention such as during the operation of the vehicle 730; and an efficient and safe operation of the vehicle 730 can be realized.

In the embodiment, it is particularly desirable for the energy efficiency to be used as the characteristic value and for the temporal change of the path of the display object 180, the recesses and protrusions of the path of the display object 180, and the recesses and protrusions of the shape of the display object 180 to be changed. In other words, the energy efficiency can be easily recognized while viewing the external environment image 340 with sufficient attention by moving the display object 180 along the prescribed path and by changing the temporal change of the path of the display object 180, the recesses and protrusions of the path of the display object 180, and the recesses and protrusions of the shape of the display object 180; and an efficient and safe operation of the vehicle 730 can be realized.

The display apparatus according to the embodiment includes: the information acquisition unit 520 configured to acquire the information relating to the energy efficiency of the moving body 510 (the vehicle 730); the control unit 530 configured to generate the image data to include the display object 180 indicating the energy efficiency based on the information acquired by the information acquisition unit 520; and the display unit 540 configured to present the image including the display object 180 generated by the control unit 530 to the human viewer 100 operating the moving body 510.

When the energy efficiency is in the first state ST1, the control unit 530 generates the image data to include the first display object 180*a*. The first display object 180*a* moves along the first path 185*a* inside the image. The first display object 180*a* has the first configuration.

When the energy efficiency is in the second state ST2 which is lower than the first state ST1, the control unit 530 generates the image data to include the second display object 180*b*. The second display object 180*b* moves along the second path 185*b* inside the image. The second display object 180*b* has the second configuration.

The control unit 530 implements at least one selected from causing the temporal change of the second path 185*b* to be greater than the temporal change of the first path 185*a*, causing the recesses and protrusions of the second path 185*b* to be greater than the recesses and protrusions of the first path 185*a*, and causing the recesses and protrusions of the second configuration to be greater than the recesses and protrusions of the first configuration.

In other words, for example, an operation including one selected from the operations illustrated in FIG. 1A to FIG. 1L, FIG. 5A to FIG. 5L, FIG. 6A to FIG. 6L, FIG. 11A to FIG. 11L, FIG. 13A to FIG. 13L, FIG. 14A to FIG. 14L, FIG. 15A to FIG. 15L, FIG. 16A to FIG. 16F, FIG. 17A to FIG. 17C, and FIG. 18A to FIG. 18C is implemented based on the index relating to the energy efficiency.

The implementation of the display is easily perceived moderately by the display objects 180 (the first display object 180*a* and the second display object 180*b*) moving along the paths.

For example, there are cases where the perception is not easy even when the shape of the display object 180 changes if the position of the display object 180 is fixed. Conversely, it is easily understandable that the display operation is stably implemented by the display objects 180 (the first display object 180*a* and the second display object 180*b*) moving along the paths; and the human viewer 100 can perceive moderately.

For example, a display in which the configuration of the shape is changed may be considered in the case where the energy efficiency such as the fuel efficiency, the carbon dioxide emission amount, etc., is displayed. For example, a configuration in which a designated configuration such as a picture of the earth or the like is used as the shape also may be considered. In such a case, when the position of the shape inside the image is not changed, the figure does not change for traveling in which the energy efficiency is constant. Therefore, for constant traveling in the state in which the energy efficiency is low, there are cases where it is difficult to recognize that the energy efficiency is low.

In particular, the human viewer 100 (the driver) fixates on the front of the vehicle 730 when operating the vehicle 730. It is important to cause the human viewer 100 to moderately perceive the state of the display object 180 illustrating the energy efficiency while in the state in which the human viewer 100 fixates on the front.

In such a case, the state of the display objects 180 (the first display object 180*a* and the second display object 180*b*) are moderately perceived while in the state in which the human viewer 100 fixates on the front by moving the display objects 180 along the path. Then, for example, even for constant traveling in the state in which the energy efficiency is low, it is easy to recognize that the energy efficiency is low due to, for example, the temporal change of the path, the recesses and protrusions of the path, and the recesses and protrusions of the shape of the display object.

Thus, in the embodiment, it is particularly desirable for the first display object 180*a* to move along the first path 185*a* inside the image and for the second display object 180*b* to move along the second path 185*b* inside the image. It is particularly desirable to implement at least one selected from causing the temporal change of the second path 185*b* to be greater than the temporal change of the first path 185*a*, causing the recesses and protrusions of the second path 185*b* to be greater than the recesses and protrusions of the first path 185*a*, and causing the recesses and protrusions of the second configuration to be greater than the recesses and protrusions of the first configuration.

In such a case, it is particularly desirable for the range of movement of the path in the lateral direction of the display image 330 (the screen) to be not less than the range of movement in the vertical direction of the display image 330.

For example, in the case where the path is an ellipse as illustrated in FIG. 1A, it is desirable for the major axis of the ellipse to be along the lateral direction of the display image 330 and for the minor axis to be along the vertical direction. For example, in the case where the path has a line segment configuration as illustrated in FIG. 11A to FIG. 11L, it is desirable for the line segment to be along the lateral direction of the display image 330.

For example, in the case where the path has a line segment configuration and the line segment is along the vertical direction of the display image 330, this is a state in which the line segment is substantially along the travel direction of the vehicle 730. Therefore, there are cases where the human viewer 100 senses incongruity. For example, in the case where a line is provided to illustrate a lane division in the frontward road when the vehicle 730 travels, the driver particularly perceives the angle (including the change of the angle) between the line illustrating the lane division and the line segment of the path if the line segment of the path of the display object 180 is along the vertical direction of the display image 330. Thereby, this may impede safe operations.

Conversely, there is little interference with the information outside the vehicle in the case where the line segment of the path is along the lateral direction. Further, in the case where the path has an elliptical configuration, there is little interference with the information outside the vehicle in the case where the major axis of the ellipse is along the lateral direction.

Therefore, it is particularly desirable for the width of the first path 185*a* in the lateral direction inside the display image 330 to be not less than the width of the first path 185*a* in the vertical direction inside the display image 330. Thereby, the information can be provided in an easily understandable fashion while ensuring a safe operation. It is more desirable for the width of the second path 185*b* in the lateral direction inside the display image 330 to be not less than the width in the vertical direction inside the display image 330. Thereby, the information can be provided in an easily understandable fashion while ensuring a safe operation.

On the other hand, a configuration may be considered in which a fringe pattern is used to imitate the movement of the landscape of the external environment that changes according to the vehicle behavior; and the movement of the fringe pattern is changed as a result of the vehicle behavior change. Because the fringe pattern imitates the movement of the landscape of the external environment in this configuration, for example, the speed of the movement of the fringe pattern is linked to the speed of the vehicle. For example, the angle of the fringe pattern changes based on the pitch angle, the roll angle, and the yaw angle. By such a configuration, the effects of the display are increased; and the safe traveling of the vehicle may be supported.

For example, there is incongruity of visual angles when displaying the shape indicating the energy efficiency at the angle of the fringe pattern. Also, for example, there is visual incongruity when displaying the energy efficiency using single-axial movement of the fringe pattern. In other words, it is considered that the content displayed using the fringe pattern can be used in the case where designated characteristics such as the vehicle speed, the pitch angle, the roll angle, the yaw angle, etc., are displayed; and designated effects are obtained by changing the fringe pattern to imitate the movement of the landscape of the external environment.

Conversely, in the embodiment, the display object 180 indicating the energy efficiency moves along the path inside the image. The path does not have a relationship with the orientation of the vehicle 730, etc. Then, a display having particularly low incongruity is possible by the width of the first path 185*a* in the lateral direction inside the display image 330 being not less than the width of the first path 185*a* in the vertical direction inside the display image 330. Further, the width of the second path 185*b* in the lateral direction inside the display image 330 may be not less than the width of the second path 185*b* in the vertical direction inside the display image 330. Thereby, a display having particularly low incongruity is possible.

For example, it is particularly desirable for the paths of the display objects 180 (the path of the first display object 180*a* and the path of the second display object 180*b*) to be paths that orbit inside the image. In this configuration, the affinity with the content (the energy efficiency) indicated by the display objects 180 is high.

In other words, the first path 185a is an elliptical path having the major axis substantially along the lateral direction inside the image. Thus, it can be intuitively ascertained that circulating energy is indicated using a path that orbits. The path has an elliptical configuration; the major axis of the ellipse is along the lateral direction.

For example, there are many cases where the axis of rotation of the earth is recognized to be substantially the vertical direction and the axis of the orbit of the earth is recognized to be substantially the vertical direction. It is particularly natural to perceive that the axis of the path of the display object 180 also is the vertical direction and that the display object 180 orbits along the path in the horizontal plane.

In other words, in the embodiment, it is particularly desirable for the path to be in the horizontal plane as illustrated in FIG. 1A to FIG. 1L, FIG. 15A to FIG. 15L, FIG. 16A to FIG. 16F, and FIG. 17A to FIG. 17C. In other words, it is particularly desirable for the path to have an elliptical configuration and for the major axis of the ellipse to be along the lateral direction. Thereby, the display object 180 can be moderately and naturally perceived; and the display content (e.g., the energy efficiency) of the display object 180 can be perceived without incongruity.

However, in the case where the path is a circle as shown in FIG. 18A to FIG. 18C, a stable impression is given to the human viewer 100 due to the sense of uniformity of the circle. Therefore, this is one example in which it is desirable for the path to be a circle.

FIG. 22A to FIG. 22L, FIG. 23A to FIG. 23L, and FIG. 24A to FIG. 24L are schematic views illustrating other operations of the display apparatus according to the embodiment.

FIG. 22A to FIG. 22F, FIG. 23A to FIG. 23F, and FIG. 24A to FIG. 24F illustrate the first display object 180a. These drawings illustrate the change of the first display object 180a over time. FIG. 22G to FIG. 22L, FIG. 23G to FIG. 23L, and FIG. 24G to FIG. 24L illustrate the second display object 180b. These drawings illustrate the change of the second display object 180b over time.

As shown in FIG. 22A to FIG. 22F, the first path 185a of the first display object 180a is an ellipse. The major axis of the ellipse is along the lateral direction. In this example, the first path 185a does not change.

As shown in FIG. 22G to FIG. 22L, the second path 185b of the second display object 180b is an ellipse. The major axis of the ellipse is substantially along the lateral direction. Although the shape of the second path 185b is constant in this example, the direction of the major axis of the ellipse of the second path 185b changes with time. Thus, in this example, the temporal change of the second path 185b is set to be greater than the temporal change of the first path 185a.

When the temporal change of the path of the display object 180 is large as shown in these drawings, the speed of the change of the path inside the display image 330 increases. In other words, the control unit 530 generates the image data to include the first display object 180a and the image data to include the second display object 180b such that the speed of the change of the second path 185b is higher than the speed of the change of the first path 185a.

In the case shown in FIG. 23A to FIG. 23F as well, the first path 185a of the first display object 180a is an ellipse. In this example as well, the first path 185a does not change.

As shown in FIG. 23G to FIG. 23L, the second path 185b of the second display object 180b has a configuration that oscillates from an elliptical configuration while conforming to the elliptical configuration. The major axis of the ellipse is substantially along the lateral direction. In this example, the recesses and protrusions of the second path 185b (the recesses and protrusions of the configuration of the second path 185b) are set to be greater than the recesses and protrusions of the first path 185a (the recesses and protrusions of the configuration of the first path 185a).

In the case shown in FIG. 24A to FIG. 24F as well, the first path 185a of the first display object 180a is an ellipse. In this example as well, the first path 185a does not change. An image of a sphere is used as the first display object 180a.

As shown in FIG. 24G to FIG. 24L, the second path 185b of the second display object 180b is an ellipse and does not change. The image described in regard to FIG. 12C having the three-dimensional configuration including protrusions is used as the second display object 180b. In other words, in this example, the recesses and protrusions of the second configuration of the second display object 180b are set to be greater than the recesses and protrusions of the first display object 180a.

Thereby, the state (the energy efficiency) of the moving body 510 (the vehicle 730) can be easily recognized.

As shown in these drawings, the length of the path inside the display image 330 lengthens when the recesses and protrusions of the path of the display object 180 are large. In other words, the control unit 530 generates the image data to include the first display object 180a and the image data to include the second display object 180b such that the length of the second path 185b is longer than the length of the first path 185a.

These operations may be implemented multiply in combination. In other words, in the example described above in regard to FIG. 16A to FIG. 16F, the recesses and protrusions of the second configuration of the second display object 180b are set to be greater than the recesses and protrusions of the first display object 180a while setting the recesses and protrusions of the second path 185b to be greater than the recesses and protrusions of the first path 185a.

The difference between the second path 185b and the first path 185a may not change continuously according to the change of the difference between the reference value and the value of the energy efficiency EF. In other words, a threshold (or multiple thresholds) may be determined; and the difference between the second path 185b and the first path 185a may be changed in stages according to the change of the difference between the reference values and the value of the energy efficiency EF.

The difference between the second configuration and the first configuration may not change continuously according to the change of the difference between the reference value and the value of the energy efficiency EF. In other words, a threshold (or multiple thresholds) may be determined; and the difference between the second configuration and the first configuration may be changed in stages according to the change of the difference between the reference values and the value of the energy efficiency EF.

The control unit 530 may implement data processing for at least one selected from causing the temporal change of the second path 185b to be greater than the temporal change of the first path 185a, causing the recesses and protrusions of the second path 185b to be greater than the recesses and protrusions of the first path 185a, and causing the recesses and protrusions of the second configuration to be greater than the recesses and protrusions of the first configuration. For example, the control unit 530 may implement the data processing relating to the path each time.

Also, the information that results from implementing the data processing recited above may be pre-stored in a memory device. The memory device may be provided inside the control unit 530. Or, the memory device may be provided separately from the control unit 530. The control unit 530 may extract the information resulting from the data processing stored in the memory device and generate the image data to include the display object 180 based on the information that is extracted. In other words, the generation of the image data includes extracting data that is stored.

For example, the image data (including multiple data corresponding to the temporal change) of the first display object 180a having the first path 185a and the first configuration and the image data (including multiple data corresponding to the temporal change) of the second display object 180b having the second path 185b and the second configuration are extracted from the memory device. The image data is generated based on the image data.

In such a case, the image data relating to a state between the first state ST1 and the second state ST2 may be prepared; and the image data that is prepared may be stored in the memory device and used by being extracted as necessary. The image data relating to the state between the first state ST1 and the second state ST2 may be made based on the image data of the first display object 180a and the image data of the second display object 180b.

Figure 25:
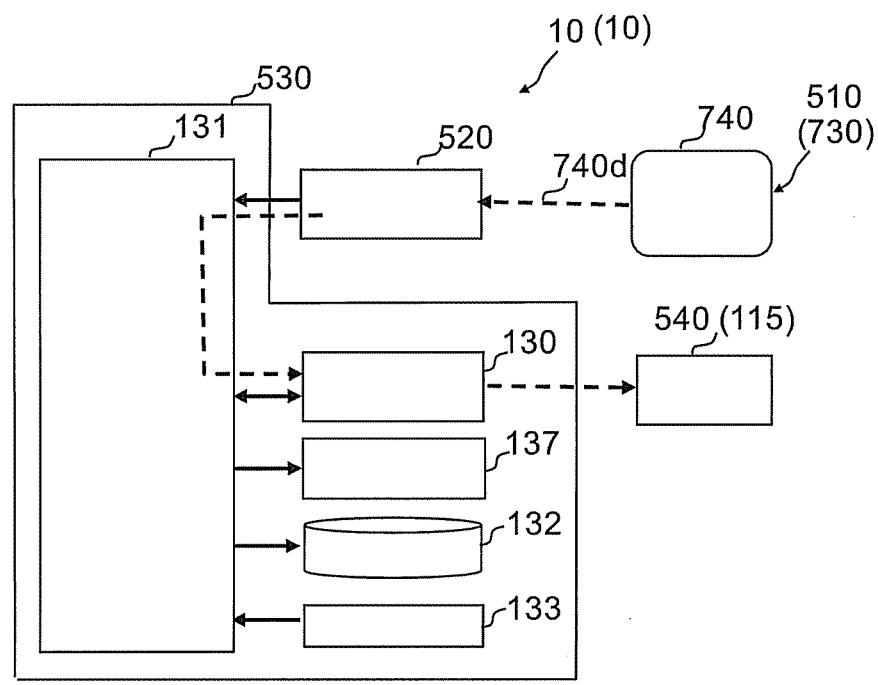
FIG. 25 is a block diagram illustrating the configuration of the display apparatus according to the embodiment.

FIG. 25 is a block diagram illustrating the configuration of the display apparatus according to the embodiment.

Namely, this drawing illustrates, for example, the configuration of the display apparatus 10, the display apparatus 11, and the modifications of the display apparatus 10 and the display apparatus 11 according to the embodiments. In FIG. 25, the solid line arrow illustrates the flow of the control; and the broken line arrow illustrates the flow of the data.

As shown in FIG. 25, the display apparatus according to the embodiment includes the information acquisition unit 520, the control unit 530, and the display unit 540.

The information acquisition unit 520 acquires information (the vehicle information 740d) relating to the state of the vehicle 730 from the vehicle 730 (the operated apparatus 510). For example, the information (the vehicle information 740d) relating to the state of the vehicle 730 includes at least one selected from the speed, the rotation speed of the engine, the rotation speed of the motor, the flow rate of the fuel, the remaining amount of the fuel, the current of the battery, the power consumption, and the generated power of the generator. The information (the vehicle information 740d) relating to the state of the vehicle 730 may further include the various values described above.

For example, a data output unit 740 is provided in the vehicle 730. For example, a CAN (Controller Area Network) or the like is utilized to acquire the vehicle information 740d from the data output unit 740. A vehicle speed pulse may be acquired from the vehicle 730.

The control unit 530 includes the image data generation unit 130. For example, the control unit 530 may further include a main control unit 131, a clock control unit 137, a memory unit 132, and an operation unit 133.

The vehicle information 740d acquired by the information acquisition unit 520 is input to the main control unit 131. The main control unit 131 implements a calculation based on the vehicle information 740d; and the data for the display is supplied to the image data generation unit 130. The image data generation unit 130 makes appropriate adjustments and generates the image data of the video image based on this data. The adjusted image data that is generated is supplied to the display unit 540 (the image projection unit 115). The image projection unit 115 projects the light flux 112 including the image based on the image data toward the human viewer 100.

For example, the clock control unit 137 generates or acquires a real-time clock that is used as a reference. The clock control unit 137 may include, for example, a dedicated clock semiconductor chip.

The operation unit 133 is used when the human viewer 100 (the driver) operates the display apparatus.

For example, the memory unit 132 may store the vehicle information 740d and the processed data of the vehicle information 740d acquired by the information acquisition unit 520. The memory unit 132 may store the data used when the main control unit 131 performs the processing. The memory unit 132 may include any memory device such as RAM, ROM, a hard disk, nonvolatile memory, etc.

By such a configuration in the display apparatus according to the embodiment, the operations described above are implemented.

In the embodiment as described above, the information that is displayed by the display object 180 is perceived with high sensitivity even without fixating on the display object 180. Thereby, for example, the state (the energy efficiency) of the vehicle 730 is easily recognized in the state in which the external environment image 340 of the vehicle 730 is viewed with sufficient attention. Therefore, it is desirable for the display position of the display object 180 to be disposed in the peripheral portion outside the center of the visual field of the human viewer 100 (the driver). In other words, the display object 180 is displayed to be ambient.

Thereby, the human viewer 100 can recognize the state (the energy efficiency) of the vehicle 730 by perceiving the display object 180 at the peripheral portion of the visual field while viewing the external environment image 340 of the vehicle 730 at the central portion of the visual field with sufficient attention. In such a case, the information can be sensibly ascertained without fixating on the display object 180 by modifying the temporal change of the path of the display object 180, the recesses and protrusions of the path, and the shape of the display object 180.

In the embodiment, it is desirable for the display position of the display object 180 as viewed by the human viewer 100 to be lower than the extension of the horizontal line of the eye 101 of the human viewer 100 as viewed by the human viewer 100. The display position of the display object 180 as viewed by the human viewer 100 is the position perceived by the human viewer 100 of the image of the light flux 112 when the light flux 112 is reflected by the windshield unit 710 (the reflecting unit) of the vehicle 730 and projected toward the human viewer 100.

Thereby, as shown in FIG. 2A and FIG. 2B, the human viewer 100 perceives the display object 180 presented by the display apparatus 10 at the peripheral portion of the visual field while viewing the external environment image 340 of the external environment information at substantially the central portion of the visual field.

For example, the display unit 540 (e.g., the image projection unit 115) presents the image to the human viewer 100 such that the external environment of the moving body 510 (the vehicle 730) is viewable to the human viewer 100 on the upper side of the first display object 180a and the second display object 180b.

For example, the positional relationship between the windshield unit 710 (the reflecting unit) and the optical system included in the image projection unit 115 is set appropriately to provide the configuration recited above. For example, the position and/or the angle of the emerging-side mirror 126 are appropriately adjusted; and the projection position of the light flux 112 is controlled. The position where the light flux 112 is reflected at the reflecting unit is appropriately controlled; and the images of the first display object 180*a* and the second display object 180*b* are disposed in a portion (specifically, the lower portion) that is more peripheral than the central portion of the visual field of the human viewer 100.

Thereby, the human viewer 100 can view the external environment image on the upper side of the first display object 180*a* and the second display object 180*b*. Thereby, the obstruction of the external environment image 340 of the external environment information by the display object 180 is suppressed.

Figure 26:
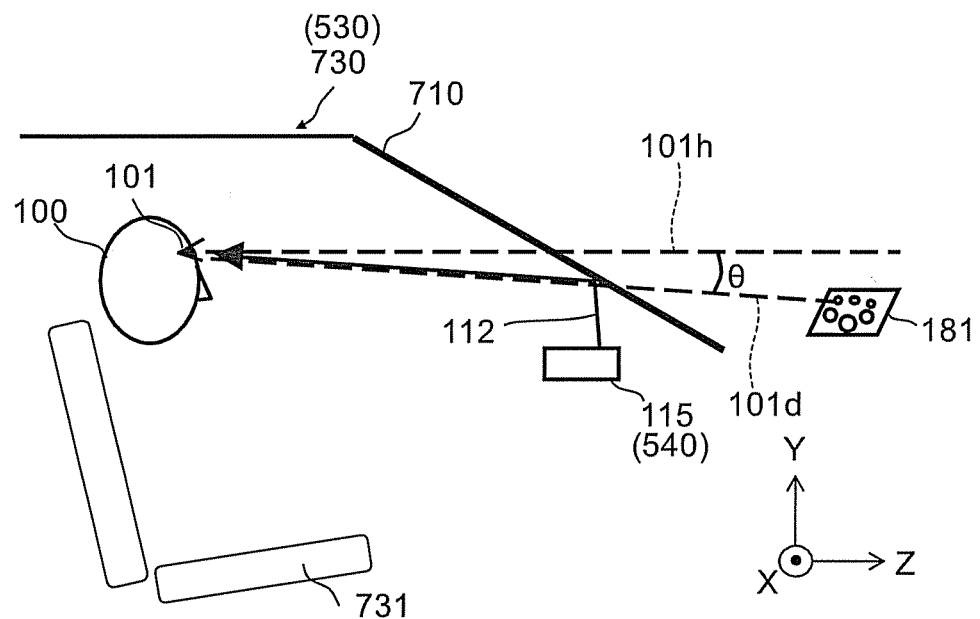
FIG. 26 is a schematic view illustrating a state of use of the display apparatus according to the embodiment.

FIG. 26 is a schematic view illustrating a state of use of the display apparatus according to the embodiment.

As shown in FIG. 26, the direction from the rear toward the front of the vehicle 730 (the moving body 510) is taken as a Z-axis direction. The direction from the left toward the right of the vehicle 730 is taken as an X-axis direction. The direction upward from under the vehicle 730 is taken as a Y-axis direction. The direction from the rear toward the front as viewed by the human viewer 100 is the Z-axis direction.

The light flux 112 emitted from the image projection unit 115 is projected toward the human viewer 100 sitting in a seat 731 inside the vehicle 730. An axis passing through the position of the eye 101 of the human viewer 100 along the Z-axis direction is taken as a line-of-sight horizontal axis 101*h*. An axis connecting the position of the eye 101 of the human viewer 100 to the position where the display object 180 is displayed as viewed by the human viewer 100 is taken as a depression angle axis 101*d*. In this example, the position where the display object 180 is displayed as viewed by the human viewer 100 is the position where the light flux 112 emitted from the image projection unit 115 is reflected at the windshield unit 710 (the reflecting unit). The depression angle axis 101*d* corresponds to the axis connecting the position of the eye 101 of the human viewer 100 to the image 181 (the virtual image) of the display object 180. The position where the display object 180 is displayed as viewed by the human viewer 100 does not always match the position of the image formation unit 117 (e.g., the LCD) included in the image projection unit 115.

In such a case, the angle (the depression angle θ) between the line-of-sight horizontal axis 101*h* and the depression angle axis 101*d* is set to be such that the external environment image 340 of the external environment information is not obstructed by the display object 180.

For example, the depression angle θ is set to be not less than 1 degree. In the case where the depression angle θ is less than 1 degree, the external environment image 340 of the external environment information is obstructed by the display object 180. For example, the depression angle θ is set to be not more than 30 degrees. In the case where the depression angle θ exceeds 30 degrees, the position where the display object 180 is displayed is excessively distal to the central portion of the visual field of the human viewer 100. Therefore, it becomes difficult for the human viewer 100 to simultaneously view the external environment image 340 of the central portion of the visual field and perceive the display object 180 at the peripheral portion of the visual field. Therefore, movement of the line of sight and/or movement of the head 105 becomes necessary.

By setting the depression angle θ to be not less than 1 degree and not more than 30 degrees, the human viewer 100 can perceive the display object 180 at the peripheral portion of the visual field while viewing the external environment image 340 of the vehicle 730 at the central portion of the visual field with sufficient attention. In other words, the display apparatus according to the embodiment displays the display object 180 to be ambient.

It is more desirable for the human viewer 100 to view the display object 180 with the one eye 101 (only with the one eye 101). For example, in the case where the human viewer 100 views the display object 180 with both eyes, there are cases where the image 181 is difficult to view due to binocular parallax. Conversely, the difficulty of viewing is eliminated by viewing with the one eye 101 (with only the one eye 101). In other words, the display object 180 is perceived more clearly when viewing with the one eye 101 than when viewing with both eyes. Thereby, the display object 180 can be clearly perceived even in the case where the display object 180 is displayed to be ambient at the peripheral portion of the visual field.

In the case where the distance between the windshield unit 710 and the eye 101 is not less than 21.7 cm, the sense of depth perceived by the human viewer 100 is increased; and it can be easy for the display object 180 to be perceived at the desired depthward position.

Thus, the display unit 540 (the image projection unit 115) presents the image to only the one eye 101 of the human viewer 100. In other words, the display unit 540 projects the light flux 112 including the image to the human viewer 100. The display unit 540 includes a divergence angle control unit configured to control the divergence angle of the light flux 112 to project the light flux 112 to only the one eye 101 of the human viewer 100. For example, the divergence angle control unit limits the divergence angle of the light flux 112. For example, the combination of the light source side lens 123, the aperture 124, and the emerging side lens 125 described above in regard to FIG. 3 may be used as the divergence angle control unit.

Thereby, the projection region 114 of the light flux 112 is controlled to be within a constant range at the position of the human viewer 100. Specifically, the lateral-direction width of the projection region 114 of the light flux 112 at the position of the human viewer 100 is set to be, for example, not more than about 60 mm to 75 mm.

The display method according to the embodiment is a display method that includes acquiring information relating to the energy efficiency of the moving body 510, generating the image data to include the display object 180 indicating the energy efficiency based on the information that is acquired, and presenting the image including the display object 180 that is based on the image data that is generated to the human viewer 100 operating the moving body 510.

In this display method, when the energy efficiency is in the first state ST1, the image data is generated to include the first display object 180*a* having the first configuration moving along the first path 185*a* inside the image; and when the energy efficiency is in the second state ST2 which is lower than the first state ST1, the image data is generated to include the second display object 180*b* having the second configuration moving along the second path 185*b* inside the image.

This display method includes implementing at least one selected from causing the temporal change of the second path 185*b* to be greater than the temporal change of the first path 185*a*, causing the recesses and protrusions of the second path 185*b* to be greater than the recesses and protrusions of the first path 185*a*, and causing the recesses and protrusions of the second configuration to be greater than the recesses and protrusions of the first configuration.

The moving body 510 according to the embodiment includes the display apparatus and the reflecting unit (the windshield unit 710) configured to reflect the light flux emitted from the display apparatus toward the human viewer. This display apparatus includes one selected from the display apparatuses according to the embodiment.

According to the embodiment, a display apparatus, a display method, and a moving body that enable easy recognition of the state of the moving body are provided.

Hereinabove, exemplary embodiments of the invention are described with reference to specific examples. However, the invention is not limited to these specific examples. For example, one skilled in the art may similarly practice the invention by appropriately selecting specific configurations of components included in display apparatuses and moving bodies (vehicles) from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display apparatuses, display methods, and moving bodies practicable by an appropriate design modification by one skilled in the art based on the display apparatuses, the display methods, and the moving bodies described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display apparatus, comprising:
an information acquisition unit configured to acquire information relating to an energy efficiency of a moving body;
a control unit configured to generate image data to include a display object indicating the energy efficiency based on the information acquired by the information acquisition unit; and
a display unit configured to present the image including the display object generated by the control unit to a human viewer operating the moving body,
the control unit being configured to:
generate the image data to include a first display object having a first configuration and moving along a first path inside the image when the energy efficiency is in a first state; and
generate the image data to include a second display object having a second configuration and moving along a second path inside the image when the energy efficiency is in a second state lower than the first state,
the control unit being configured to implement at least one selected from:
causing a temporal change of the second path to be greater than a temporal change of the first path;
causing recesses and protrusions of the second path to be greater than recesses and protrusions of the first path; and
causing recesses and protrusions of the second configuration to be greater than recesses and protrusions of the first configuration.

2. The apparatus according to claim 1, wherein a width of the first path in a lateral direction inside the image is not less than a width of the first path in a vertical direction inside the image.

3. The apparatus according to claim 2, wherein the first path and the second path are paths orbiting inside the image.

4. The apparatus according to claim 1, wherein the first path is an elliptical path having a major axis along a lateral direction inside the image.

5. The apparatus according to claim 1, wherein the control unit is configured to cause the temporal change of the second path to be greater than the temporal change of the first path.

6. The apparatus according to claim 1, wherein the control unit is configured to cause the recesses and protrusions of the second path to be greater than the recesses and protrusions of the first path.

7. The apparatus according to claim 1, wherein the control unit is configured to cause the recesses and protrusions of the second configuration to be greater than the recesses and protrusions of the first configuration.

8. The apparatus according to claim 7, wherein the control unit is configured to cause a height of the recesses and protrusions of the second configuration to be greater than a height of the recesses and protrusions of the first configuration.

9. The apparatus according to claim 7, wherein the control unit is configured to cause a number of the recesses and protrusions of the second configuration to be greater than a number of the recesses and protrusions of the first configuration.

10. The apparatus according to claim 7, wherein the control unit is configured to cause a surface area of a three-dimensional shape of the second configuration to be greater than a surface area of a three-dimensional shape of the first configuration.

11. The apparatus according to claim 7, wherein the control unit is configured to cause a diameter of a tip portion of a protrusion of the recesses and protrusions of the second configuration to be less than a diameter of a base portion of the protrusion of the recesses and protrusions of the second configuration.

12. The apparatus according to claim 1, wherein the display unit is configured to present the image to the human viewer to make an external environment of the moving body viewable to the human viewer on an upper side of the first display object and the second display object.

13. The apparatus according to claim 1, wherein an angle between a line-of-sight horizontal axis and a depression angle axis is not less than 1 degree, the line-of-sight horizontal axis being along an axis passing through a position of an eye of the human viewer from a rear toward a front of the moving body, the depression angle axis connecting the position of the eye of the human viewer to a position where the display object is displayed as viewed by the human viewer.

14. The apparatus according to claim 1, wherein an angle between a line-of-sight horizontal axis and a depression angle axis is not more than 30 degrees, the line-of-sight horizontal axis being along an axis passing through a position of an eye of the human viewer from a rear toward a front of the moving body, the depression angle axis connecting the position of the eye of the human viewer to a position where the display object is displayed as viewed by the human viewer.

15. The apparatus according to claim 12, wherein the display unit is configured to present the image to only one eye of the human viewer.

16. The apparatus according to claim 12, wherein the display unit is configured to project a light flux including the image to the human viewer, and the display unit includes a divergence angle control unit configured to control a divergence angle of the light flux to project the light flux to only one eye of the human viewer.

17. The apparatus according to claim 1, wherein a dominant wavelength of a color included in the second display object is longer than a dominant wavelength of a color included in the first display object.

18. The apparatus according to claim 1, wherein the control unit is configured to cause a temporal change of at least one selected from a shape, a size, a number, and a brightness to be greater for the second display object than for the first display object.

19. A display method including acquiring information relating to an energy efficiency of a moving body, generating image data to include a display object indicating the energy efficiency based on the acquired information, and presenting an image including the display object based on the generated image data to a human viewer operating the moving body, the method comprising:

using a control unit to generate a first image from the image data to include a first display object having a first configuration and moving along a first path inside the image when the energy efficiency is in a first state;

using a control unit to generate a second image from the image data to include a second display object having a second configuration and moving along a second path inside the image when the energy efficiency is in a second state lower than the first state; and implementing at least one selected from causing a temporal change of the second path to be greater than a temporal change of the first path, causing recesses and protrusions of the second path to be greater than recesses and protrusions of the first path, and causing recesses and protrusions of the second configuration to be greater than recesses and protrusions of the first configuration.

20. A moving body, comprising:

a display apparatus; and a reflecting unit configured to reflect a light flux emitted from the display apparatus toward a human viewer, the display apparatus including:

an information acquisition unit configured to acquire information relating to an energy efficiency of the moving body;

a control unit configured to generate image data to include a display object indicating the energy efficiency based on the information acquired by the information acquisition unit; and a display unit configured to present the image including the display object generated by the control unit to the human viewer operating the moving body, the control unit being configured to:

generate the image data to include a first display object having a first configuration and moving along a first path inside the image when the energy efficiency is in a first state; and generate the image data to include a second display object having a second configuration and moving along a second path inside the image when the energy efficiency is in a second state lower than the first state, the control unit being configured to implement at least one selected from:

causing a temporal change of the second path to be greater than a temporal change of the first path;

causing recesses and protrusions of the second path to be greater than recesses and protrusions of the first path; and causing recesses and protrusions of the second configuration to be greater than recesses and protrusions of the first configuration.

\* \* \* \* \*